(12) United States Patent
Grigorian et al.

(10) Patent No.: US 7,938,987 B2
(45) Date of Patent: May 10, 2011

(54) ORGANIZED CARBON AND NON-CARBON ASSEMBLY AND METHODS OF MAKING

(75) Inventors: Leonid Grigorian, Camarillo, CA (US);
Steven G. Colbern, Fillmore, CA (US);
Alex E. Moser, Ventura, CA (US);
Robert L. Gump, Camarillo, CA (US);
Daniel A. Niebauer, Camarillo, CA (US); Sean Imtiaz Brahim, Camarillo, CA (US)

(73) Assignee: Yazaki Corporation, Tokyo (JP)

( * ) Notice: Subject to any disclaimer, the term of this patent is extended or adjusted under 35 U.S.C. 154(b) by 1047 days.

(21) Appl. No.: 11/741,634

(22) Filed: Apr. 27, 2007

(65) Prior Publication Data

US 2010/0117032 A1    May 13, 2010

Related U.S. Application Data

(60) Provisional application No. 60/796,399, filed on May 1, 2006, provisional application No. 60/808,096, filed on May 24, 2006, provisional application No. 60/842,281, filed on Sep. 5, 2006, provisional application No. 60/842,543, filed on Sep. 6, 2006, provisional application No. 60/874,876, filed on Dec. 14, 2006.

(51) Int. Cl.
*H01B 1/00* (2006.01)

(52) U.S. Cl. ........ 252/502; 252/500; 252/506; 252/512; 252/513; 252/514; 252/518.1; 252/519.1; 252/519.12; 252/519.13; 252/519.14; 977/734; 977/742; 977/744; 977/750; 977/752; 977/842; 977/847; 423/445 R; 423/445 B; 423/464; 423/466; 423/491

(58) Field of Classification Search .......... 252/500–511, 252/512, 513, 514, 518.1, 519.1, 519.12, 252/519.13, 519.14; 427/249.1; 423/445 B, 445 R, 464, 466, 491; 977/734, 742, 744, 750, 752, 842, 847

See application file for complete search history.

(56) References Cited

U.S. PATENT DOCUMENTS

| | | | |
|---|---|---|---|
| 3,377,280 | A | 4/1968 | Knappwost |
| 3,956,194 | A | 5/1976 | Armand |

(Continued)

FOREIGN PATENT DOCUMENTS

EP    0782543 B1    7/1997

(Continued)

OTHER PUBLICATIONS

Monthieux ("Filling single-wall carbon nanotubes" Carbon, vol. 40, pp. 1809-1823, 2002).*

(Continued)

*Primary Examiner* — Mark Kopec
*Assistant Examiner* — Tri V Nguyen
(74) *Attorney, Agent, or Firm* — Perkins Coie LLP; Viola T. Kung

(57) ABSTRACT

This invention relates generally to organized assemblies of carbon and non-carbon compounds and methods of making such organized structures. In preferred embodiments, the organized structures of the instant invention take the form of nanorods or their aggregate forms. More preferably, a nanorod is made up of a carbon nanotube filled, coated, or both filled and coated by a non-carbon material. This invention is further drawn to the separation of single-wall carbon nanotubes. In particular, it relates to the separation of semiconducting single-wall carbon nanotubes from conducting (or metallic) single-wall carbon nanotubes. It also relates to the separation of single-wall carbon nanotubes according to their chirality and/or diameter.

37 Claims, 34 Drawing Sheets

U.S. PATENT DOCUMENTS

| | | | |
|---|---|---|---|
| 4,604,276 A | 8/1986 | Oblas et al. | |
| 4,729,884 A | 3/1988 | Sugiura et al. | |
| 4,795,591 A | 1/1989 | Fujimoto et al. | |
| 4,887,273 A | 12/1989 | Komatsubara et al. | |
| 5,352,430 A | 10/1994 | McCulfor et al. | |
| 5,457,343 A | 10/1995 | Ajayan et al. | |
| 5,543,378 A | 8/1996 | Wang | |
| 5,547,748 A | 8/1996 | Ruoff et al. | |
| 5,556,702 A | 9/1996 | Katsumata et al. | |
| 5,677,009 A | 10/1997 | Katsumata et al. | |
| 5,717,076 A | 2/1998 | Yamamoto et al. | |
| 5,780,101 A | 7/1998 | Nolan et al. | |
| 5,916,642 A | 6/1999 | Chang | |
| 5,965,267 A | 10/1999 | Nolan et al. | |
| 6,090,363 A | 7/2000 | Green et al. | |
| 6,129,901 A | 10/2000 | Moskovits | |
| 6,139,919 A | 10/2000 | Eklund et al. | |
| 6,148,899 A | 11/2000 | Cornie et al. | |
| 6,360,809 B1 | 3/2002 | Cornie et al. | |
| 6,361,861 B2 | 3/2002 | Gao et al. | |
| 6,479,028 B1 | 11/2002 | Kaner et al. | |
| 6,776,219 B1 | 8/2004 | Cornie et al. | |
| 6,787,122 B2 | 9/2004 | Zhou | |
| 6,872,236 B1 | 3/2005 | Hwang | |
| 6,972,056 B1 | 12/2005 | Delzeit et al. | |
| 7,011,771 B2 | 3/2006 | Gao et al. | |
| 7,094,499 B1 | 8/2006 | Hung | |
| 7,160,530 B2 | 1/2007 | Dillon | |
| 7,838,708 B2 * | 11/2010 | Sherman et al. | 568/893 |
| 2001/0051367 A1 | 12/2001 | Kiang | |
| 2002/0193040 A1 * | 12/2002 | Zhou | 445/51 |
| 2004/0232073 A1 | 11/2004 | Papadimitrakopoulos | |
| 2005/0089684 A1 * | 4/2005 | Barron et al. | 428/408 |
| 2005/0112048 A1 | 5/2005 | Tsakalakos et al. | |
| 2005/0215049 A1 | 9/2005 | Horibe et al. | |
| 2006/0165988 A1 | 7/2006 | Chiang et al. | |
| 2008/0003182 A1 * | 1/2008 | Wilson et al. | 424/9.32 |
| 2009/0072192 A1 * | 3/2009 | Seal et al. | 252/182.33 |

FOREIGN PATENT DOCUMENTS

| | | |
|---|---|---|
| EP | 1401763 B1 | 3/2004 |
| EP | 1433515 A | 6/2004 |
| JP | 2003-286016 | 10/2003 |
| JP | 2004-67499 A1 | 3/2004 |
| JP | 06-227806 | 8/2004 |
| JP | 2005-255448 A1 | 9/2005 |
| WO | WO 9609246 A1 | 3/1996 |
| WO | WO 01/16023 A1 | 3/2001 |
| WO | WO2005/005687 A1 * | 1/2005 |
| WO | WO 2005/071136 | 8/2005 |

OTHER PUBLICATIONS

Satishkumar et al. ("Novel experiments with carbon nanotubes: opening, filling, closing and functionalizing nanotubes" JPhys B, vol. 29, pp. 4925-4934, 1999.).*

Banhart F. et al., "Metal Atoms in Carbon Nanotubes and Related Nanoparticles," International Journal of Modern Physics B, World Scientific, Singapore, SG, vol. 15, No. 31, Dec. 20, 2001, pp. 4037-4069.

Bao J. et al., "A Facile Method for Creating an Array of Metal-Filled Carbon Nanotubes," Advanced Materials, Wiley-VCH, Weinheim, DE, vol. 14, No. 20, Oct. 16, 2002, pp. 1483-1486.

Barthos R. et al., "Functionalization of single-walled carbon nanotubes by using alkyl-halides," Carbon, Elsevier, vol. 43, No. 2, 2005, pp. 321-325.

Cepak Veronica M. et al., "Fabrication and characterization of concentric-tubular composite micro- and nanostructures using the template-synthesis method," Journal of Materials Research, vol. 13, No. 11, Nov. 1998, pp. 3070-3080.

Grobert N. et al., "Allow nanowires: Invar inside carbon nanotubes," Chemical Communication, Feb. 19, 2001, pp. 471-472.

Jin Zhao-xia et al., "A preferentially ordered accumulation of bromine on multi-wall carbon nanotubes," Carbon, Elsevier, Oxford, GB, vol. 38, No. 8, 2000, pp. 1135-1139.

Li et al., "Simulations of optical properties of aligned metal filled carbon nanotube embedded in an insulating medium," Materials Letters, North Holland Publishing Company, Amsterdam, NL, vol. 59, No. 27, Nov. 2005, pp. 3445-3447.

International Search Report for PCT/US2007/067672, mailed Nov. 11, 2008.

Bachilo, et al., "Narrow (n,m)-Distribution of Single-Walled Carbon Nanotubes Grown Using a Solid Supported Catalyst", J. Am. Chem. Soc. 125, 11186-11187 (2003).

Baughman, et al., "Carbon Nanotubes—the Route Toward Applications", Science vol. 297, pp. 787-792 (2002).

Bendiab, N., "Structural determination of iodine localization in single-walled carbon nanotube bundles by diffraction methods", Physical Review B 69, 195415 (2004).

Brown, et al. "Electron beam induced in situ clusterisation of 1D ZrCl4 chains within single-walled carbon nanotubes" Chem. Comm., 845-846 (2001).

Brown, et al. "High yield incorporation and washing properties of halides incorporated into single walled carbon nanotubes", Appl. Phys., vol. 76, pp. 457-462 (2003).

Bewer, "Reduction of Graphite-Metal Chloride Intercalation Compounds" Mater. Sci. Eng., 31, 73-76 (1977).

Chai, et al. "Fullerenes with Metals Inside", J. Phys. Chem. 95, 7564-7568 (1991).

Chancolon, Jerome, "Filling of Carbon Nanotubes with Selenium by Vapor Phase Process", Journal of Nanoscience and Nanotechnology, vol. 6, 82-86 (2006).

Che, et al. "Metal-Nanocluster-Filled Carbon Nanotubes: Catalytic Properties and Possible Applications in Electrochemical Energy Storage and Production" Langmuir 15, 750-758 (1999).

Chen, et al., Supporting Documentation re Halogenation method, American Chemical Society, Nano Lett., (2003).

Chen, Zhihong, "Bulk Separative Enrichment in Metallic or Semi-conducting Single-Walled Carbon Nanotubes", Nano Letters vol. 3, No. 9 (2003).

Chu, et al. "Filling of Carbon Nanotubes with Silver, Gold, and Gold Chloride" Chem. Mater., vol. 8, pp. 2751-2754 (1996).

Dai, et al. "Synthesis and Characterization of Carbide Nanorods" Nature, vol. 375, p. 769-772 (1995).

Dresselhaus, et al, "Intercalation Compounds of Graphite", Advances in Physics, vol. 30, No. 2, pp. 139-326 (1981).

Ebert, "Intercalation Compounds of Graphite" Annu. Rev. Mater. Sci. vol. 6, pp. 181-211 (1976).

Fagan, "Titanium Monomers and Wires Adsorbed on Carbon Nanotubes: A First Principles Study", Nanotechnology, vol. 17, pp. 1154-1159 (2006).

Fan, et al., "Atomic Arrangement of Iodine Atoms inside Single-Walled Carbon Nanotubes", Phys. Rev. Lett. 84, 4621-4624 (2000).

Fantini, C., "Optical Transition Energies for Carbon Nanotubes from Resonant Raman Spectroscopy: Environment and Temperature Effects", Physical Review Letters, vol. 93, No. 14 (2004).

Gogotsi (Editor) "Nanomaterials Handbook", CRC Taylor & Francis, New York (2006). (Table of Contents).

Govindaraj, et al. "Metal Nanowires and Interclatated Metal Layers in Single-Walled Carbon Nanotube Bundles" Chem. Mater. vol. 12, pp. 202-205 (2000).

Grigorian, et al. "Giant thermopower in carbon nanotubes: A one-dimensional Kondo system", Phys. Rev. B, vol. 60, pp. R11309-R11312 (1999).

Grigorian, et al. "Reversible Intercalation of Charged Iodine Chains into Carbon Nanotube Ropes" Phys. Rev. Lett. vol. 80, No. 25, pp. 5560-5563 (1998).

Guerret-Plecourt, et al. "Relation between Metal Electronic Structure and Morphology of Metal Compounds Inside Carbon Nanotubes" Nature, vol. 372, pp. 761-765 (1994).

Huh, et al. "Opening and reversible filling of single-walled carbon nanotubes with various materials" J. Nanosci. Nanotech, 6(11), 3360-3363 (2006).

Jacquemin, R., "Doping mechanism in single-wall carbon nanotubes studies by optical absorption", Synthetic Metals 115, 283-287 (2000).

Jorio, A., "Quantifying carbon-nanotube species with resonance Raman scaterring", Physical Review B 72, 075207 (2005).

Kiang, et al. "Molecular Nanowires of 1 nm Diameter from Capillary Filling of Single-Walled Carbon Nanotubes" J. Phys. Chem. B, vol. 103, pp. 7449-7451 (1999).

Lohse, "Raman spectroscopy as a tool to study TiC formation during controlled ball milling", J. Appl. Phys., vol. 97, pp. 114912-1 to 114912-7 (2005).

Minami, Nobutsugu, "Cellulose derivatives as excellent dispersants for single-wall carbon nanotubes as demonstrated by absorption and photoluminescence spectroscopy", Applied Physics Letters 88, 093123 (2006).

Monthioux, "Filling single-wall carbon nanotubes" Carbon 40, 1809-1823 (2002).

Monthioux, et al. "Hybrid carbon nanotubes: Strategy, progress, and perspectives" J. Mater. Res., vol. 21, No. 11, pp. 2774-2793 (2006).

O'Connell (Editor) "Carbon Nanotubes—Properties and Applications", CRC Taylor & Francis, New York (2006). (Table of Contents).

O'Connell, Michael J., "Band Gap Fluorescence from Individual Single-Walled Carbon Nanotubes", Science, vol. 297, (2002).

Ohno, et al. "Metal-overlayer Formation on $C_{60}$ for Ti, Cr, Au, La, and In: Dependence on metal-$C_{60}$ bonding" Physical Review B, vol. 47 (4), pp. 2389-2393 (1993).

Philp, et al. "An encapsulated helical one-dimensional cobalt iodide nanostructure" nature materials, vol. 2, pp. 788-791 (2003).

Rao, A.M., et al., "Diameter-Selective Raman Scattering from Vibrational Modes in Carbon Nanotubes", Science 275, 187 (1997).

Sekine et al. "Magnetic Behavior and structure of the Halogen-Doped fullerene $C_{60}$" J. Appl. Phys. 72(11), p. 5448 (1992).

Sloan, et al. "The opening and filling of single walled carbon nanotubes (SWTs)" Chem. Comm., pp. 347-348 (1998).

Sloan, et al. "Capillarity and silver nanowire formation observed in single walled carbon nanotubes" Chem. Comm., 699-700 (1999).

Sloan, et al. "Structural changes induced in nanocrystals of binary compounds confined within single walled carbon nanotubes: a brief review" Inorganica Chimica Acta 330, 1-12 (2002).

Sloan, et al. "Integral atomic layer architectures of 1D crystals inserted into single walled carbon nanotubes" Chem. Comm., 1319-1332 (2002).

Spengler, "Raman Scattering, Superconductivity, and Phonon Density of States of Stoichiometric and Non-stoichiometric TiN", Physical Review B, vol. 17, No. 3, pp. 1095-1101 (1978).

Stumpp, "The Intercalation of Metal Chlorides and Bromides into Graphite", Materials Science and Engineering, 31, pp. 53-59 (1977).

Tsang, et al. "A Simple Chemical Method of Opening and Filling Carbon Nanotubes" Nature, vol. 372, pp. 159-162 (1994).

Ugarte, et al. "Nanocapillarity and Chemistry in Carbon Nanotubes" Science, vol. 274, pp. 1897-1899 (1996).

Vol'pin, et al. "Lamellar Compounds of Graphite with Transition Metals" J. Am. Chem. Soc. vol. 97, pp. 3366-3373 (1975).

Xu, et al. "1D lanthanide halide crystals inserted into single-walled carbon nanotubes" Chem. Commun., 2427-2428 (2000).

Yildirim, "Titanium-Decorated Carbon Nanotubes as a Potential High-Capacity Hydrogen Storage Medium", Physical Review Letters, vol. 94, pp. 175501-1 to 175501-4 (2005).

Yu, et al., "Structural Assignments and Chirality Dependence in Single-Wall Carbon Nanotube Raman Scattering", J. Phys. Chem. B, 105, 6831-6837 (2001).

Zhang, et al. "Metal coating on suspended carbon nanotubes and its implication to metal-tube interaction" Chemical Physics Letters 331, 35-41 (2000).

Zhang, et al. "Formation of metal nanowires on suspended single-walled carbon" Appl. Phys. Lett., vol. 77, No. 19, pp. 3015-3017, (2000).

Zhu, et al. "Intercalation of Solid $C_{60}$ with Iodine" Nature, vol. 355, p. 712 (1992).

* cited by examiner

ORGANIZED CARBON AND NON-CARBON ASSEMBLY AND METHODS OF MAKING

This application claims priority to U.S. Provisional Patent Application Ser. Nos. 60/796,399 filed May 1, 2006, 60/808,096 filed May 24, 2006, 60/842,281 filed Sep. 5, 2006, 60/842,543 filed Sep. 6, 2006, and 60/874,876 filed Dec. 14, 2006, all of which are incorporated herein by reference.

TECHNICAL FIELD

This invention relates generally to organized assemblies of carbon and non-carbon compounds. This invention further relates to methods of making such organized structures. In preferred embodiments, the organized structures of the instant invention are made up of nanorods or their aggregate forms. This invention is further drawn to the separation of single-wall carbon nanotubes. In particular, it relates to the separation of semiconducting single-wall carbon nanotubes from conducting (or metallic) single-wall carbon nanotubes. It also relates to the separation of single-wall carbon nanotubes according to their chirality and/or diameter.

BACKGROUND OF THE INVENTION

There are numerous potential applications of carbon nanotubes (CNTs) because of their unique mechanical, physical, electrical, chemical, and biological properties. For example, ultra low resistance conductors, semiconductors, highly efficient electron emitters, ultra-strong lightweight fibers for structural applications, lasers, and gas sensors can all be manufactured by using CNTs. For reviews of CNT technology, properties, and applications, see Baughman et al., "Carbon Nanotubes—the Route Toward Applications", Science, volume 297, pages 787-792 (2002); Michael J. O'Connell (Editor) "Carbon Nanotubes—Properties and Applications", CRC Taylor & Francis, New York (2006); Yury Gogotsi (Editor) "Nanomaterials Handbook", CRC Taylor & Francis, New York (2006).

The incorporation of non-carbon materials into CNTs may lead to even more diverse range of applications, for example, in improved gaseous storage media or electronic devices. In a publication entitled "Titanium-Decorated Carbon Nanotubes as a Potential High-Capacity Hydrogen Storage Medium", Physical Review Letters, 2005, Vol. 94, article 175501, Yildirim et al. described that each titanium atom adsorbed on a single-wall CNT (SWCNT) may theoretically bind up to four hydrogen molecules. Thus, high-capacity hydrogen storage equipment may be prepared from such materials, if they were available.

A variety of synthesis techniques for preparing CNTs exist. These techniques include for example carbon arc, laser ablation, chemical vapor deposition, high pressure carbon monoxide process (HiPco), cobalt-molybdenum catalyst process (CoMoCat). Depending on the preparation method, CNTs may be metallic and semiconducting. To improve electrical conductivity of semiconducting CNTs, non-carbon materials such as metals can be incorporated into CNTs for their conversion into conducting materials.

In a publication entitled "Titanium Monomers and Wires Adsorbed on Carbon Nanotubes: A First Principles Study," Nanotechnology, 2006, Vol. 17, pages 1154-1159, Fagan et al. described that a metallic Ti-wire/tube system may potentially be obtained by incorporating titanium in a semiconductor SWCNT. As a result, the electrical conductivity of such materials may reach to a level comparable or even surpassing that of copper. Such materials, if available, may aid in the advance of electronic applications. Fagan et al. also described that the Ti monomer or wire adsorbed into a SWCNT could be more stable than that adsorbed on outside surface of the SWCNT.

Gao et al. in U.S. Pat. Nos. 6,361,861 and 7,011,771 hypothesized the formation of titanium carbide, silicon carbide, and tantalum carbide core in carbon nanotubes. They disclosed a method by which TiC filled CNTs were grown on a growth catalyst and a titanium substrate. Energy Dispersive X-Ray (EDX) analysis of the nanorods thereby prepared revealed that the cores are cubic TiC.

In a publication entitled "Synthesis and Characterization of Carbide Nanorods," Nature, 1995, vol. 375, pages 769-772, Dai et al. described that when TiO or Ti+$I_2$ were reacted with carbon nanotubes, TiC nanorods were obtained. These nanorods were analyzed by X-Ray Diffraction (XRD) and found no evidence for presence of graphitic (nanotube), Ti-metal or Ti-oxide peaks.

Guerret-Plecourt et al. in a publication entitled "Relation between Metal Electronic Structure and Morphology of Metal Compounds Inside Carbon Nanotubes" Nature, 1994, vol. 372, pages 761-765, the arc-discharge method also yielded only TiC filled CNTs.

Nagy et al. in a European Patent No. 1 401 763 B1 disclosed preparation of carbon nanotubes on $Ti(OH)_4$ supported Fe—Co catalysts. The MWCNTs thereby prepared were later purified and then analyzed by Proton Induced Gamma Ray Emission and Proton Induced X-ray Emission. Nagy et al. found no evidence for incorporation of Ti in the carbon nanotubes. Thus, previous attempts to fill CNTs with titanium compounds either failed or resulted in formation of TiC.

Formation of metal carbides during incorporation of non-carbon materials may alter the structure of CNTs, resulting in articles with poor electronic, thermal, chemical and mechanical properties or articles with properties different than those targeted. Therefore, this formation should be limited in order to obtain articles with desired properties.

With respect to carbon nanotube separation, the as-synthesized SWCNTs using the existing techniques are not pure. They may comprise amorphous carbon and metal catalysts. The as-synthesized SWCNTs may further comprise metallic and semiconducting carbon nanotubes. Semiconducting SWCNTs are hereafter abbreviated as s-SWCNTs and metallic SWCNTs as m-SWCNTs. The as-synthesized SWCNTs may also comprise carbon nanotubes with a variety of diameters. The relative amount of each component present in as-synthesized SWCNTs depends on the synthesis process used.

To utilize their unique properties, the as-synthesized SWCNTs should be separated into their components. For example, it may be required to remove the amorphous carbon and the catalyst from the as-synthesized SWCNTs to utilize their electric properties. Further separation according to their electrical conductivities, which depend on their chiralities and diameters, may also be required if the application is of semiconducting or conducting type. For example, the use of SWCNTs as transistor channels requires s-SWCNTs and the use of SWCNTs as conductors for on-chip connects requires m-SWCNTs. Furthermore, the semiconductor properties also depend on the diameter of SWCNTs. Their semiconductor band-gaps decrease with increasing diameter. If they comprise s-SWCNTs with varying diameters, they will have a band-gap varying in a wide range. Thus, separation of SWCNTs according to their diameters may yield s-SWCNTs with semiconductor band-gaps varying in a narrower and better defined range, making them suitable for electronic devices based on Schottky barriers.

In sum, there exists a need for new or improved carbon nanotube materials with greater purity and superior performance and methods of making these materials. Also needed are practical separation procedures to prepare SWCNTs containing size-specific and/or chiral-specific populations. A size or chirality enriched population of SWCNTs is useful in the preparation and manufacture of commercial products or components thereof. They can also be used as intermediates for preparing other desired products.

SUMMARY OF THE INVENTION

Figure 1:
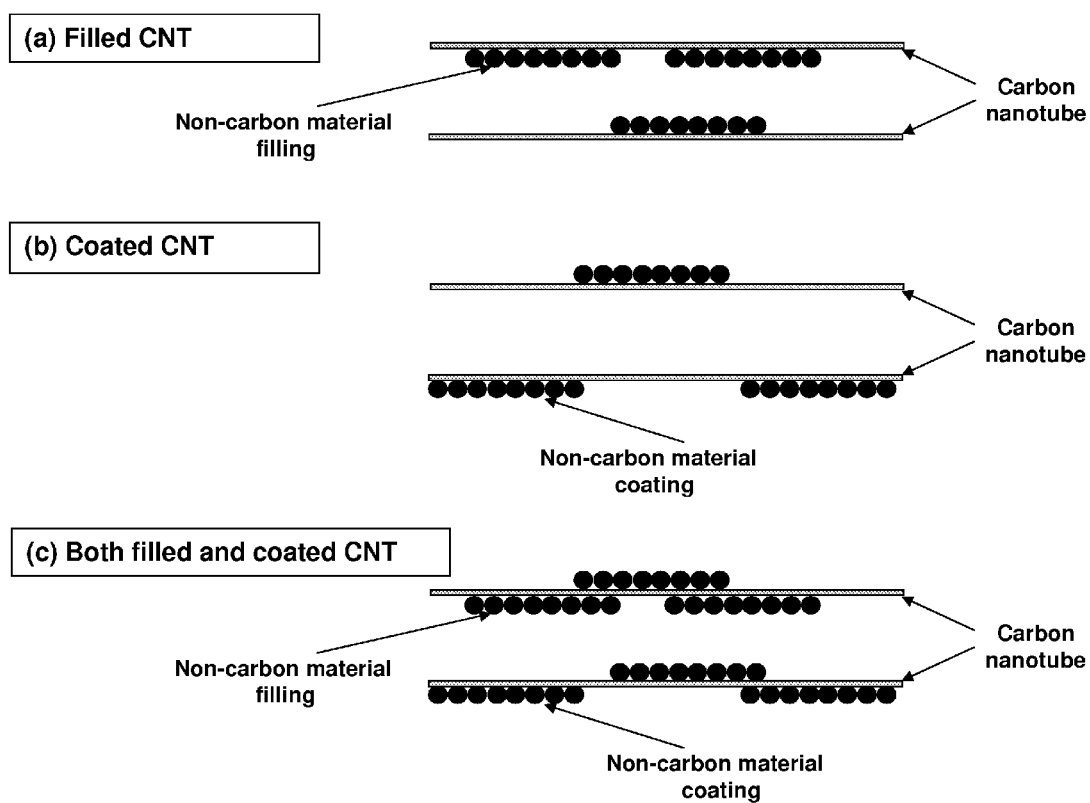
FIG. 1 is a schematic diagram of the types of the organized carbon and non-carbon assembly of the instant invention.

This invention is directed to an organized carbon and non-carbon assembly. At a microscopic level, this assembly contains one or more repeating units that are shorter in one dimension, typically shorter than 1000 nm. This dimension may also be shorter than 100 nm or even shorter than 10 nm. A repeating unit may be partially hollow. For example, the empty portion of the core may be less than 95, 75, 50, 25, or 10 volume percent. In a preferred embodiment, a repeating unit takes the form of a nanorod.

The carbon of the instant invention may be amorphous carbon, graphite, multi-wall carbon nanotube (MWCNT), single wall carbon nanotube (SWCNT), or a mixture thereof. The non-carbon of the instant invention may be metal (or its compounds) or non-metal. Specific examples of non-carbon materials include magnesium (Mg), magnesium hydride ($MgH_2$), magnesium diboride ($MgB_2$), magnesium nitride ($Mg_3N_2$), magnesium oxide (MgO), strontium (Sr), scandium (Sc), scandium nitride (ScN), yttrium (Y), titanium (Ti), titanium hydride ($TiH_2$), titanium nitride (TiN), titanium diboride ($TiB_2$), titanium oxide ($TiO_2$), zirconium (Zr), zirconium diboride ($ZrB_2$), zirconium nitride (ZrN), hafnium (Hf), hafnium nitride (HfN), vanadium (V), vanadium diboride ($VB_2$), niobium (Nb), niobium diboride ($NbB_2$), niobium nitride (NbN), tantalum (Ta), chromium (Cr), chromium diboride ($CrB_2$), manganese (Mn), iron (Fe), cobalt (Co), nickel (Ni), palladium (Pd), platinum (Pt), boron (B), boron hydrides, boron nitride (BN), boron oxide ($B_2O_3$), or a mixture thereof.

In some preferred embodiments, an organized carbon and non-carbon assembly is a nanorod (or its aggregate form) comprising a carbon nanotube filled, coated, or both filled and coated by a metal (such as titanium, magnesium), its hydride, boride, nitride, or oxide, or a mixture (or alloy) thereof. In some embodiments, the titanium compound fills at least about 0.10, 1.00, or 4.00 weight percent of the organized assembly and the carbon nanotube and titanium compound assembly is substantially free of titanium carbide, for example, less than about 10, 1, or 0.1 volume percent of the core volume of the carbon nanotube. In other embodiments, an organized carbon and non-carbon assembly is a nanorod (or its aggregate form) comprising a carbon nanotube filled, coated, or both filled and coated by a non-metal (such as boron), its hydride, boride, nitride, or oxide, or a mixture thereof.

This invention also provides methods for preparing organized carbon and non-carbon assemblies. As a first step, a carbon precursor is reacted with a halogenated precursor to produce a halogenated intermediate. Halogen is then removed from the halogenated intermediate to obtain an organized carbon and non-carbon assembly. If the desired assembly contains a non-carbon hydride, nitride, oxide, or a mixture thereof, an additional step of hydrogenation, nitrogenation, and/or oxidation is used after the halogen removal step.

The carbon precursor is usually amorphous carbon, graphite, multi-wall carbon nanotube (MWCNT), single-wall carbon nanotube (SWCNT), or a mixture thereof. The halogenated precursor typically comprises a halogenated compound, such as magnesium iodide ($MgI_2$), scandium iodide ($ScI_3$), scandium bromide ($ScBr_3$), titanium iodide ($TiI_4$), titanium bromide ($TiBr_4$), vanadium iodide ($VI_3$), vanadium bromide ($VBr_3$), iron iodide ($FeI_2$), cobalt iodide ($CoI_2$), nickel iodide ($NiI_2$), palladium iodide ($PdI_2$), platinum iodide ($PtI_2$), boron iodide ($BI_3$), or a mixture thereof. The amount of the halogenated compound in the halogenated precursor is at least 0.001 weight %. In other embodiments, the amount of the halogenated compound in the halogenated precursor is at least 0.01 weight %, 0.1 weight %, 1 weight %, 10 weight %, 50 weight %, or 80 weight %.

In another embodiment, the halogenated precursor further comprises a halogen. The halogen is typically iodine, bromine, an interhalogen compound (such as IBr, $ICl_3$, $BrF_3$), or a mixture thereof. The amount of halogen in halogenated precursor may be at least 0.001 weight %. In other embodiments, the amount of halogen in halogenated precursor may be at least 0.01 weight %, 0.1 weight %, 1 weight %, 10 weight %, 50 weight %, or 80 weight %. The ratio of non-carbon material present in the halogenated precursor to carbon present in the carbon precursor may be at least 0.01 weight %. In other embodiments, the ratio of non-carbon material present in the halogenated precursor to carbon present in the carbon precursor may be 0.01 weight %, 0.1 weight %, 1 weight %, 10 weight %, or 25 weight %. In some embodiments, a halogenated precursor may comprise more than one type of halogenated precursors. In other embodiments, a carbon precursor may comprise more than one type of carbon precursors.

The reaction between a carbon precursor and a halogenated precursor may occur at a temperature at which the halogenated precursor is a liquid. Typically, the reaction temperature is at or above the melting temperature of a halogenated precursor. In one embodiment, the carbon precursor and the halogenated precursor may be reacted at a temperature above 100° C., 150° C., or 200° C. for a period longer than 1 minute, 10 minutes, or 20 minutes. After the reaction between a carbon precursor and a halogenated precursor, a halogenated intermediate is produced.

Subsequently, halogen is removed from the halogenated intermediate. The halogen removal step may utilize a suitable method to reduce the halogen content below 10 weight %. An effective method involves heating the halogenated intermediate at a temperature for a sufficiently long period. For example, the halogen removal step may be carried out at a temperature above 200° C., 300° C., 500° C., or 800° C. for a period longer than 5 minutes, 10 minutes, 30 minutes, or 1 hour. In one embodiment, this heating may be carried out in a gas mixture comprising hydrogen at a temperature for a period sufficient enough to reduce the halogen content of the articles below 10 weight %. For example, the halogen removal step may be carried out in a gas mixture comprising at least 0.01 volume % or 1 volume % hydrogen at a temperature above 200° C., 300° C., 500° C., or 800° C. for a period longer than 5 minutes, 10 minutes, 30 minutes, or 1 hour. The heating may be carried out below 1 atmosphere pressure.

In one embodiment, filled and coated carbon nanotubes (such as Ti filled and coated SWCNTs) may be prepared by both filling and coating the carbon nanotube cores by the halogenated non-carbon precursor (such as a mixture of $TiI_4$ and $I_2$), followed by the removal of halogen.

In another embodiment, coated carbon nanotubes (such as Ti coated SWCNTs) may be prepared by coating but not filling the carbon nanotube cores by the halogenated non-carbon precursor (such as a mixture of $TiI_4$ and $I_2$), and then removing the halogen. This is achieved by selecting nanotubes having core sizes smaller than the size of the halogenated precursor.

In yet another embodiment, the non-carbon filled carbon nanotubes (such as Ti filled SWCNTs) may be prepared by washing the halogenated compound coated and filled carbon nanotubes with a suitable solvent (such as ethanol). This washing removes the halogenated compound coating, but not the filling at the carbon nanotube core. Then, after the halogen removal, non-carbon filled carbon nanotubes (such as Ti filled SWCNTs) are obtained.

The present invention is further directed to a method for growing an organized assembly of carbon and the non-carbon and the product prepared by this method. More specifically, this method comprises the steps of selecting a substrate, depositing a metal-layer on the substrate, and growing the organized assembly of the carbon and the non-carbon material on the metal-layer in an environment containing an alcohol. In some preferred embodiments, the substrate may comprise silicon or glass and the metal-layer may comprise titanium nitride. A chemical environment having ethanol or additionally having hydrogen may be the preferred growth environment.

In some embodiments, growing organized carbon and the non-carbon assembly may further include depositing a catalyst-layer on the metal-layer. The catalyst-layer may comprise iron. The catalyst-layer may be heat-treated in an environment comprising hydrogen but not any alcohol.

The present invention is further directed to a method of separating SWCNTs, comprising the steps of halogenating SWCNTs, dispersing the halogenated SWCNTs in a medium, and centrifuging the dispersed SWCNTs to obtain a supernatant and a precipitate phase. In some embodiments, more than about 85% or 95% of the SWCNTs in the supernatant may have a diameter larger than a predetermined size. In other embodiments, the enrichment of a population of SWCNTs with respect to chirality or diameter in the supernatant may be a factor of at least about 2.0 or 3.0 compared to the precipitate phase or at least a factor of about 3.0 or 4.0 compared to the starting form of SWCNTs. In addition, the population of SWCNTs in the precipitate phase may be a factor of at least about 2.0 or 3.0 compared to the starting form of SWCNTs. In a preferred embodiment, the halogen is preferentially intercalated in the cores of SWCNTs.

The halogenation step may further include the step of incorporating SWCNTs by a halogen such as iodine, bromine, chlorine, fluorine, interhalogen compounds (such as IBr, $ICl_3$, $BrF_3$), and mixtures thereof. Preferably, the halogen includes iodine, bromine, interhalogen compounds, and mixtures thereof.

The halogenation step may additionally include the step of (1) soaking SWCNTs in molten halogens; (2) adding solutions that contain halogens to SWCNT dispersions; (3) using halogen vapor or gas; or (4) a combination of these steps.

The dispersion step may further include (1) high shear processing of the SWCNTs in a medium such as a liquid; (2) using surfactants; (3) using carboxy functionalization; (4) using cellulose derivatives; or (5) a combination of these steps. Preferably, the dispersion step further includes first preparing a dispersion of the SWCNTs in a medium such as a liquid and then further dispersing them in the same medium by high-shear processing. More preferably, the medium contains a surfactant. The suitable surfactant may include nonionic or ionic surfactant. Preferably, the surfactant may contain alkyldiphenyloxide disulfonate salts, C12/C14-fatty acidethylenediamidethersulfate, cetyltrimethylammonium bromide, disodium dodecylphenoxybenzene disulfonate, hexadecyltrimethylammonium p-toluenesulfonate, n-hexadecyl diphenyloxide disodium disulfonate, octyl phenol ethoxylate, poly(ethylene oxide) (20) sorbitan mono-oleate, sodium cholate, sodium diisopropylnaphthalene sulfonate, sodium 2-(1-carboxylatoethoxy)-1-methyl-2-oxoethyl laurate, sodium dodecyl sulfate, sodium dodecylbenzene sulfonate, Surfynol, N-alkylamines, and their mixtures.

The dispersion step may further comprise using a medium that does not permanently destroy electronic properties of the SWCNTs. Preferably, the medium may include water, heavy water, dimethylformamide, dimethylacetamide, formamide, methyl formamide, hexamethylene phosphoramide, dimethylsulfoxide, liquid ammonia, diethylamine, tetrahydrofuran, and mixtures thereof.

The centrifugation step may further comprise centrifuging at a high speed. Preferably, the centrifugal force is higher than about 10,000 g, or more preferably, higher than about 20,000 g. The centrifugation may continue for longer than 1 hour, preferably longer than 10 hours, or more preferably longer than 20 hours.

In one embodiment, the present invention may further comprise treating halogenated SWCNTs with heat to remove the halogen from the SWCNTs.

In another embodiment, the present invention may comprise treating the supernatant and/or the precipitate phases to remove the medium, the surfactant, and/or the halogen.

In yet another embodiment, the present invention may further comprise a sonication step.

The present invention is also directed to the size or chirality enriched SWCNTs separated by the process described herein.

DETAILED DESCRIPTION OF THE INVENTION

I. Organized Carbon and Non-Carbon Assembly

This invention is directed to organized assemblies of carbon and non-carbon materials. These organized structures are made up of one or more types of a repeating unit and may adopt different shapes, such as a rod, spherical, semi-spherical, or egg shape. At least one dimension of the repeating unit is typically smaller than 1000 nm, preferably smaller than 100 nm, or more preferably smaller than 10 nm. A cross-section of a repeating unit may resemble a circular, oval, or rectangular shape. Typically, individual repeating units (or different types of repeating units) aggregate to nanometer size fragments. In a preferred embodiment, a repeating unit of this invention may be a nanorod comprising nanocarbon and non-carbon materials.

Many forms of carbon are suitable for this invention. These forms of carbon include for example amorphous carbon, graphite, MWCNT, SWCNT, or a mixture thereof. In preferred embodiments of this invention, the carbon may be MWCNT, SWCNT, or a mixture thereof.

Many non-carbon materials are suitable for this invention. For example, a non-carbon material may comprise a metal, metal like compound, metal nitride, metal oxide, metal hydride, metal boride, mixture, or alloy thereof. Some examples of a non-carbon material include magnesium (Mg), magnesium hydride ($MgH_2$), magnesium diboride ($MgB_2$), magnesium nitride ($Mg_3N_2$), magnesium oxide (MgO), strontium (Sr), scandium (Sc), scandium nitride (ScN), yttrium (Y), titanium (Ti), titanium hydride ($TiH_2$), titanium nitride (TiN), titanium diboride ($TiB_2$), titanium oxide ($TiO_2$), zirconium (Zr), zirconium diboride ($ZrB_2$), zirconium nitride (ZrN), hafnium (Hf), hafnium nitride (HfN), vanadium (V), vanadium diboride ($VB_2$), niobium (Nb), niobium diboride ($NbB_2$), niobium nitride (NbN), tantalum (Ta), chromium (Cr), chromium diboride ($CrB_2$), manganese (Mn), iron (Fe), cobalt (Co), nickel (Ni), palladium (Pd), platinum (Pt), boron (B), boron hydrides, boron nitride (BN), boron oxide ($B_2O_3$) and a mixture (or alloy) thereof. Non-stoichiometric compounds of the non-carbon material are also within the scope of this invention. In addition, the non-carbon material may be amorphous or crystalline. The crystalline form could be distorted, for example by having deficiencies in the crystal structure. In the instant invention, the non-carbon material does not comprise a halogen and/or a halogenated compound.

In one embodiment, this invention is directed to an organized carbon and non-carbon assembly comprising a carbon nanotube filled with a titanium compound that is substantially free of titanium carbide. For example, the titanium carbide amount may be less than 10, 1, or 0.1 volume percent of the core volume of the carbon nanotube. A titanium compound may be titanium, titanium hydride, boride, nitride, oxide or a mixture thereof. In particular, a titanium compound may be abbreviated with a formula $TiH_wB_xN_yO_z$, where w varies in the range of 0 to 2, x varies in the range of 0 to 2, y varies in the range of 0 to 1, and z varies in the range of 0 to 2. Non-stoichiometric titanium compounds are also within the scope of this invention. For example, the titanium compound may be $TiO_{1.300}$.

In another embodiment of this invention, a non-carbon material comprises a magnesium compound. A magnesium compound may be magnesium, magnesium hydride, boride, nitride, oxide or a mixture thereof. In particular, a magnesium compound may be abbreviated with a formula $MgH_aB_bN_cO_d$, where a varies in the range of 0 to 2, b varies in the range of 0 to 2, c varies in the range of 0 to ⅔, and d varies in the range of 0 to 1. Non-stoichiometric magnesium compounds are also within the scope of this invention. For example, the magnesium compound may be $MgO_{0.500}$.

In yet another embodiment of this invention, a non-carbon material comprises a boron compound. A boron compound may be boron, boron hydride, nitride, oxide or a mixture thereof. In particular, a boron compound may be abbreviated with a formula $BH_{a'}N_{b'}O_{c'}$, where a' varies in the range of 0 to 3, b' varies in the range of 0 to 1, and c' varies in the range of 0 to 1.5. Non-stoichiometric boron compounds are also within the scope of this invention. For example, the boron compound may be $BO_{1.200}$.

The organized assembly of this invention contains only a limited amount of metal carbides, such as titanium carbide, silicon carbide, vanadium carbide, tantalum carbide or a mixture thereof. The metal carbide may be in any form. It may be in a form of coating, filling or coating and filling. The metal carbide may also be incorporated to the carbon structure of the carbon nanotube. The amount of metal carbide may be less than 10 volume percent of the core volume of the carbon nanotube. The presence and amount of metal carbides may be determined by using techniques such as XRD, EDX and Raman spectroscopy.

As a repeating unit, the non-carbon material may fill, coat, or both fill and coat the carbon nanotube (CNT). These three cases are schematically shown in FIG. 1(a) to (c). In the first case shown in FIG. 1(a), the non-carbon material fills the core of the CNT. The articles of the first case are abbreviated hereafter as "non-carbon material filled carbon," for example, as Ti filled SWCNTs. In the second case shown in FIG. 1(b), the non-carbon material coats the CNT. The articles of this case are hereafter abbreviated as "non-carbon material coated carbon," for example, as Ti coated SWCNTs. In the third case shown in FIG. 1(c), the non-carbon material both fills and coats the CNT. The articles of this case are hereafter abbreviated as "non-carbon material filled and coated carbon," for example, as Ti filled and coated SWCNTs.

The non-carbon material coated or filled and coated carbon repeating unit may be particularly suitable for preparation of metal matrix composites. For example, the composites comprising organized assemblies of the instant invention (such as Ti coated SWCNTs, Ti filled and coated SWCNTs) with metals such as aluminum (Al), magnesium (Mg), copper (Cu), steel, and titanium (Ti) may be prepared. Available methods such as gravity casting, permanent mold casting, die casting, squeeze casting, investment mold casting and infiltration casting may be used to prepare such metal matrix composites. The pressure infiltration casting method disclosed in U.S. Pat. Nos. 6,148,899, 6,360,809, and 6,776,219 to Cornie et al. may be particularly useful for preparation of such composites.

Further, the core of a repeating unit, for example the core of a SWCNT, may be partially empty. The empty portion of the core may be in average less than 95, 75, 50, 25, or volume percent. The volume of the empty space may be determined by using High-Resolution Transmission Electron Microscopy (HRTEM). The technique of observation of CNTs by HRTEM is explained in various publications such as in Brown et al. "High yield incorporation and washing properties of halides incorporated into single walled carbon nanotubes", Appl. Phys., 2003, Vol. 76, pages 457-462 and Sloan et al. "Integral atomic layer architectures of 1D crystals inserted into single walled carbon nanotubes", Chem. Comm., 2002, pages 1319-1332.

The coating, filling, or coating and filling by the non-carbon material may have a continuous or non-continuous form. For example, they may be in the form of a continuous film deposited on the outer or inner surface of a SWCNT, islands deposited on the outer or inner surface of a SWCNT, beads deposited on the surface of a SWCNT, or particulates deposited in the core of a SWCNT. The filling and/or coating may distort the shape of the CNT. For example, non-circular tubes may be obtained as a result of such distortion.

The amount of filling and/or coating by the non-carbon material may be determined by a thermo-gravimetric analysis (TGA) technique as follows. First, a non-carbon material is incorporated to a CNT article. Then, this article is inspected by a microscopic technique such as high resolution transmission electron microscopy (HRTEM) or high resolution scanning electron microscopy (HRSEM) to qualitatively determine that whether the incorporation filled and/or coated the material. Finally, this article is heated in air to a predetermined temperature range to remove the carbon. Weight decrease during this heating is measured by a balance. Similarly, starting CNTs are also heated in air and their weight decrease is determined. The difference between the weight decrease for the organized assembly and the weight decrease for the starting CNT is treated as the amount of incorporation of the non-carbon material. If there is only filling, this technique yields the filling amount.

If the microscopy indicates that there is a coating, this coating is removed before the heating in air to determine the filling amount. The coating removal may be achieved by washing the article with a suitable liquid, such as an organic solvent, acid or base. For example, alcohols, nitric acid, HCl or like may be used to remove the coating. Success of removal may be qualitatively determined by the microscopy. Steps of washing, microscopic inspection and determination of the weight decrease by heating in air may be repeated several times to ensure that the coating is adequately removed.

An article comprising a coating of the non-carbon material may also be heated in air. The difference between the weight decrease of the article comprising a coating of the non-carbon material and the weight decrease of the same article after the removal of the coating yields the amount of the coating.

The organized assembly may contain metal carbides. Their presence and amount may be determined by using techniques such as XRD, EDX and Raman spectroscopy. If the metal carbides are found to be present after such analysis, their amount may be subtracted from the non-carbon material amount found above to determine the metal carbide free portion of the non-carbon material.

The above analysis technique is hereafter abbreviated as "the TGA based technique".

II. Halide Method

The instant invention is also directed to methods for preparing the organized assembly of carbon and non-carbon materials. In particular, this method comprises the steps of reacting a carbon precursor with a halogenated precursor to generate a halogenated intermediate and removing halogen from the halogenated intermediate to obtain the organized assembly of the carbon and the non-carbon materials (hereinafter "the halide method"). If the non-carbon material includes a hydride, nitride, oxide, or a mixture thereof, the method may further comprise the step of hydrogenation, nitrogenation, and/or oxidation after the halogen removal step to obtain a composition comprising (1) carbon and (2) a non-carbon hydride, boride, nitride, oxide, or a mixture thereof. In the instant invention, the non-carbon material is not a halogen.

Many forms of the carbon precursor are suitable for the halide method. In a preferred embodiment, these forms of carbon precursors comprise MWCNT, SWCNT, or a mixture thereof.

A SWCNT or MWCNT precursor suitable for this invention may be prepared by any synthesis method. Such methods may include, but are not limited to, carbon arc, laser vaporization, chemical vapor deposition (CVD), high pressure carbon monoxide process (HiPco), cobalt-molybdenum catalyst process (CoMoCat). A SWCNT precursor may be a mixture of SWCNT precursors prepared by more than one synthesis method.

In one embodiment of the halide method, the SWCNT precursor may be used as purchased. In another embodiment, amorphous carbons and/or catalysts may be removed from the as-purchased SWCNTs before the application of the disclosed method. The amorphous carbon and/or the catalyst removal may be complete or partial. Thus, a SWCNT precursor may contain any level of amorphous carbon and/or catalyst. The invention is not limited to any particular method of removing the amorphous carbon and/or the catalyst from the starting SWCNTs. As an example, the method disclosed by Delzeit et al. in U.S. Pat. No. 6,972,056 may be used for this removal.

A halogenated precursor may comprise a halogenated compound and a halogen. Examples of the halogenated compound include magnesium iodide ($MgI_2$), scandium iodide ($ScI_3$), scandium bromide ($ScBr_3$), yttrium iodide ($YI_3$), titanium iodide ($TiI_4$), titanium bromide ($TiBr_4$), vanadium iodide ($VI_3$), vanadium bromide ($VBr_3$), molybdenum iodide ($MoI_3$), manganese iodide ($MnI_2$), iron iodide ($FeI_2$), cobalt iodide ($CoI_2$), nickel iodide ($NiI_2$), palladium iodide ($PdI_2$), platinum iodide ($PtI_2$), boron iodide ($BI_3$), lead iodide ($PbI_2$), bismuth iodide ($BiI_3$) or a mixture thereof. Examples of the halogen include iodine, bromine, an interhalogen compound (such as IBr, $ICl_3$, $BrF_3$) or a mixture thereof.

Ends of the as-purchased carbon nanotubes are typically closed, i.e. they are end-capped. The end-caps may prevent direct filling of cores of the as-purchased carbon nanotubes with the non-carbon materials. In some previously disclosed filling methods, the end-caps are removed prior to the filling step by using acids such as nitric acid or by controlled oxidation at elevated temperatures. Such end-cap removal methods may cause partial or excessive removal of carbon and formation of defects, thereby degrading the useful properties of the carbon nanotubes.

The presence of the halogen in the halogenated precursor may aid in filling of the carbon nanotubes with the non-carbon materials without necessitating a separate end-cap removal step prior to the filling, thereby simplifying the process. Also, such filling may be achieved without any degradation of useful properties of the carbon nanotubes. The presence of halogen may also increase the amount of filling of carbon nanotubes by non-carbon materials, thereby improving the yield and desired properties of the organized assembly. Furthermore, the presence of halogen may decrease the viscosity of the halogenated precursor, thereby promoting better infiltration and shorter process duration.

Some halogenated compounds may have impractically high melting points (e.g., 587° C. for $FeI_2$, 780-797° C. for $NiI_2$, 613-638° C. for $MnI_2$), and if the reaction is carried out at such high temperatures, the carbon nanotubes may irreversibly be damaged, diminishing the useful properties of the organized assembly. However, incorporating halogens such as bromine with a melting point of −7.3° C. or iodine with a melting point of 113.6° C. into the halogenated precursor may substantially reduce the reaction temperature and prevent any property degradation.

Thus, there are several advantages of incorporating a halogen into the halogenated precursor, including achieving filling with no end-cap removal prior to the filling, increasing the filling yield, and reducing the reaction temperature and time.

The amount of the halogenated compound in a halogenated precursor may be at least 0.001 weight %. In other embodiments, the amount of the halogenated compound in a halogenated precursor may be at least 0.01 weight %, 0.1 weight %, 1 weight %, 10 weight %, 50 weight %, or 80 weight %. The amount of halogen in a halogenated precursor may be at least 0.001 weight %. In other embodiments, the amount of halogen in a halogenated precursor may be at least 0.01 weight %, 0.1 weight %, 1 weight %, 10 weight %, 50 weight %, or 80 weight %.

The amount of non-carbon material present in the halogenated precursor controls the amount of non-carbon material incorporated into the assembly. Thus, by varying the ratio of the non-carbon material amount to the carbon precursor, the non-carbon material content of the final composition can be varied. The ratio of non-carbon material present in the halogenated precursor to carbon present in the carbon precursor may be at least 0.01 weight %. In other embodiments, the ratio of non-carbon material present in the halogenated precursor to carbon present in the carbon precursor may be at least 1 weight %, 10 weight %, or 25 weight %.

As a first process step, a carbon precursor is reacted with a halogenated precursor. This reaction results in the incorporation of the carbon precursor with the halogenated precursor to form a halogenated intermediate. This incorporation may be in any form. For example, the halogen may be incorporated on the outer or inner surface or into the chemical structure of the carbon precursor. This incorporation may be through chemical or physical bonding.

The reaction between the carbon precursor and the halogenated precursor may occur at a temperature at which the halogenated precursor is a liquid. Typically, it is at or above the melting temperature of the halogenated precursor. In one embodiment, the carbon precursor and the halogenated precursor may be reacted at a temperature above 20° C., 100° C., 150° C., or 200° C. for a period longer than 1 minute, 10 minutes, or 20 minutes.

In an optional process step, the carbon precursor may be heated above room temperature to remove volatile compounds, such as water, before the step of reacting the carbon precursor with the halogenated precursor. The volatile compound removal may be achieved by heating the carbon precursor above 100° C. or 200° C. for a period longer than 10 minutes.

After the reaction between the carbon precursor and the halogenated precursor, a halogenated intermediate is produced.

As a second process step, the halogen is removed from the halogenated intermediate. It is expected that, during the reaction, the halogenated precursor may open the end caps of the carbon nanotubes and fill their cores, coat the carbon nanotube, or both fill (i.e., intercalate) and coat the carbon nanotube. As a result, the halogenated intermediate may contain halogen, in a free form, such as iodine, and/or in a form incorporated with the non-carbon compound, such as $TiI_4$.

The presence of the halogen in the final assembly in high quantities may deteriorate its properties as compared to the halogen free assembly. It may be necessary to reduce the halogen level, for example, below 10 weight %, to obtain a commercially viable product.

The halogen removal may be achieved by sublimation, evaporation, or thermal degradation. The halogen removal may also be achieved by reacting the halogenated intermediate with a suitable reactant, for example, hydrogen.

In particular, the halogen removal step may comprise heating the halogenated intermediate at a temperature for a period sufficient enough to reduce the halogen content of the intermediate below 10 weight %. For example, the halogen removal step may be carried out at a temperature above 200° C., 300° C., 500° C., or 800° C. for a period longer than 5 minutes, 10 minutes, 30 minutes, or 1 hour. This heating may be carried out below 1 atmosphere pressure. In one embodiment, this heating may be carried out in a gas mixture comprising hydrogen at a temperature for a period sufficient enough to reduce the halogen content of the intermediate below 10 weight %. For example, the halogen removal step may be carried out in a gas mixture comprising at least 0.01 volume % or 1 volume % hydrogen at a temperature above 200° C., 300° C., 500° C., or 800° C. for a period longer than 5 minutes, 10 minutes, 30 minutes, or 1 hour. The heating may be carried out below 1 atmosphere pressure. By adjusting these halogen removal conditions, the level of hydride formation can be controlled and as a result essentially hydride-free or partially or fully hydrogenated forms of the non-carbon material may be obtained.

After the halogen removal step, an organized assembly comprising a carbon and a non-carbon material (such as metal, metal like compound, metal boride, or a mixture thereof) is obtained. Specific examples of such non-carbon material include magnesium (Mg), magnesium diboride ($MgB_2$), strontium (Sr), scandium (Sc), yttrium (Y), titanium (Ti), titanium diboride ($TiB_2$), zirconium (Zr), zirconium diboride ($ZrB_2$), hafnium (Hf), hafnium nitride (HfN), vanadium (V), vanadium diboride ($VB_2$), niobium (Nb), niobium diboride ($NbB_2$), tantalum (Ta), chromium (Cr), chromium diboride ($CrB_2$), manganese (Mn), iron (Fe), cobalt (Co), nickel (Ni), palladium (Pd), platinum (Pt), boron (B), boron nitride (BN), and a mixture thereof.

For an organized assembly comprising (1) a carbon and (2) a non-carbon hydride, boride, nitride, oxide, or a mixture thereof, the method may further include hydrogenation, reaction with boron compounds, nitrogenation, and/or oxidation of the product after the halogen removal step. This is an optional step for some hydrides and borides. For example, if the halogen removal step is carried out in a gas mixture comprising hydrogen, the non-carbon hydrides may readily be obtained after the halogen removal without necessitating this additional step. Also, if the halogenated precursor includes a boron compound, the borides may also readily be obtained after the halogen removal step without necessitating this additional step. The hydrogenation may be carried out above room temperature in a gas mixture containing hydrogen, ammonia, or hydrazine. A preferable hydrogenation temperature is below 500° C. In one embodiment of this invention, a hydrogenation temperature in the range of 100° C. to 300° C. may also be applied. The reaction with boron compounds may be carried out by reacting the product with boron hydrides, for example $B_2H_6$, $B_5H_{11}$. The nitrogenation may be carried out above room temperature in a gas mixture containing nitrogen, ammonia, hydrazine, or a mixture thereof. The oxidation may be carried out at room temperature or above in a gas mixture containing oxygen. As a result of hydrogenation, reaction with boron compounds, nitrogenation, and/or oxidation, the assembly comprising (1) a carbon and (2) a non-carbon (such as metal) hydride, boride, nitride, oxide, or a mixture thereof is formed. Some examples of such non-carbon material include magnesium hydride ($MgH_2$), magnesium nitride ($Mg_3N_2$), magnesium oxide (MgO), scandium nitride (ScN), titanium hydride ($TiH_2$), titanium nitride (TiN), titanium oxide ($TiO_2$), zirconium nitride (ZrN), hafnium nitride (HfN), niobium nitride (NbN), boron hydrides, boron nitride (BN), boron oxide ($B_2O_3$), and a mixture thereof.

In one embodiment of the halide method, the organized assembly comprising non-carbon material filled and coated carbon, such as Ti filled and coated SWCNT may be prepared by both filling and coating the carbon nanotube by the halogenated compound. To achieve the filling, the size of the core should be larger than the size of the halogenated compound. For example, a halogenated compound, $TiI_4$ has a size of about 1 nm. During the halogenation reaction, this compound can fill the cores of SWCNTs that have inner diameters larger than 1 nm. Thus, for example, since the SWCNTs prepared by the carbon arc process have inner diameters larger than 1 nm, these carbon precursors may be both filled and coated with $TiI_4$ and after the removal of iodine, Ti filled and coated SWCNTs are generated.

In another embodiment of the halide method, the non-carbon material coated carbon, such as Ti coated SWCNTs may be prepared by coating the carbon nanotube by the halogenated compound. To achieve the coating but not filling, the size of the core should be smaller than the size of the halogenated compound. For example, a halogenated compound $TiI_4$ has a size of about 1 nm and the SWCNTs prepared by CoMoCat process have inner diameters smaller than 1 nm. Then, it is expected that during the halogenation reaction, $TiI_4$ can coat but not fill the cores of these SWCNTs. As a result, after the iodine removal, Ti coated SWCNTs may be produced.

In yet another embodiment of the halide method, the non-carbon material filled carbon, such as Ti filled SWCNTs may be prepared by washing the halogenated compound coated and filled carbon nanotubes with a suitable solvent, such as ethanol. This washing may remove the halogenated compound coating, but not the filling at the carbon nanotube core. Then, after the halogen removal, Ti filled SWCNTs are produced. This washing may completely remove the halogenated compound coating if a suitable solvent is used and/or if the solvent washing step is repeated several times. This washing may also partially remove the halogenated coating, for example, thereby incorporating a coating that has a particulate form to the carbon. The amount of the coating then may be varied by controlling the solvent type, solvent amount, and number of repetition of washing steps.

Thus, by choosing the core size of the carbon nanotube or incorporating a solvent wash step when the core size is larger than size of the halogenated compound, the form of non-carbon material incorporation may be controlled to prepare non-carbon filled, coated, both filled and coated carbon assemblies, or their mixtures.

The TGA based technique described above may be applied to the halide method to determine the filling and/or the coating amount as follows. First, a halogenated precursor is incorporated with a CNT article. Then, the halogenated intermediate is inspected by microscopy. It was found by such microscopic inspection that this incorporation typically yields SWCNT articles comprising a coating of the halogenated precursor. It was also found that such coating could adequately be removed by washing the halogenated intermediate with alcohols such as ethanol. After said washing, the halogen is removed from the halogenated intermediate remained in the CNT article as a filling. Finally, the washed article is heated in air to a predetermined temperature range to remove the carbon. Weight decrease during this heating is measured by a balance. Also, starting CNTs are heated in air and their weight decrease is determined. The difference between the weight decrease for the filled CNT article and the weight decrease for the starting CNTs is treated as the amount of incorporation of the non-carbon material as the filling. If the same analysis technique is applied to the halogenated intermediate with no alcohol washing, the amount of incorporation of the non-carbon material as the coating and the filling can be determined.

The coating amount is determined by the TGA based technique as follows. First, a halogenated precursor is incorporated to a CNT article. Then, the halogen is removed from the halogenated intermediate thereby prepared. This removal yields a CNT article comprising a coating of a non-carbon material. Finally, this article is heated in air at a predetermined temperature range to remove the carbon. Difference between the weight decrease of this article and the weight decrease of the same article after the removal of the coating yields the amount of the coating.

III. Growth Article Method

The invention also involves a growth article and the growth of the organized assembly of the carbon and the non-carbon material on this article. In one embodiment of this method, the non-carbon material fills the carbon (i.e. the carbon encapsulates the non-carbon material).

The first step of preparing growth article is obtaining a suitable substrate. The growth article may comprise any solid substrate suitable for material growth at a high temperature, for example at a temperature higher than 100° C. or higher than 500° C. Examples of such solid substrates include glasses, ceramics, metals, and mixtures thereof that can withstand high growth temperatures without melting, deformation, and/or decomposition. In one embodiment of the invention, the substrate may comprise silicon, germanium silicon oxide, quartz, metal oxides (such as magnesium oxide, zirconium oxide, aluminum oxide), metal borides (such as titanium diboride), or mixtures thereof.

The second step of preparing growth article involves depositing a metal or metal-like compound layer on the substrate. This layer is hereafter abbreviated as metal-layer. The metal-layer may comprise metals such as scandium (Sc), yttrium (Y), titanium (Ti), zirconium (Zr), hafnium (Hf), vanadium (V), niobium (Nb), tantalum (Ta), chromium (Cr), palladium (Pd), platinum (Pt), alloys thereof and mixtures thereof. The metal-layer may also comprise metal-like compounds, such as conductive metal nitrides, conductive metal borides and mixtures thereof. Examples of conductive metal nitrides are scandium nitride (ScN), titanium nitride (TiN), zirconium nitride (ZrN), hafnium nitride (HfN), and niobium nitride (NbN). Examples of conductive metal borides are titanium diboride ($TiB_2$), zirconium diboride ($ZrB_2$), vanadium diboride, niobium diboride ($NbB_2$), and chromium diboride ($CrB_2$). Some of the metals such as Si, Zr, and Ti of the metal-layer may be partially oxidized, for example titanium oxynitride or $TiN_yO_z$. In a preferred embodiment of this invention, the metal-layer may comprise metals such as Sc, Ti, V, Cr, nitrides of these metals (like TiN), borides of these metals, alloys thereof and mixtures thereof. In another preferred embodiment of this invention, the metal-layer may comprise TiN.

If the metal-layer comprises iron, iron-molybdenum, cobalt, cobalt-molybdenum, nickel, yttrium-nickel, alloys thereof or mixtures thereof; the amount of such metals in the metal-layer is less than 10 weight % or even less than 1 weight %.

The metal-layer may be amorphous or crystalline, including a distorted crystalline form, such as by having deficiencies in their crystal structure. Nitrides and borides of the metal-layer may have non-stoichiometric as well as stoichiometric forms.

The metal-layer may be deposited on the substrate by any suitable technique, for example by sputtering, reactive sputtering, electron beam evaporation, chemical vapor deposition, combinations thereof and the like. The empty portion of the core of the organized assembly depends on the thickness of the metal-layer. Thus, the thickness of this layer may be varied to control the proportion of the empty space.

The preparation of the growth article may optionally involve depositing at least one catalyst layer on the metal-layer. The catalyst-layer may comprise any material that can catalyze the formation and growth of the organized assembly. The catalyst-layer may comprise iron, iron-molybdenum, cobalt, cobalt-molybdenum, nickel, yttrium-nickel, alloys thereof or mixtures thereof. The catalyst-layer may be deposited on the metal-layer by any suitable technique, for example by sputtering, reactive sputtering, electron beam evaporation, chemical vapor deposition and deposition from solutions. The catalyst-layer thickness may affect the shape and dimensions of the organized assembly to be grown. For example, the catalyst-layer thickness may particularly change the diameter of the nanorods. Thus, varying the catalyst-layer thickness could influence the shape and the size of the organized assembly.

The organized assembly may be grown on the growth article in an environment containing a carbon source at a temperature above ambient temperature and at a pressure below atmospheric pressure. The growth may be carried out for a predetermined growth duration. The carbon source may be any carbon source that is suitable to deposit carbon according to the growth article method disclosed in this invention. The carbon source may be a liquid carbon source that has sufficient vapor pressure or any gaseous carbon source with a proviso that the gaseous carbon source is not ethylene. In U.S. Pat. No. 6,361,861, Gao et al. disclose that the use of ethylene causes formation of carbon nanotubes filled more than 10% with carbides of titanium, vanadium, tantalum and mixtures thereof. In the instant invention, such carbides can not comprise more than 10 volume % of the core volume of the carbon nanotube. Thus, the use of ethylene as a carbon source is thereby avoided to keep the carbide formation below 10 volume %, 1 volume %, or even 0.1 volume % of the core volume of the carbon nanotube.

In the preferred embodiment, the carbon source may be an alcohol such as methanol, ethanol, propanol, isopropanol, butanol, isobutanol or mixtures thereof. The environment may further comprise an inert gas such as argon, helium, nitrogen, neon, xenon, krypton or mixtures thereof. The environment may also further comprise hydrogen.

The organized carbon and the non-carbon assembly may be grown on the growth article at a temperature above 100° C., above 500° C. or above 700° C. In one embodiment of this invention, the assembly is grown at about 750° C. In another embodiment of this invention, the assembly is grown at about 800° C. The assembly may be grown on the growth article at a pressure below 500 Torr or 20 Torr. In one embodiment of this invention, the assembly is grown at about 17 Torr. The growth duration may be longer than 1 minute or longer than 10 minutes. In one embodiment of this invention, the growth duration is about 10 minutes. In another embodiment of this invention, the growth duration is about 30 minutes.

In one embodiment of this invention, before the step of the growth of the assembly, the growth article may be heat treated in an environment containing hydrogen but not any carbon source. This heat treatment may be carried out to form islands of the catalyst on the metal-layer. The size of these catalyst islands may affect the shape and the size of the assembly. For example, the size of these catalyst islands may particularly control the shape and the size of the nanorods.

The size of the catalyst islands may be varied by the heat treatment conditions (such as heat treatment temperature, duration, heating rate), heat treatment environment, heat treatment pressure as well as the thickness of the catalyst-layer. The heat treatment temperature may be higher than ambient temperature or higher than 700° C. In one embodiment of this invention, the heat treatment temperature is about 750° C. In another embodiment of this invention, the heat treatment temperature is about 800° C. The growth article may be heated to the heat treatment temperature within 0.2 hour or within 1 hour. In one embodiment of this invention, the growth article may be heated to the heat treatment temperature at about 0.2 hours. In another embodiment of this invention, the growth article may be heated to the heat treatment temperature at about 1 hour. The heat treatment environment may further comprise at least one inert gas such as argon, helium, nitrogen, neon, xenon, krypton and mixtures thereof. The heat treatment may be carried out at a pressure below atmospheric pressure, below 500 Torr, or below 10 Torr. In one embodiment of this invention, the heat treatment pressure is about 300 Torr. In another embodiment of this invention, the heat treatment pressure is about 7 Torr.

This invention is also directed to devices comprising the organized carbon and non-carbon assemblies of the instant invention. These compositions may be used as materials for preparation of fuel cells, hydrogen storage devices, photovoltaic cells, catalysts, thermoelectric devices, ultra-low resistance conductors, and superconductors. For example, Pt filled SWCNTs may be used as electro catalysts in preparation of fuel cells. The articles comprising a carbon and Ti, TiN, Mg, B, $TiB_2$, $MgB_2$, or a mixture thereof may be used as hydrogen storage materials. Also, $TiO_2$ filled SWCNTs may be used in preparation of photovoltaic cells or as catalysts for photochemical reactions. Since the carbon nanotubes have well defined inner (core) diameters, non-carbon material filled carbon nanotubes may be used as molecular sieves to limit the reactions to certain molecules that can fit to the core and to thereby control the reaction to obtain the desired products.

The organized assemblies comprising a carbon and a metal (such as Mg, Sc, Ti, V, Cr), a metal nitride, a metal boride, or a mixture (or alloy) thereof are particularly useful as intermediates for preparation of hydrogen storage equipment.

Another potential application for the articles of this invention is thermoelectric devices. In general, starting carbon nanotubes are not considered for thermoelectric applications. However, their electronic structure may be modified by incorporation of a non-carbon material to have properties suitable for thermoelectric applications. The non-carbon materials suitable for this application include Ti, Zr, Hf, Cr, Re, Fe, Ru, Co, Rh, Ir, Ni, Pd, Pt, B, or a mixture thereof. It is expected that the thermoelectric efficiency of the articles comprising such non-carbon materials may increase due to increasing electrical conductivity provided by conversion of all carbon nanotubes to metallic type, increasing free charge carriers caused by having a different electronic structure, increasing thermopower caused by the Kondo effect, and/or decreasing thermal conductivity caused by having increased phonon scattering at the carbon and the non-carbon material boundary. The presence of the Kondo effect is demonstrated by Grigorian et al. in a publication entitled "Giant thermopower in carbon nanotubes: A one-dimensional Kondo system", Phys. Rev. B, 1999, volume 60, pages R11309-R11312.

The compositions comprising carbon nanotubes and transitional metals are theoretically predicted to be metallic, even if the starting carbon nanotubes are semiconducting. Furthermore, the electrical conductivity of the starting carbon nanotubes may be enhanced by incorporation of non-carbon materials to carbon nanotubes. These articles are particularly useful in preparation of ultra-low resistance conductors. Examples of such articles are those comprising Ti, TiN, Ni, B, or a mixture thereof. The articles comprising boron and carbon nanotubes are particularly expected to have very high electrical conductivity. Moreover, the articles comprising a carbon and $MgB_2$ may be used in preparation of superconducting devices.

IV. Separation Method

This invention further provides a method for separating the SWCNTs according to their chirality and/or diameter. This method comprises halogenating SWCNTs, dispersing the halogenated-SWCNTs in a medium, and centrifuging said dispersion to supernatant and precipitate phases. This invention also provides enriched-SWCNTs according to their chirality and/or diameter.

The enrichment typically results in the weight percentage of one type of the SWCNT, characterized by its chirality and/or diameter, being higher in the separated form of the SWCNT than in the starting form of SWCNT. The starting form of the SWCNT is hereafter abbreviated as starting-SWCNT.

The as-synthesized SWCNTs suitable for this invention may be prepared by any synthesis method. Such methods may include, but are not limited to, carbon arc, laser vaporization, chemical vapor deposition (CVD), high pressure carbon monoxide process (HiPco), cobalt-molybdenum catalyst process (CoMoCat) and the like. The as-synthesized SWCNTs may be a mixture of as-synthesized SWCNTs prepared by more than one synthesis method.

In one embodiment, the as-synthesized SWCNTs may be used as the starting-SWCNTs for the separation method disclosed in this invention. In another embodiment, amorphous carbons and/or catalysts may be removed from the as-synthesized SWCNTs before the application of the disclosed separation method. The amorphous carbon and/or the catalyst removal may be complete or partial. Thus, the starting-SWCNTs that are separated according to their chirality and/or diameter by the method of this invention may contain some level of amorphous carbon and/or catalyst. The invention is not limited to any particular method of removing the amorphous carbon and/or the catalyst from the starting-SWCNTs. As an example, the method disclosed by Delzeit et al. in U.S. Pat. No. 6,972,056 may be used for this removal.

As a first process step of this invention, the starting-SWCNTs are halogenated. Many methods exist to incorporate at least one halogen to the structure of carbon nanotubes. This incorporation may be in any form. For example, the halogen may be incorporated on outer or inner surface of the SWCNTs. This incorporation may be through chemical or physical bonding.

In one embodiment, the compounds that may be useful for halogenation of the SWCNTs include iodine, bromine, chlorine, fluorine, interhalogen compounds (such as IBr, $ICl_3$, $BrF_3$), mixtures thereof and the like. Preferably, useful halogenation compounds include iodine, bromine, interhalogen compounds, mixtures thereof and the like.

The halogenation of SWCNTs may be accomplished by any suitable methods. One useful halogenation method is disclosed by Eklund et al. in U.S. Pat. No. 6,139,919. According to this method, the starting-SWCNTs are halogenated by soaking them in molten iodine.

Chen et al. disclose another useful halogenation method in a publication Nano Letters, Volume 3, No. 9, pages 1245-1249 (2003); together with the Supporting Information. According to this method, carbon nanotubes are halogenated by dropwise addition of diluted bromine or iodine solutions to a surfactant-stabilized aqueous dispersion of carbon nanotubes.

Another useful halogenation-method is disclosed by Jacquemin et al., Synthetic Metals, Volume 115, pages 283-287 (2000). According to this method, carbon nanotubes are halogenated by evaporating bromine or iodine at temperatures between 27° C. and 227° C. under vacuum at a pressure below $10^{-6}$ Torr. The carbon nanotubes are heated to the same temperature during the halogenation.

The halogenated-SWCNTs may also be a mixture of halogenated-SWCNTs prepared by more than one halogenation method.

The halogenation may be carried out at a temperature in the range of −100° C. to 500° C. In one embodiment, the halogenation with bromine or iodine may be carried out at a temperature in the range of 20° C. to 500° C. In another embodiment the halogenation may be carried out at a temperature in the range of 20° C. to 200° C. The halogenation may also be carried out by soaking SWCNTs in at least one halogen at a temperature equivalent to the melting point of the said halogen or higher. For example, the melting point of iodine is about 113.6° C. and the halogenation may be carried out at about 113.6° C. or a temperature higher than this melting point. The halogenation with chlorine or fluorine may be carried out below the ambient temperature. Such halogenation may be carried out for a duration in the range of 1 minute to 10 hours.

In another embodiment, after such halogenation, the halogenated-SWCNTs may be heat-treated at a temperature in the range of −100° C. to 500° C. This heat treatment may also be carried out in the range of 20° C. to 500° C. Yet in another embodiment, the heat treatment temperature may be in the range of 50° C. to 150° C. This heat treatment may be carried out for a duration in the range of 1 minute to 10 hours to remove the excess halogen.

As a second process step of this invention, the halogenated-SWCNTs are dispersed in a medium, such as a liquid. This dispersion may be achieved by any suitable dispersion method.

One useful method is the high shear processing of the halogenated-SWCNTs in a medium. Submicron processing (micro-fluidization) equipments manufactured by MFIC Corporation, Newton, Mass. may be used to provide the dispersions by high-shear processing.

This dispersion may also be achieved by using at least one surfactant. The surfactant may be any nonionic or ionic surfactant. Examples of surfactants are alkyldiphenyloxide disulfonate salts (Dowfax 8390 from Dow Chemical Company), $C_{12}/C_{14}$-fatty acidethylenediamidethersulfate (from SASOL North America Inc.), cetyltrimethylammonium bromide (CTAB), disodium dodecylphenoxybenzene disulfonate (from Dow Chemical Company), hexadecyltrimethylammonium p-toluenesulfonate (CTAT), n-hexadecyl diphenyloxide disodium disulfonate (Dowfax 2A1 from Dow Chemical Company), octyl phenol ethoxylate (Triton-X), poly(ethylene oxide) (20) sorbitan mono-oleate (Tween 80, from ACROS Organics), sodium cholate, sodium diisopropylnaphthalene sulfonate (Aerosol OS from CYTEC Industries Inc.), sodium 2-(1-carboxylatoethoxy)-1-methyl-2-oxoethyl laurate (Ceralution F from SASOL North America Inc.), sodium dodecyl sulfate (SDS), sodium dodecylbenzene sulfonate (NaDDBS), Surfynol CT131/324 (from Air Products and Chemical Inc.), N-alkylamines such as octadecyl amine, their mixtures and the like. In one embodiment, the surfactant may be sodium cholate, cetyltrimethylammonium bromide or mixtures thereof.

This dispersion may also be accomplished by carboxy functionalization of the SWCNTs. The method disclosed by Papadimitrakopoulos in U.S. Patent Application No. 2004/0232073 in paragraphs [0021] to [0027] may be used for the carboxy functionalization and the contents of these paragraphs are incorporated herein by reference. Briefly, this functionalization may be achieved by immersing the SWCNTs in at least one acid such as sulfuric acid ($H_2SO_4$), nitric acid ($HNO_3$), their mixtures, and the like for a duration and at a temperature sufficient to produce the desired level of dispersion. For example, the carboxy functionalization may be carried out at a temperature in the range of 40° C. to 100° C., preferably in the range of 40° C. to 60° C., for at least six hours. The treatment with oxygen at elevated temperatures, for example at about 400° C. or treatment with hydrogen peroxide, for example at a temperature in the range of 40° C. to 100° C. may also achieve the desired carboxy functionalization level. In one embodiment, the carboxy functionalization may be followed by surfactant amine functionalization, as disclosed by the Papadimitrakopoulos application.

Cellulose derivatives may also be used as dispersants for the SWCNTs. An example of such use is described by Minami et al., Applied Physics Letters, Volume 88, article 093123 (2006) (an online publication).

The examples of dispersion processes described above, i.e. the high-shear, the surfactant, the carboxy functionalization and the cellulose derivative processes may be used alone or in combination. If they are applied in combination, these dispersion processes may be used in any order. For example, the surfactant may be added after the halogenation step and before the dispersion step. Or, in another embodiment, the surfactant may also be added after the dispersion by the high shear processing step and before the centrifugation step.

The dispersion may be achieved in any medium that does not permanently destroy semiconducting and metallic properties of the SWCNTs. Such medium includes water, heavy water (deuterium oxide or $D_2O$), dimethylformamide (DMF), dimethylacetamide (DMAC), formamide, methyl formamide, hexamethylene phoshphoramide, dimethylsulfoxide (DMSO), liquid ammonia, diethylamine, tetrahydrofuran (THF), mixtures thereof and the like. In one embodiment the medium may be water, heavy water or mixtures thereof.

The efficiency of separation may depend on dispersing SWCNT bundles down to individual nanotubes. Practically, it may be difficult to break down all SWCNT bundles to individual nanotubes and thereby obtain a complete dispersion. Thus, enrichment rather than a full separation of SWCNTs may be expected.

As a third step of this invention, the dispersed SWCNTs are centrifuged. This centrifugation may be carried out at high speeds that can achieve high centrifugal forces, for example higher than 10,000 g, or higher than 20,000 g. The duration of the centrifugation may be longer than 1 hour, 10 hours, or 20 hours. At the end of the centrifugation, the SWCNT dispersion is separated into supernatant and precipitate phases. The supernatant phase may be separated from the precipitate phase by a careful decantation of the supernatant phase. One of these phases could be enriched with respect to the chirality and/or the diameter of the SWCNTs. These phases may be used as centrifuged to manufacture useful commercial products.

In one embodiment, these two phases further may be processed to remove the medium, the surfactant, and/or the halogen from the supernatant or the precipitate phase. This fourth step is an optional process step. The medium may be removed by simple evaporation. The surfactant or the halogen may be removed by heating at elevated temperatures, for example at temperatures higher than 200° C., higher than 300° C. or higher than 500° C. In one embodiment, the medium, the surfactant, and the halogen removal may be achieved in vacuum. The vacuum pressure may be lower than 10 Torr, 1 Torr, or 0.01 Torr. The SWCNTs dispersed in the supernatant phase also may be recovered by changing the pH of the dispersion resulting in precipitation of SWCNTs and by the further processing to remove the medium, the surfactant, and/or the halogen, as described above.

In another embodiment, the sonication may be applied before, after, or during any process step described above to aid successful dispersion of the SWCNTs. This fifth step is an optional process step. The sonication may be carried out for a duration of at least 1 minute or 15 minutes.

Any or a combination of the above five process steps may be repeated at least once to further enrich the supernatant or the precipitate phases for their s-SWCNT or m-SWCNT content.

The samples obtained from the supernatant and the precipitate phases may be analyzed to determine their enrichment level with respect to the chirality and/or the diameter of the SWCNTs. Several analysis techniques, such as Raman spectroscopy, ultraviolet-visible-near infrared spectroscopy (UV-VIS-NIR) and electrical conductivity measurements may be applied to determine the chirality enrichment. A photoluminescence (PL) technique could be applied to determine the diameter enrichment. To assess any enrichment, it is necessary to characterize SWCNT (n,m) population. This task may be achieved by using a combination of Raman and photoluminescence spectroscopies. Multiple excitation wavelengths may be required due to strongly resonant nature of both SWCNT Raman and photoluminescence spectra. See Rao et al., Science, volume 275, pages 187-191 (1997); O'Connell et al., Science, volume 297, pages 593-596 (2002); and Fantini et al., Phys. Rev. Lett., volume 93, article 147406 (2004). This approach has been used to quantify (n,m) population of the starting CoMoCat SWCNTs and it was disclosed that (6,5) and (7,5) nanotubes together may account for about 60% of the starting-SWCNTs. See Jorio et al., Phys. Rev. B, volume 72, article 075207, pages 1-5 (2005).

During the halogenation of SWCNTs, the halogen may preferentially fill (i.e. intercalate) empty cores of the SWCNTs depending on an atomic, ionic, or molecular size of the halogen species and inner diameters of the SWCNTs. The SWCNTs that have inner diameters larger than the size of the halogen species may be filled with halogen, whereas those that have smaller diameters may not be filled. As a result, SWCNTs filled with a halogen may carry more positive charge per carbon atom as compared to those free of a halogen. Thereby, those SWCNTs filled with and those free of the halogen may interact differently with ionic surfactants and this difference may be utilized to separate SWCNTs into distinct phases according to their diameter.

For example, commercial CoMoCat material comprises predominantly (6,5) and (7,5) SWCNTs with diameters of about 0.757 nm and about 0.829 nm, respectively. See Bachilo et al., J. Am. Chem. Soc., volume 125, pages 11186-11187 (2003). According to Fan et al., Phys. Rev. Lett., volume 84, pages 4621-4624 (2000), the SWCNT wall thickness may be about 0.350 nm. Then the inner diameters $d_{in}$ of (6,5) and (7,5) SWCNTs may be estimated to be about 0.407 and about 0.479 nm, respectively. These values are comparable to diameters of large ions such as iodine, which has a diameter $d_I$ of about 0.432 nm. Since $d_{in}(6,5)<d_I<d_{in}(7,5)$, iodine may be expected to intercalate into interior of (7,5) SWCNTs, but not (6,5) SWCNTs.

Then, a diameter-based separation of larger nanotubes ($d_{in}>d_I$) with iodine-filled interior from smaller ($d_{in}<d_I$) empty ones may be achieved. The outcome may be related to about 32 picometer difference in SWCNT diameters. From the experimental results disclosed below, the thickness of pi-electronic cloud of SWCNT walls may be estimated to be in the range of 0.350 to 0.367 nm. This mechanism may open new avenues for manipulating SWCNTs with unprecedented picometer-scale precision.

Figure 30:
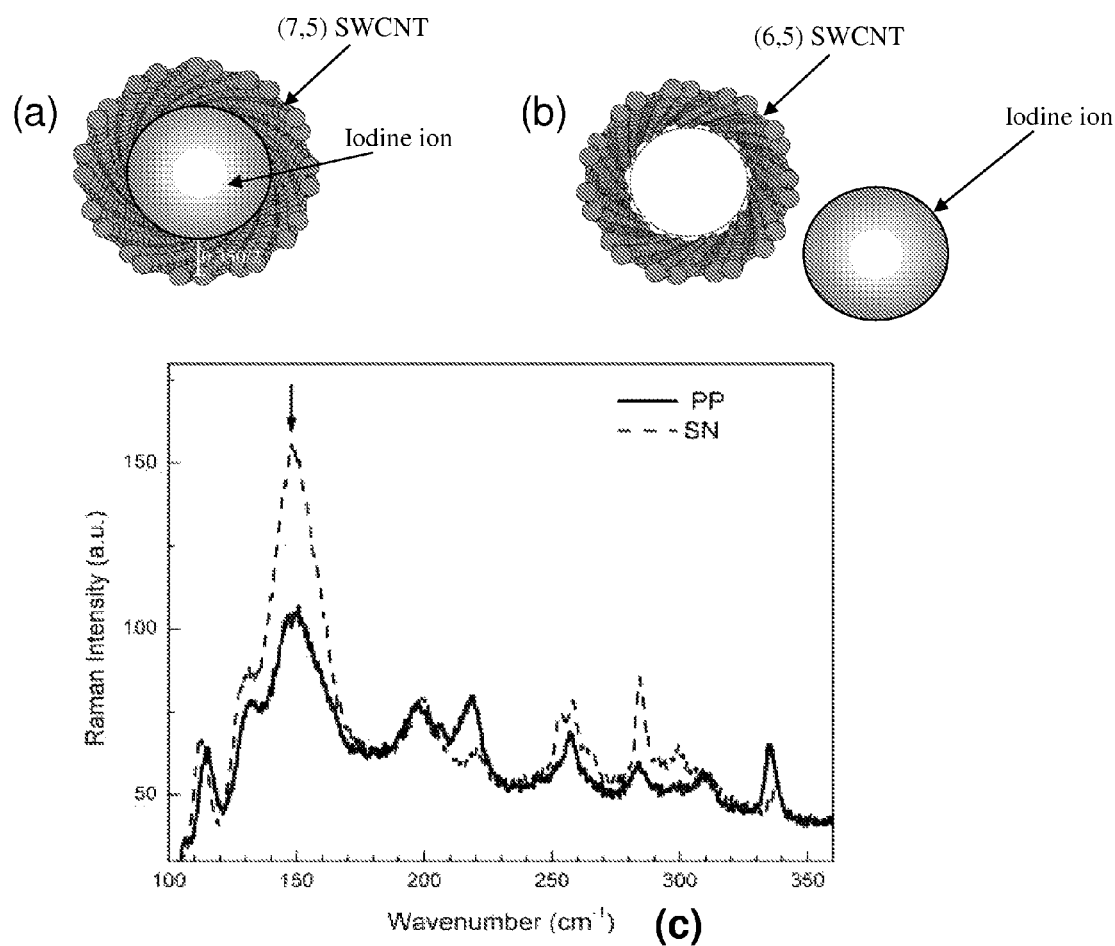
FIG. 30 shows the illustration of two types of halogenated SWCNTs: (a) the larger diameter tubes, as represented by (7,5) and (b) the smaller diameter tubes, as represented by (6,5) and (c) Raman spectra (633 nm excitation) of separated phases before the removal of intercalated iodine (633 nm excitation). The arrow marks the polyiodide peaks at about 148 cm$^{-1}$. PP is the precipitate phase and SN is the supernatant phase. The schematic representations are roughly to the scale.

The interior space of SWCNTs may be filled with iodine. See Fan et al. "Atomic Arrangement of Iodine Atoms inside Single-Walled Carbon Nanotubes", Phys. Rev. Lett., 2000, Vol. 84, pages 4621-4624; Grigorian et al., Phys. Rev. Lett., volume 80, pages 5560-5563 (1998); Bendiab et al., Phys. Rev. B, volume 69, article 195415 (2004); and Chancolon, et al., J. Nanosci. Nanotech., volume 6, pages 82-86 (2006). Typically, SWCNT diameters may be relatively large (d>1.2 nm and $d_{in}>0.85$ nm) providing ample room to accommodate the intercalated species inside these nanotubes. The intercalated iodine may form negatively charged polyiodide chains, $(I_3)^-$ and $(I_5)^-$, residing both outside and inside positively charged SWCNTs. See Fan et al., Grigorian et al., and Bendiab et al. However, atomic size limitations may become prominent when smaller diameter SWCNTs (such as CoMoCat material) are used for intercalation. With respect to iodine, these nanotubes may fall into one of two categories depending on their diameter: in larger ($d_{in}>d_I$) tubes, iodine ions may occupy two sites, both outside and inside nanotubes, whereas the smaller ($d_{in}<d_I$) tubes may accept iodine only at the outside site (as disclosed below in Example 25 and shown in FIG. 30a, b). One difference between the two types may be the total amount of transferred charge, i.e., the first type may have more iodine and, consequently, may carry more positive charge per carbon atom as compared to the second type. Thereby, these two types may be expected to interact differently with ionic surfactants, and this difference may be utilized to separate them into two distinct phases.

Such diameter separation of SWCNTs based on the size of molecule or atom and the inner diameters of SWCNTs is not restricted to halogens. SWCNTs may be filled with other molecules or atoms that have sizes larger or smaller than those of halogens to preferentially fill the empty cores of the SWCNTs to achieve a diameter separation for larger or smaller size SWCNTs. For example, SWCNTs that are synthesized by HiPCo process have inner diameters varying in the range of 0.8 nm to 1.4 nm. The HiPCo SWCNTs that have inner diameters larger than about 1.0 nm may be filled with a molecule or atom that has a size of about 1 nm. Then, the SWCNTs that have inner diameters larger than about 1 nm may be separated from those that have inner diameters smaller than about 1 nm.

For example, $TiI_4$ has a size of about 1 nm. It fills the inner cores of SWCNTs with inner diameters larger than 1 nm when it is reacted with SWCNTs in the presence of $I_2$. The iodine may later be removed from the SWCNTs, forming SWCNTs filled with titanium. Then, by having a suitable ionic surfactant, titanium-filled SWCNTs may be separated from empty ones.

By having suitable combinations of atoms or molecules with different sizes that may fill the empty cores of SWCNTs, further separation of SWCNTs according to their inner diameter may be achieved, thereby narrowing the diameter distribution range of the enriched SWCNT phases.

The present invention is further directed to a novel population of size or chirality enriched SWCNTs, for example, a population containing substantially pure conducting SWCNTs, a population containing substantially pure semiconducting SWCNTs, a population containing substantially pure small diameter SWCNTs, or a population containing substantially pure large diameter SWCNTs. Preferably, a substantially pure population may contain a population of more than 95% of SWCNTs larger than or smaller than a predetermined size. More preferably, the population may include more than 95% of SWCNTs with diameters larger than about 0.800 nm. The novel population may also be substantially free of amorphous carbon and catalyst.

There may be other secondary separation mechanisms that affect the separation method of the instant invention. An example of such secondary mechanism is as follows. A surfactant used for the dispersion may have a shorter molecular length and thereby may not fully envelop the larger diameter SWCNTs. Thus, the surfactant due to its length may adequately be effective only for smaller diameter SWCNTs. This was observed earlier for pristine CoMoCat material and attributed to preferential suspension of smaller diameter tubes by surfactant in the supernatant phase, while larger diameter tubes were incorporated into the precipitate phase, as disclosed by Jorio et al. in a publication entitled "Quantifying carbon nanotube species with resonance Raman scattering", Phys. Rev. B, volume 72, article 075207 (2005).

Because of such secondary mechanisms, after the centrifugation, some fraction of the larger diameter SWCNTs may undesirably go to the precipitate phase joining the smaller size SWCNTs instead of remaining in the supernatant phase. If the fraction of such larger diameter SWCNTs in the precipitate phase is large enough to degrade quality of the enrichment of the precipitate phase, another surfactant with a longer molecular length may be chosen for the dispersion to improve the enrichment.

Figure 29:
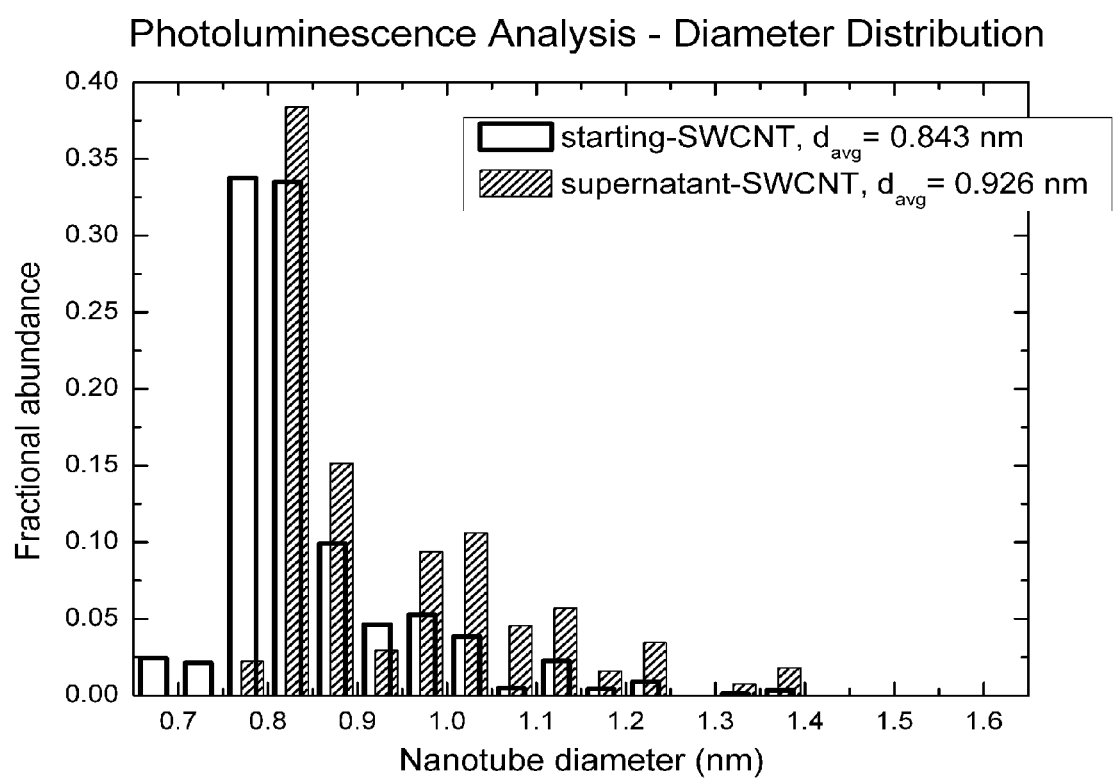
FIG. 29 shows fractional abundance of SWCNTs in the starting SWCNTs and the supernatant phase as a function of SWCNT diameter as determined by photoluminescence analysis.

Furthermore, the SWCNTs that have diameters too large for some surfactants may constitute a small fraction of some commercially available SWCNTs. For example, the fraction of the SWCNTs larger than about 0.9 nm is about 10 weight % of the starting SWCNTs purchased from SouthWest Nano-Technologies, Norman, Okla., under a tradename SWeNT, with a catalog number Grade S-P95-02-DRY, as shown in FIG. 29. Therefore, even if some portion of the larger than 0.9 nm diameter fraction goes to the precipitate phase, it may not significantly affect the overall enrichment level of the precipitate phase with the smaller diameter SWCNTs.

Also, in an optional process step, the precipitate phase that may comprise smaller diameter SWCNTs and very large size SWCNTs caused by secondary mechanisms may be further separated into at least two fractions. For example, if starting SWCNTs purchased from SouthWest NanoTechnologies are used, the precipitate phase thereby obtained may comprise one fraction with diameters smaller than about 0.8 nm and the other with diameters larger than about 0.9 nm. This phase may be further separated into two fractions as follows. First halogen is removed from the precipitate phase by heating in vacuum to a predetermined temperature. Then the SWCNTs thereby obtained are dispersed in water by using a suitable surfactant, such as a non-ionic surfactant. It is expected that after the centrifugation of this dispersion, the SWCNTs with diameters smaller than about 0.8 nm are recovered in the supernatant phase, while those with diameters larger than about 0.9 nm in the precipitate phase. As a result, after this optional separation step, the starting SWCNTs are finally separated into three fractions, where the first fraction comprises SWCNTs with diameters smaller than about 0.8 nm, the second one with diameters in the range of about 0.8 nm to about 0.9 nm, and the third one with diameters larger than about 0.9 nm.

The invention is illustrated further by the following examples that are not to be construed as limiting the invention in scope to the specific procedures or products described in them.

EXAMPLES

Example 1

Ti Filled SWCNT Articles

In this example, the single-wall carbon nanotubes (SWCNTs) were filled with titanium (Ti). SWCNTs were purchased from Carbon Solutions Inc. (Riverside, Calif.) with a catalog number P2-SWNT. They were manufactured by using the arc process. These SWCNTs are designated as "starting SWCNT." A Raman spectrum of the starting SWCNTs was obtained by using a Raman spectrometer, manufactured by Horiba Jobin Yvon (Edison, N.J.) at a laser excitation wavelength of about 633 nm. The Raman spectrum shown in FIG. 2 as a solid line had two strong signals, one at about 176 $cm^{-1}$, which was caused by their radial breathing mode, and another at about 1600 $cm^{-1}$, which was caused by their tangential mode and called as G band (not shown). These were typical signals for SWCNTs.

The starting SWCNTs were processed as follows. The SWCNTs, weighed about 23 mg, were placed in a 50 ml three-necked round bottom Pyrex flask, which was equipped with a heating mantle, a thermocouple, and an addition arm. The flask was connected to a vacuum system through a liquid nitrogen trap.

The titanium iodide crystals ($TiI_4$) used in this Example were purchased from Aldrich with a catalog number 41,359-3. The iodine crystals ($I_2$) were purchased from Aldrich with a catalog number 20,777-2. $TiI_4$ (about 1.0 gram) was mixed with $I_2$ (about 1.0 gram) in a nitrogen-filled glove box and placed in the flask addition arm. The end of the addition arm was covered to protect the mixture from atmospheric moisture. The addition arm was then taken out of the glove box and connected to the reaction flask. Thus, the SWCNTs and the $TiI_4/I_2$ mixture initially were kept in separate locations in the flask.

After the connection, the flask was immediately evacuated to a pressure below 1 Torr. The contents of the flask were then heated to about 150° C. in vacuum for about 15 minutes to remove volatile species from the SWCNTs. After this heating, the vacuum valve was closed and the $TiI_4/I_2$ mixture was poured on the SWCNTs by tipping the addition arm. The heating was continued in order to melt the $TiI_4/I_2$ mixture and soak the SWCNTs in the melt as follows. First, after the mixture was poured, the flask was heated to about 200° C. within about 6 minutes. Then, it was further heated to about 275° C. within about 12 minutes. Upon reaching about 275° C., the vacuum valve was opened to remove some un-reacted $TiI_4/I_2$ by evaporation into the cold trap. The heating was continued in vacuum at about 275° C. for about 1 hour. The contents of the flask were then cooled to room temperature by cutting power to the heating mantle. At this step, the nanorods comprised $TiI_4/I_2$ coated and filled SWCNTs.

This article was processed to remove $TiI_4$ and $I_2$ coating by an ethanol washing step as follows.

After the cooling, the flask was transferred to the glove box filled with nitrogen, and the article was washed with ethanol (Aldrich, catalog number 45, 984-4) to further remove unreacted $TiI_4/I_2$ mixture. The nanorods were first mixed with about 25 ml ethanol to prepare a suspension. This suspension was then centrifuged at a centrifugal force of about 10,000 g for about 15 minutes to obtain a supernatant phase and a precipitate phase. The supernatant phase was carefully removed by using a pipette and discarded. This washing step was repeated once. The precipitate phase was then transferred back to the glove box and it was dried at about 25° C. to remove residual ethanol. The precipitate phase was characterized by 633 nm Raman spectroscopy. In the ethanol washing step, the centrifugation step may be replaced with a filtration step to recover the nanorods from the suspension. At this step, the nanorods comprised $TiI_4/I_2$ filled SWCNTs.

The $TiI_4/I_2$ filled SWCNTs were processed to remove iodine by a heat treatment step as follows.

The precipitate phase was then placed in a quartz tube, which was inserted in a tube furnace. The tube was sealed, connected to a vacuum system and evacuated to about 30 mTorr pressure. The furnace was then heated to about 500° C. within one hour. The heating was continued at about 500° C. for about 30 minutes.

After this heating period, a gas mixture consisting essentially of about 3% hydrogen and about 97% argon was introduced into the quartz tube and the pressure was raised to about 10 Torr. The heating was further continued at a furnace temperature of about 500° C. for about two hours at about 10 Torr in the flowing gas mixture, after which the furnace was cooled to room temperature. The Ti filled SWCNTs were thereby obtained.

It was observed by eye that the nanorods comprised black and orange granules. Some of the granules were mechanically separated according to their color by using a microscope. The orange and black granules were separately characterized by using the Raman spectrometer.

Figure 2:
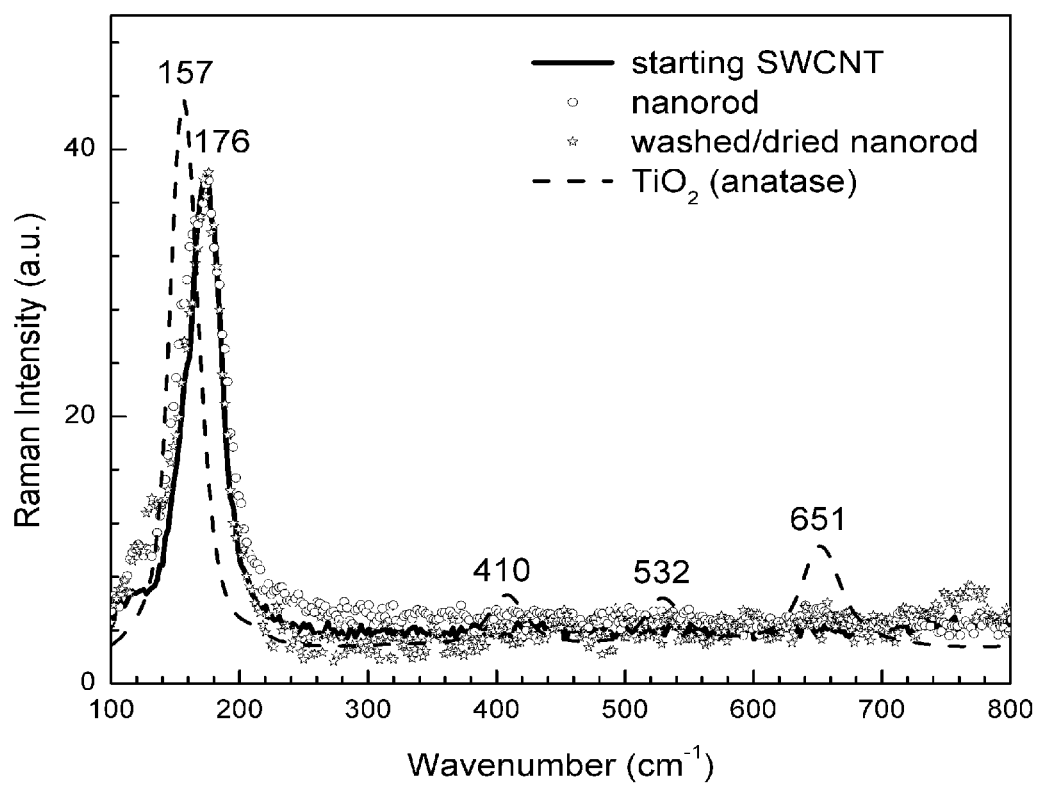
FIG. 2 shows the 633 nm excitation Raman spectra of the starting SWCNTs, the nanorods, the washed and dried nanorods, and anatase form of titania.

The Raman spectrum of the black granules, shown in FIG. 2 with hollow circles, had a strong signal at about 176 $cm^{-1}$, suggesting that the carbon nanotubes preserved their carbon structure after the halogen removal step. A Raman spectrum of an anatase $TiO_2$ is also shown in FIG. 2 with a broken line. The anatase $TiO_2$ sample had a very strong signal at about 157 $cm^{-1}$, with three ancillary peaks at about 410 $cm^{-1}$, 532 $cm^{-1}$, and 651 $cm^{-1}$. These peaks were not present for the black granules, indicating that the anatase titania was not present in them in quantities detectable by Raman spectroscopy.

The rutile form of $TiO_2$ had Raman signals at about 141 $cm^{-1}$, about 235 $cm^{-1}$, about 444 $cm^{-1}$, and about 607 $cm^{-1}$, when measured by using a laser at a wavelength of about 633 nm. The SiC had Raman signals at about 260 $cm^{-1}$, about 420 $cm^{-1}$, about 605 $cm^{-1}$, and at about 607 $cm^{-1}$, when measured by using a laser at a wavelength of about 633 nm, as disclosed by Lohse et al. in a publication entitled "Raman spectroscopy as a tool to study TiC formation during controlled ball milling", J. Applied Physics, 2005, volume 97, pages 114912-1 to 114912-7. As shown in FIG. 2, the Raman spectrum of the black granules did not have peaks belonging to the rutile $TiO_2$ nor SiC, indicating that the black granules were essentially free of these compounds.

The black granules were further analyzed by a transmission electron microscope (TEM), manufactured by JEOL Inc. (Peabody, Mass.) with a model number JEOL2010 HRTEM. Before this analysis, the black granules were mixed with 5 milliliter isopropanol and then sonicated for 30 minutes to have dispersion. This dispersion was later deposited on a TEM grid for analysis. This analysis indicated that the black granules comprised nanorods. The selected area electron diffraction analysis done by using the TEM revealed that nanorod shells comprised carbon and nanorod cores comprised titanium. The nanorods were essentially free of $TiO_2$, $TiI_4$, or iodine. The TEM micrographs revealed that there was no titanium coating on SWCNTs. It was thereby accepted that, during the solvent washing step, the halogenated precursor coating was substantially removed from the SWCNTs, preventing formation of a titanium coating.

Thus, the Raman and TEM analysis results indicated that the black granules comprised titanium filled SWCNT nanorods.

The orange granules showed a strong titanium oxide ($TiO_2$) Raman signal, with no detectable carbon nanotube signal. This result suggested that the orange granules were formed due to residual un-reacted halogenated titanium precursor.

The black granules were mixed with about 15 ml of about 3 g/l solution of cetyltrimethylammonium bromide (CTAB) with $D_2O$ and the resultant mixture was sonicated for about 20 minutes, using a high-power horn sonicator. A solid product was recovered from the mixture by first evaporation of volatile matter at about 100° C. and then heating the dried granules at about 500° C. in a vacuum pressure of about 30 mTorr for about 1 hour to remove CTAB. The Raman spectrum of these nanorods, shown in FIG. 2 with hollow stars, had a strong signal at about 176 $cm^{-1}$, suggesting that the SWCNTs preserved their carbon structure after this washing and drying process. No titanium oxide Raman signal was observed. This result confirmed that the Ti filled SWCNT articles were thereby obtained.

Example 2

Ti Filled SWCNT Articles

This example was carried out in the same manner as described in Example 1, except that about 82 mg of SWCNT was used instead of about 23 mg of SWCNT, 1.8 grams of $TiI_4$ and 1.8 grams of $I_2$ were used instead of 1 gram of $TiI_4$ and 1 gram of $I_2$, and that the experiment was conducted with minimal exposure to the external environment. There were only black granules, but no orange granules after the halogen removal step, indicating that an article consisting essentially of Ti filled SWCNTs was successfully obtained.

Example 3

Ti Filled and Coated SWCNT Articles

In this example, the SWCNTs were both filled and coated with titanium (Ti). This example was carried out in the same manner as described in Example 2, except that the contents of the reaction flask were heated at about 275° C. for about 15 to 20 minutes prior to opening the vacuum valve and that the ethanol washing step was not carried out after the preparation of the article comprising $TiI_4/I_2$ coated and filled SWCNTs. Thus, after the cooling of the flask, $TiI_4/I_2$ coated and filled SWCNTs were directly placed in a quartz tube, which was inserted in a tube furnace. The Ti filled and coated SWCNTs were thereby obtained.

Figure 3:
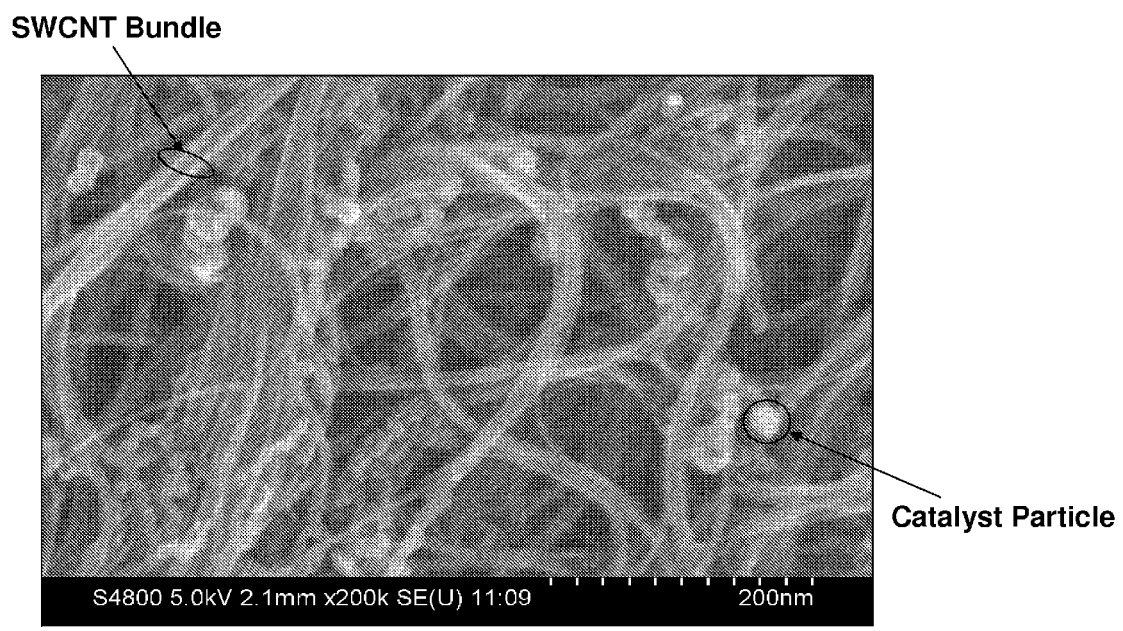
FIG. 3 shows the scanning electron micrograph of the starting SWCNTs comprising SWCNT bundles and catalyst particles.
Figure 4:
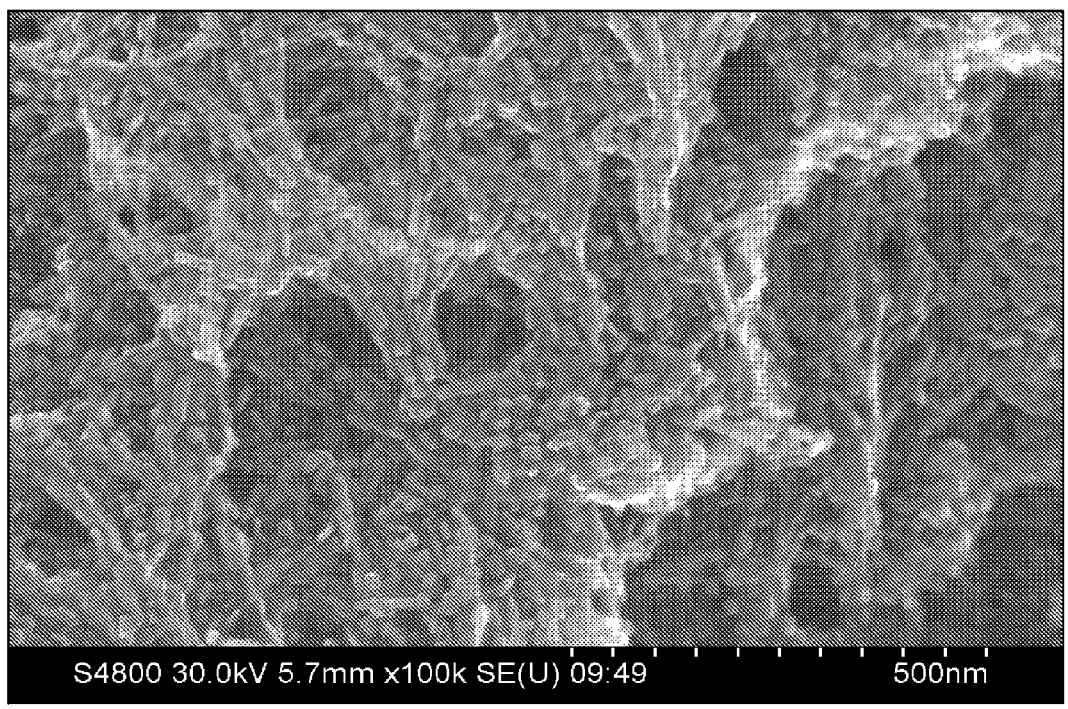
FIG. 4 shows the scanning electron micrograph of the titanium filled and coated SWCNTs.

A micrograph of the starting SWCNT obtained by scanning electron microscopy (SEM), is shown in FIG. 3. This precursor comprised SWCNT bundles where each bundle was an aggregate of a few dozen of SWCNTs. The particles shown in this micrograph are the metal catalysts used for the SWCNT formation and growth. FIG. 4 shows an SEM micrograph of the Ti filled and coated SWCNT articles. From the scale bars, it was estimated that the titanium formed a coating on both individual SWCNTs and SWCNT bundles, with a thickness varying in the range of 7 nm to 17 nm.

Example 4

Ti Coated SWCNT Articles

In this example, the SWCNTs were coated with titanium (Ti). This example was carried out in the same manner as described in Example 3, except that SWCNTs purchased from SouthWest NanoTechnologies (Norman, Okla.), under a tradename SWeNT, with a catalog number Grade S-P95-02-DRY were used as starting SWCNTs, instead of the SWCNTs purchased from Carbon Solutions Inc. They were manufactured by using the CoMoCat process and purified to remove the catalysts and graphitic carbon. p These SWCNTs comprise predominantly (6,5) and (7,5) SWCNTs with diameters of about 0.757 nm and about 0.829 nm, respectively. See Bachilo et al., "Narrow (n,m)—Distribution of Single-Walled Carbon Nanotubes Grown Using a Solid Supported Catalyst", J. Am. Chem. Soc., 2003, Vol. 125, pages 11186-11187. According to Fan et al., "Atomic Arrangement of Iodine Atoms inside Single-Walled Carbon Nanotubes", Phys. Rev. Lett., 2000, Vol. 84, pages 4621-4624, the SWCNT wall thickness may be about 0.350 nm. Then the inner diameters $d_{in}$ of (6,5) and (7,5) SWCNTs was estimated to be about 0.407 nm and about 0.479 nm, respectively. Since $TiI_4$ has a size of about 1 nm, this molecule may not fill, but coat the starting SWCNTs. It is thereby accepted that the articles prepared in this example comprise the Ti coated SWCNTs.

Example 5

$TiO_z$ Filled SWCNT Articles

In this example, $TiO_z$ filled SWCNTs were prepared, where z varies in the range of 0 to 2. This example was carried out in the same manner as described in Example 2, except that after the iodine removal step, i.e. after the furnace was cooled to a room temperature, the gas mixture consisting essentially of about 3% hydrogen and about 97% argon was replaced with air and the article was oxidized for a predetermined time at room temperature.

Figure 5:
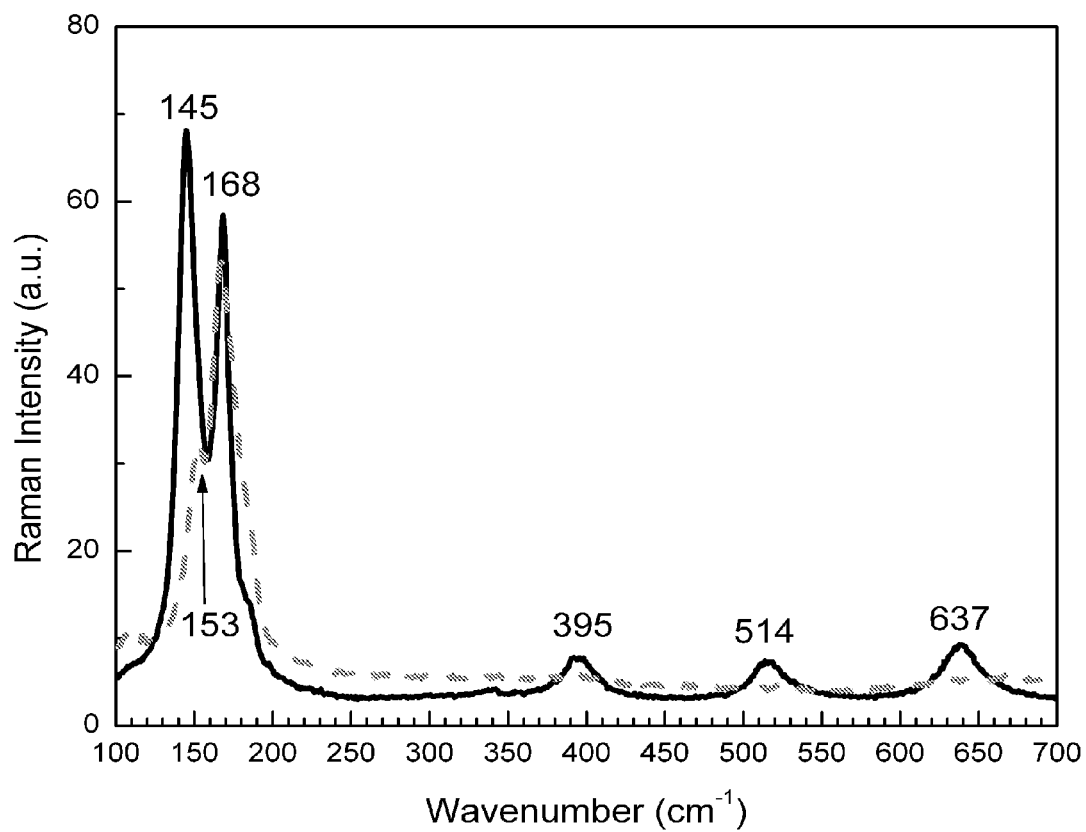
FIG. 5 shows the 532 nm excitation Raman spectra of the Ti filled SWCNTs (dashed line) and the nanorods after oxidization for about 5 days (solid line).

After a certain oxidation time interval, the nanorods were analyzed to determine their $TiO_2$ content. This analysis was carried out by using the Raman spectrometer manufactured by Horiba Jobin Yvon at a laser excitation wavelength of about 532 nm. The results are shown in FIG. 5. The Raman spectrum of the Ti filled SWCNTs, shown as dashed lines, had two peaks one at about 153 $cm^{-1}$ and the other at about 168 $cm^{-1}$. As oxidation proceeded, one strong peak at about 145 $cm^{-1}$ and three ancillary peaks at about 395 $cm^{-1}$, about 514 $cm^{-1}$, and about 637 $cm^{-1}$ gradually appeared. These peaks are due to anatase form of $TiO_2$. The spectrum of the nanorods oxidized for about 5 days is shown in FIG. 5 as a solid line.

Figure 6:
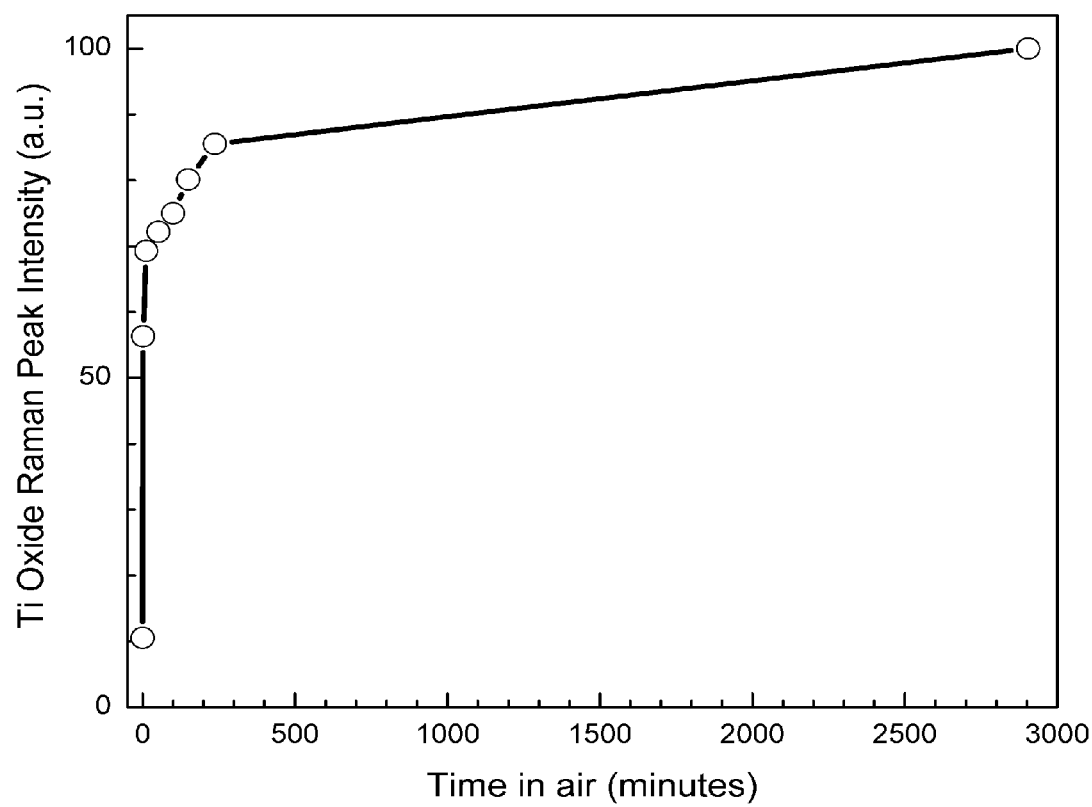
FIG. 6 shows the variation of the Raman peak at 145 cm$^{-1}$ of the Ti filled SWCNTs as a function of the air exposure time.

The intensity of the strong Raman peak at about 145 $cm^{-1}$ due to anatase $TiO_2$ was monitored as a function of air exposure time. The results were plotted as a function of the oxidation time, as shown in FIG. 6. These results demonstrated that Ti filling may be controllably oxidized to prepare articles comprising $TiO_z$ filled SWCNTs, where z varies in the range of 0 to 2. The value of z may controllably be varied by varying the oxidation time.

Figure 7:
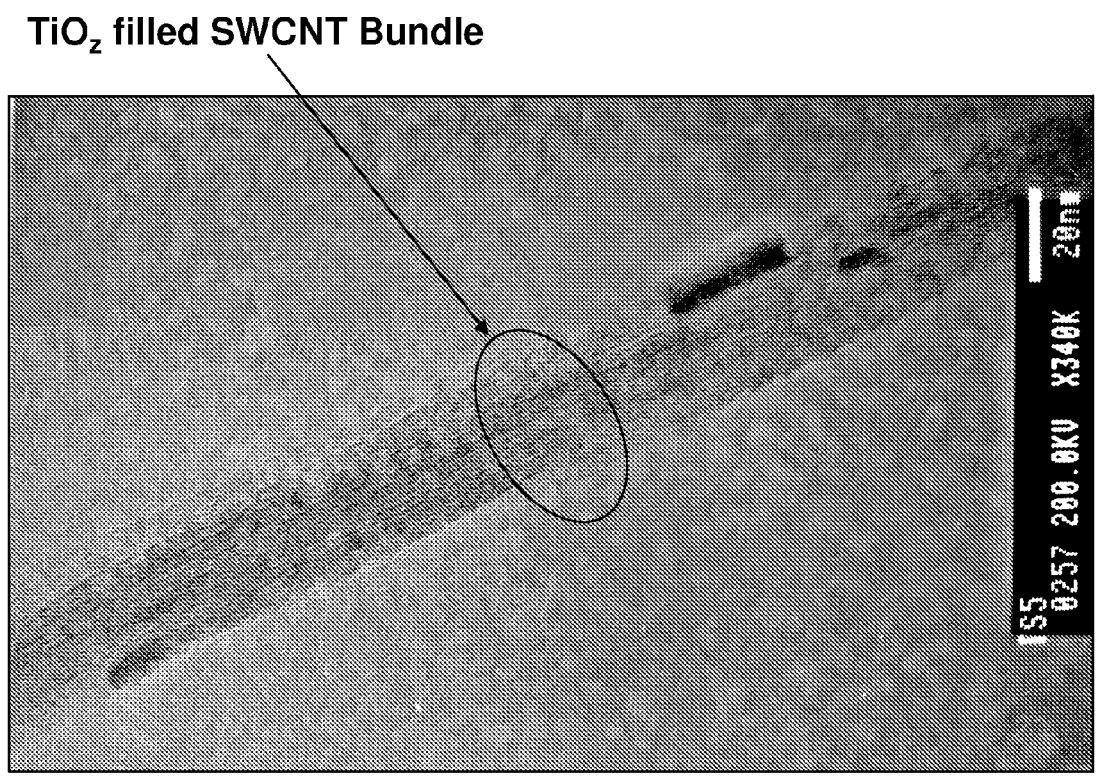
FIG. 7 shows the transmission electron micrograph of a TiO$_z$ filled SWCNT bundle.
Figure 8:
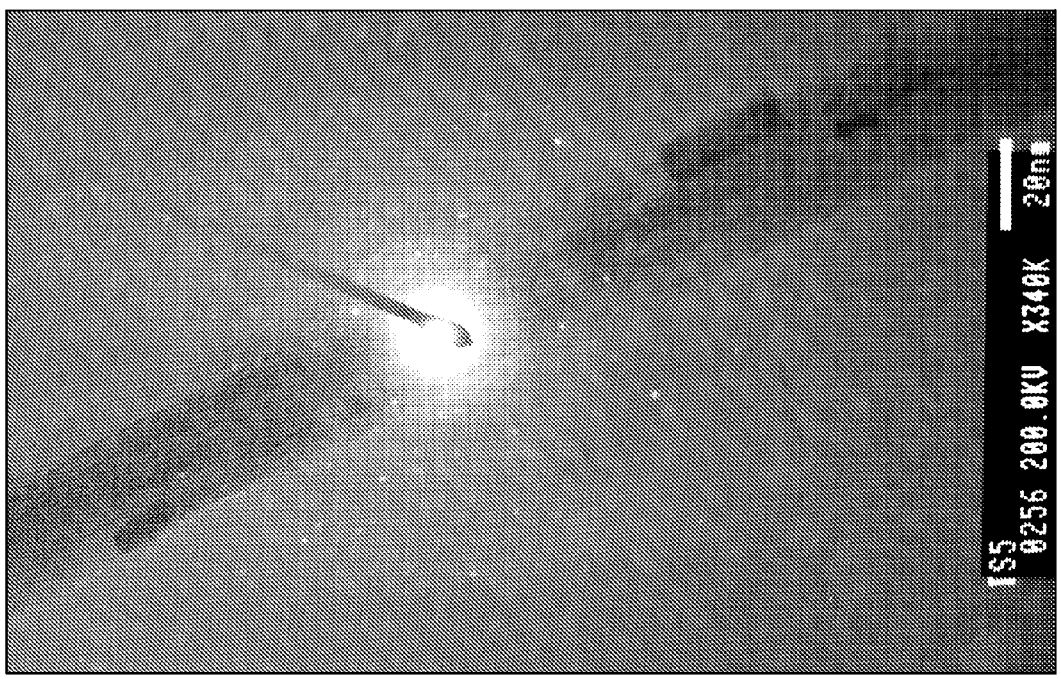
FIG. 8 shows the electron diffraction pattern of the TiO$_z$ filled SWCNT bundle shown in FIG. 7.

A TEM micrograph of a single $TiO_z$ filled SWCNT bundle is shown in FIG. 7. The electron diffraction patterns of this article, shown in FIG. 8, confirmed that this bundle comprised $TiO_2$. This result suggested that dark lines in the bundles, observed in FIG. 7, are caused by $TiO_z$ filling. The TEM micrographs suggested that there was no titanium coating. Then, it was accepted that the solvent washing substantially removed the halogenated precursor coating.

It is expected that the Ti may be completely oxidized to $TiO_2$ by prolonging the oxidation time.

Example 6

$TiO_z$ Filled SWCNT Articles

Figure 9:
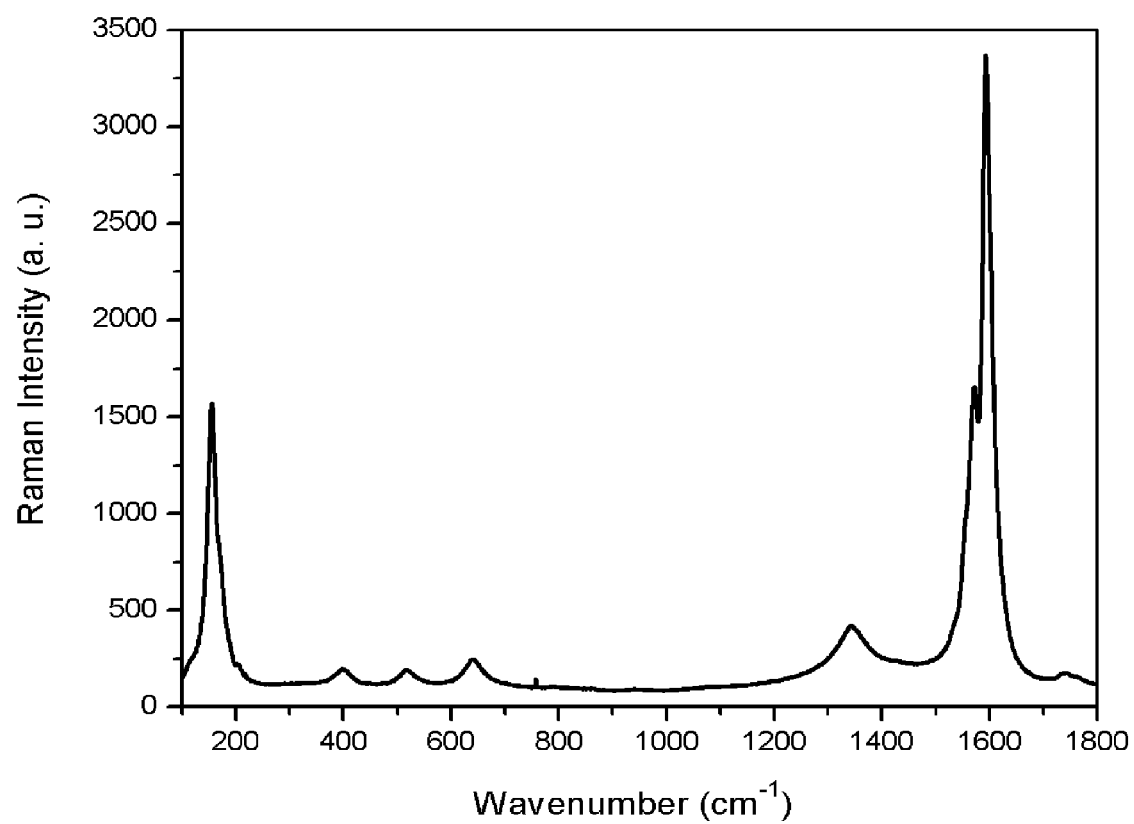
FIG. 9 shows the 532 nm Raman spectrum of the TiO$_z$ filled SWCNTs.

This example was carried out in the same manner as described in Example 2, except that after the iodine removal step, i.e., after the furnace was cooled to a room temperature, the gas mixture consisting essentially of about 3% hydrogen and about 97% argon was replaced with air and the article was oxidized for about 30 minutes after the furnace temperature reached to about 300° C. A Raman spectrum of this article is shown in FIG. 9. The two peaks, one at about 153 $cm^{-1}$ and the other at about 168 $cm^{-1}$, belonging to Ti filled SWCNTs, were masked in this spectrum with the presence of an intense peak at about 145 $cm^{-1}$. This intense peak and three ancillary peaks at about 395 $cm^{-1}$, about 514 $cm^{-1}$, and about 637 $cm^{-1}$ indicated that the titanium filling was converted into the $TiO_z$ filling after about 30 minutes of oxidation. This experiment demonstrated that the oxidation time may be decreased by increasing the oxidation temperature.

Example 7

$TiO_z$ Filled and Coated SWCNT Articles

In this example, $TiO_z$ filled and coated SWCNTs were prepared. This example was carried out in the same manner as described in Example 3, except that after the iodine removal step, i.e., after the furnace was cooled to a room temperature, the gas mixture consisting essentially of about 3% hydrogen and about 97% argon was replaced with air and the article was oxidized for two hours at about 500° C. $TiO_z$ filled and coated SWCNTs were thereby prepared.

Figure 10:
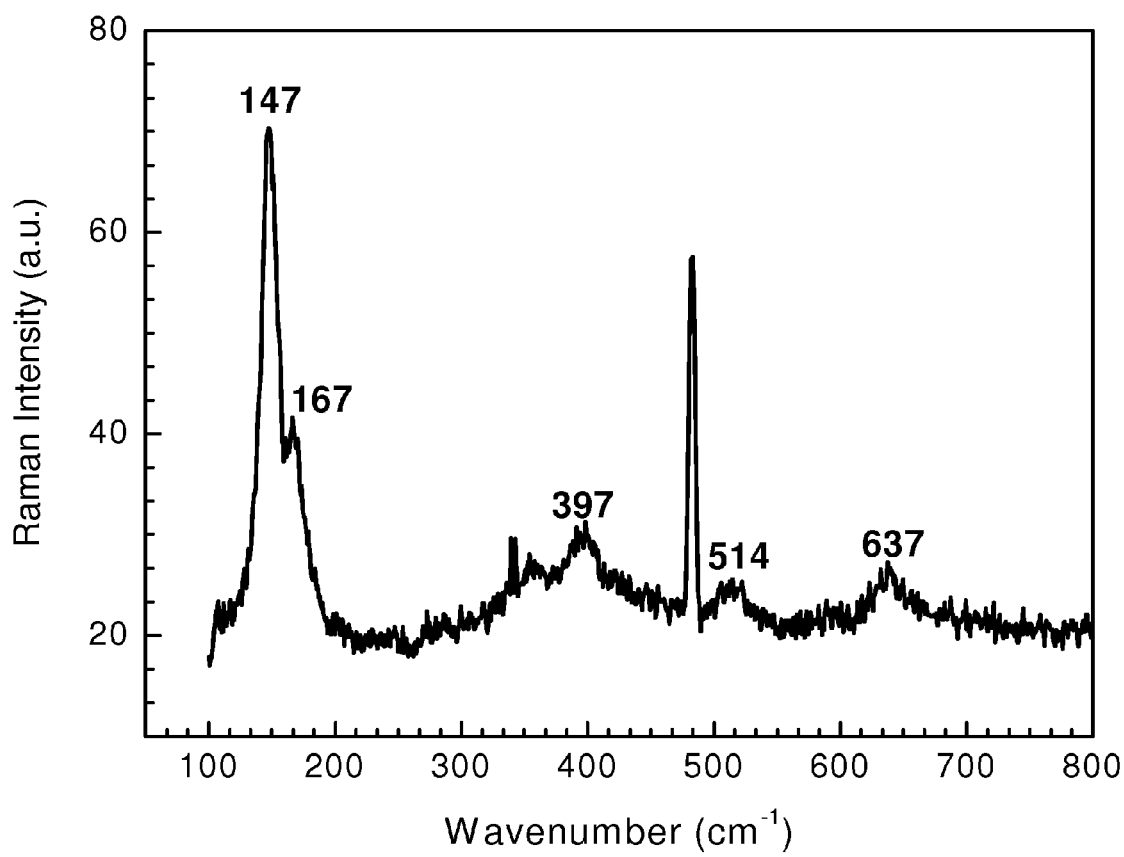
FIG. 10 shows the 532 nm excitation Raman spectrum of TiO$_z$ filled and coated SWCNTs.

The Raman spectrum of the $TiO_z$ filled and coated SWCNTs acquired at a laser excitation wavelength of about 532 nm is shown in FIG. 10. Characteristic peaks at about 147 $cm^{-1}$, about 397 $cm^{-1}$, about 514 $cm^{-1}$, and about 637 $cm^{-1}$ are consistent with anatase form of $TiO_2$. This article also had a Raman peak at about 1592 $cm^{-1}$ corresponding to the G-band of the SWCNTs (not shown in FIG. 10). The peak around 483 $cm^{-1}$ was a non-repeatable spurious peak and thereby ignored.

Example 8

$TiN_y$ Filled and Coated SWCNT Articles

In this example, $TiN_y$ filled SWCNTs were prepared, where y varies in the range of 0 to 1. This example was carried out in the same manner as described in Example 3, except that after the iodine removal step, i.e., after the furnace was cooled to room temperature, the gas mixture consisting essentially of about 5% hydrogen and about 95% argon was replaced with nitrogen and the article was nitrogenated as follows. First, the material was heated from room temperature to about 500° C. within 20 minutes at a pressure of less than 40 mTorr and held at about 500° C. for about 30 minutes under the same pressure. Then, a gas mixture of about 5% hydrogen and about 95% argon was introduced at a gas flow rate of about 100 cm$^3$/min at a temperature of about 500° C. and the pressure was raised to about 10 Torr. After this step, the temperature was increased from about 500° C. to about 600° C. within 30 minutes. At about 600° C., the gas flow rate was reduced to about 50 cm$^3$/min while the pressure was maintained at about 10 Torr. Then nitrogen was introduced and the pressure in the tube was adjusted to a pressure of about 20 Torr. And this gas treatment was continued for about 2 hours at about 600° C. The hydrogen-argon gas flow was then stopped and only the nitrogen was allowed to flow for about 2 more hours at about 600° C. Finally, the furnace was cooled to room temperature in nitrogen. TiN$_y$ filled and coated SWCNT articles were thereby prepared.

Figure 11:
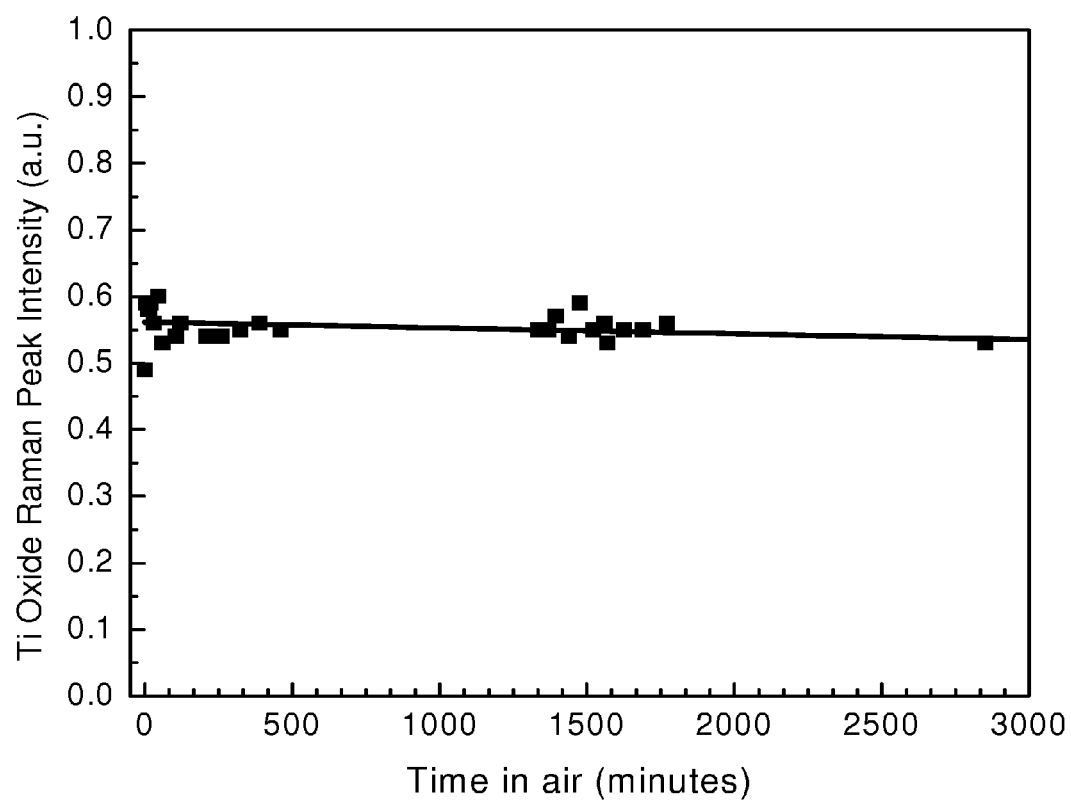
FIG. 11 shows the variation of the Raman peak at 145 cm$^{-1}$ of the TiN$_y$ filled SWCNTs as a function of the air exposure time.

The TiN$_y$ filled and coated SWCNT article was exposed to air at room temperature for about 24 hours. The Raman spectrum was recorded periodically during this time. The intensity of the Raman peak at about 145 cm$^{-1}$ was monitored as described in Example 5. FIG. 11 shows the corresponding oxidation profile. Negligible change in the intensity of this peak indicated that this article was resistant to the oxidation and stable in air. Because the oxidation of titanium did not occur, it was accepted that the titanium was nitrogenated to TiN$_y$ during this nitrogenation treatment.

Example 9

TiO$_z$ Filled and Coated SWCNT Articles

In this example, TiO$_z$ filled and coated SWCNTs were prepared. First, TiN$_y$ filled and coated SWCNTs were prepared in the same manner as described in Example 8. Then, these nanorods were heated to about 600° C. under a pressure of less than 40 mTorr and kept at this temperature for about 2 hours. After this heating step, the nanorods were cooled to room temperature and oxidized in air in the same manner as described in Example 5. TiO$_z$ filled and coated SWCNT articles were thereby prepared.

Figure 12:
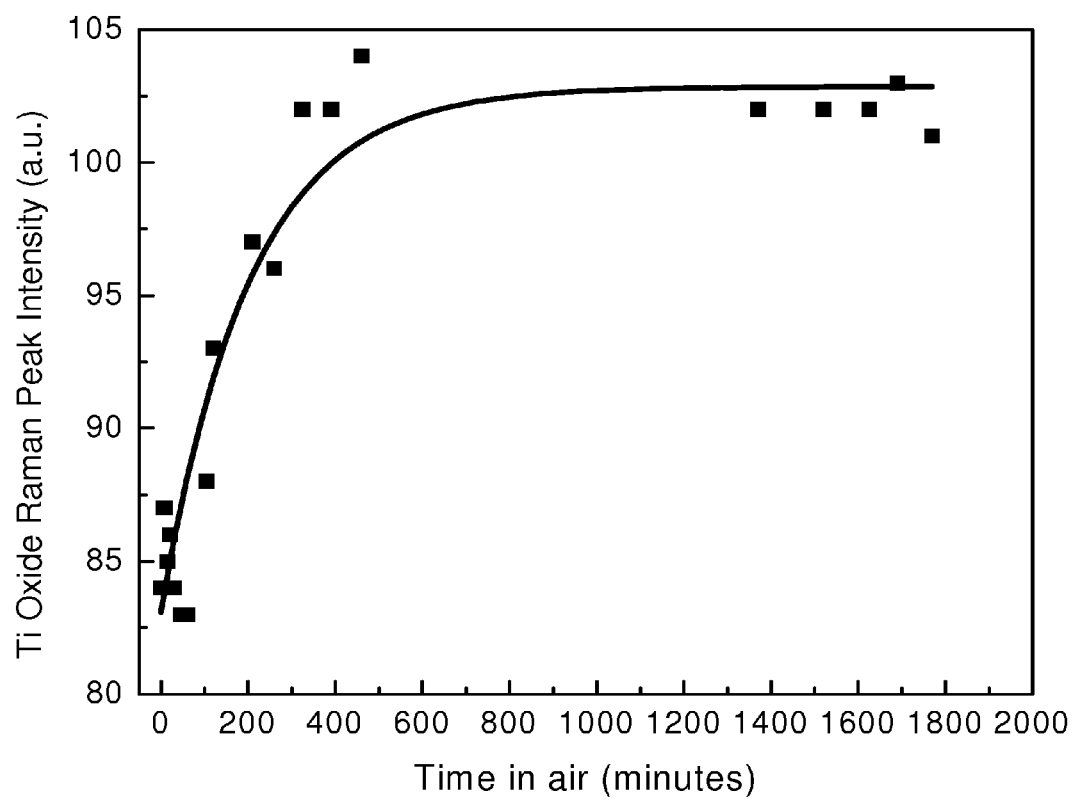
FIG. 12 shows the variation of the Raman peak at 145 cm$^{-1}$ of the TiO$_z$ filled and coated SWCNTs as a function of the air exposure time.
Figure 13:
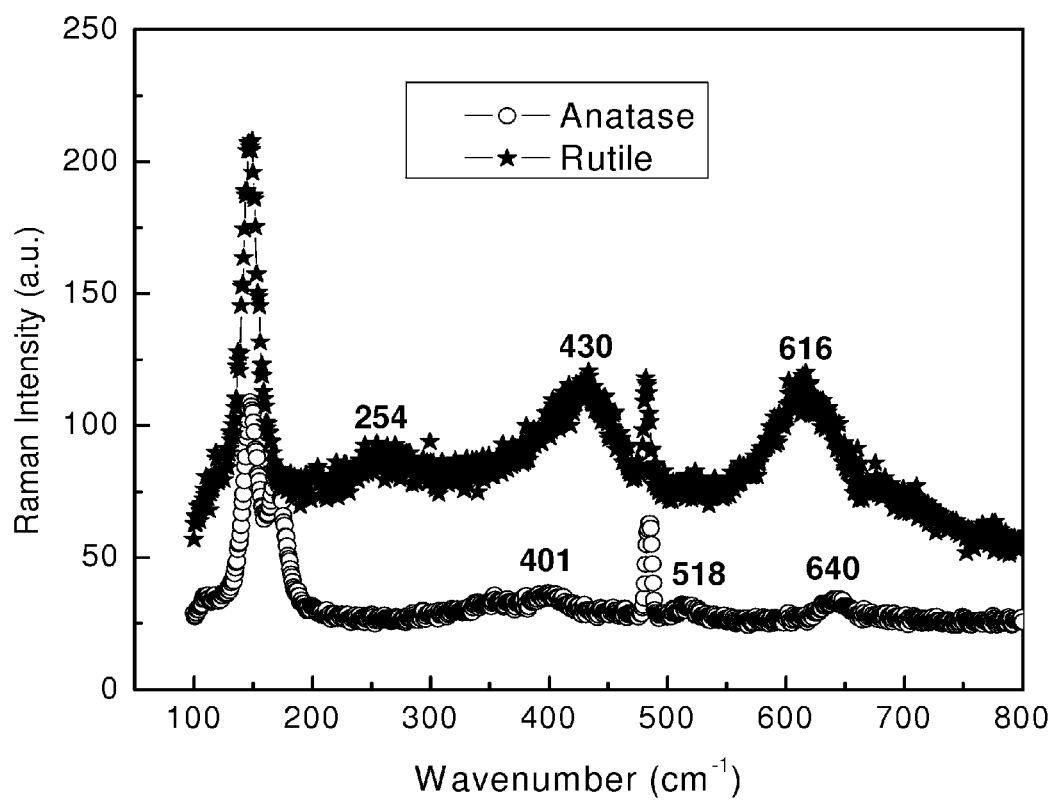
FIG. 13 shows the 532 nm excitation Raman spectra of TiO$_z$ filled and coated SWCNTs taken from the same article but at two different locations.

The oxidation profile of the material was followed by Raman spectroscopy measurement as described in Example 5. The results, shown in FIG. 12, were similar to that observed with the TiO$_z$ filled SWCNT articles described in Example 5. These results further demonstrated Ti metal or TiN$_y$ may be controllably oxidized to TiO$_z$. FIG. 13 shows the Raman spectra of the TiO$_z$ filled and coated SWCNT articles acquired at a laser excitation wavelength of about 532 nm. Two spectra were taken from the same article but at two different locations. One spectrum corresponded to an anatase form of TiO$_2$ (about 401 cm$^{-1}$, about 518 cm$^{-1}$ and about 640 cm$^{-1}$) and the other to a rutile form of TiO$_2$ (about 254 cm$^{-1}$, about 430 cm$^{-1}$ and about 616 cm$^{-1}$). This result indicated that TiO$_z$ filling and coating comprised a mixture of anatase and rutile phases.

Example 10

TiH$_w$ Filled SWCNT Articles

In this example, TiH$_w$ filled SWCNTs were prepared, where w varies in the range of 0 to 2. First, Ti filled SWCNTs were prepared in the same manner as described in Example 2. Then, these nanorods were placed in an air-free chamber and heated to about 650° C. in vacuum for at least 2 hours to remove volatile compounds. After the removal of volatile compounds, the temperature was decreased to about 500° C. and the chamber was pressurized to about 500 Torr with hydrogen. The nanorods were hydrogenated by keeping them at this temperature for at least one hour. Finally, the hydrogenated nanorods were cooled to a room temperature. TiH$_w$ filled SWCNT articles were thereby prepared.

These nanorods were later heated to a temperature in the range of 400° C. to 650° C. to release the hydrogen from the nanorods. The hydrogen evolution was followed by using a mass spectrometer. The evolution started at about 200° C. and became considerable at about 400° C. The total amount of hydrogen evolved from the nanorods indicated that at least 80% by weight of titanium was hydrogenated, i.e., forming TiH$_{0.800}$. This result demonstrated that Ti filled SWCNTs may be used in preparation of hydrogen storage devices and the hydrogen evolution may be achieved at temperatures as low as 200° C.

Examples 11 to 16

Metal Filled and Coated SWCNT Articles

In these examples, the starting SWCNTs were filled with various metals in the same manner as described in Example 2, except that iodides of Mn, Fe, Co, Ni, Pd, or Pt were used instead of TiI$_4$. The articles comprising Mn filled and coated SWCNTs, Fe filled and coated SWCNTs, Co filled and coated SWCNTs, Ni filled and coated SWCNTs, Pd filled and coated SWCNTs, or Pt filled and coated SWCNTs were thereby prepared.

Figure 14:
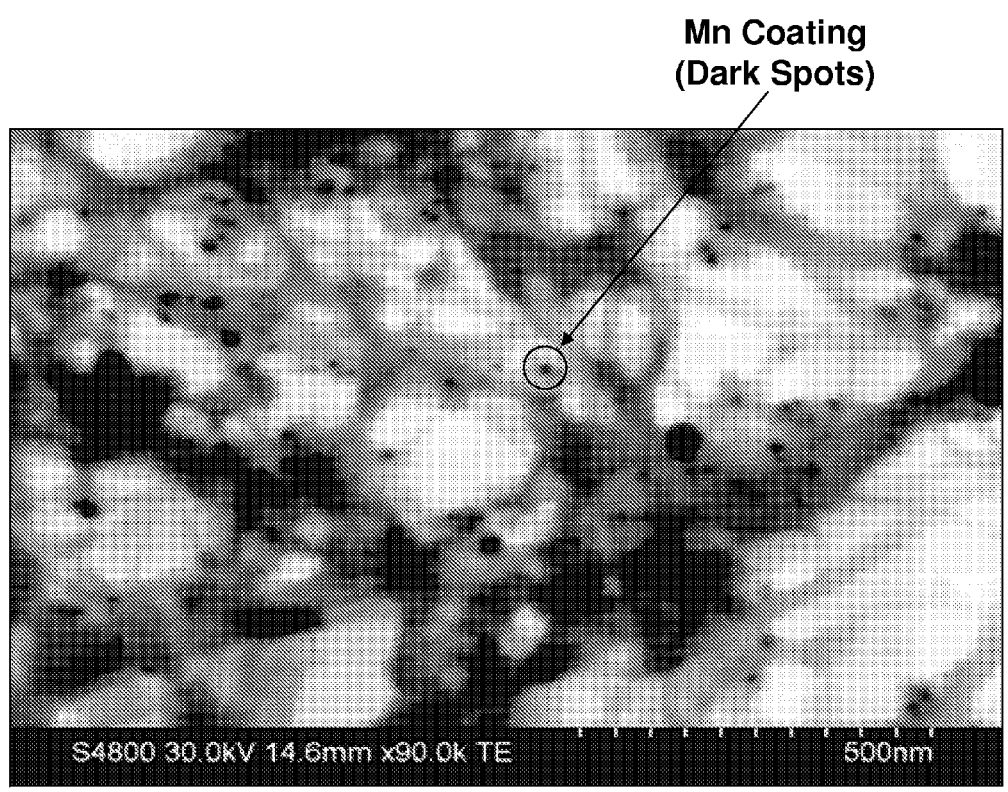
FIG. 14 shows the transmission electron micrograph of Mn coated and filled SWCNT bundles.
Figure 15:
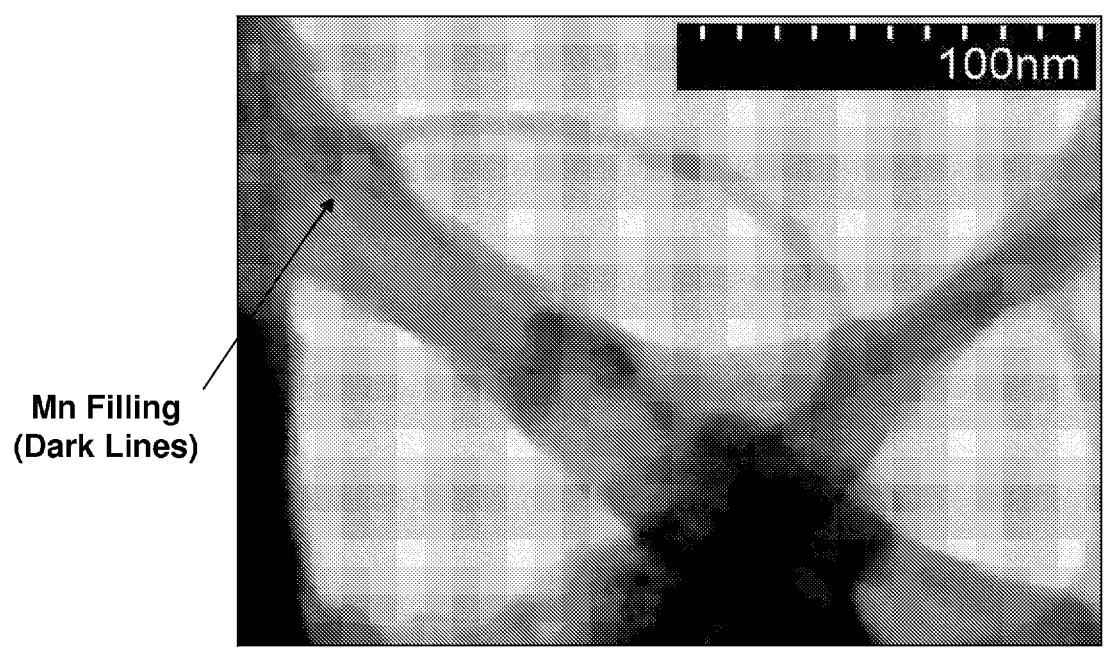
FIG. 15 shows the transmission electron micrograph of Mn coated and filled SWCNT bundles.
Figure 16:
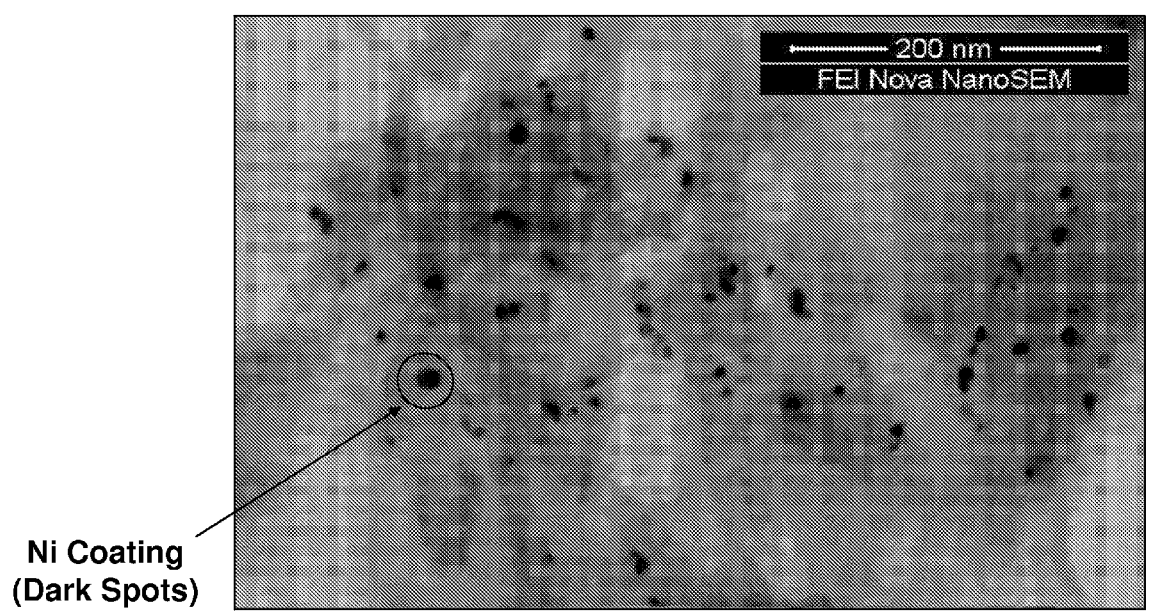
FIG. 16 shows the transmission electron micrograph of Ni coated and filled SWCNT bundles.
Figure 17:
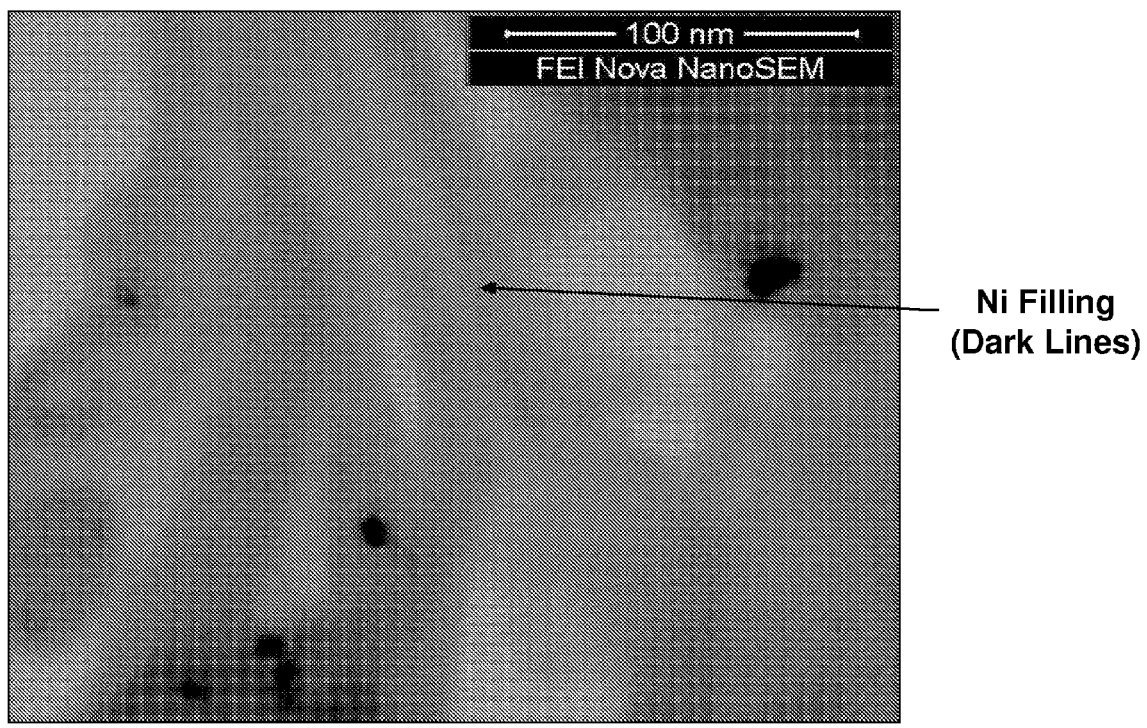
FIG. 17 shows the transmission electron micrograph of Ni coated and filled SWCNT bundles.
Figure 18:
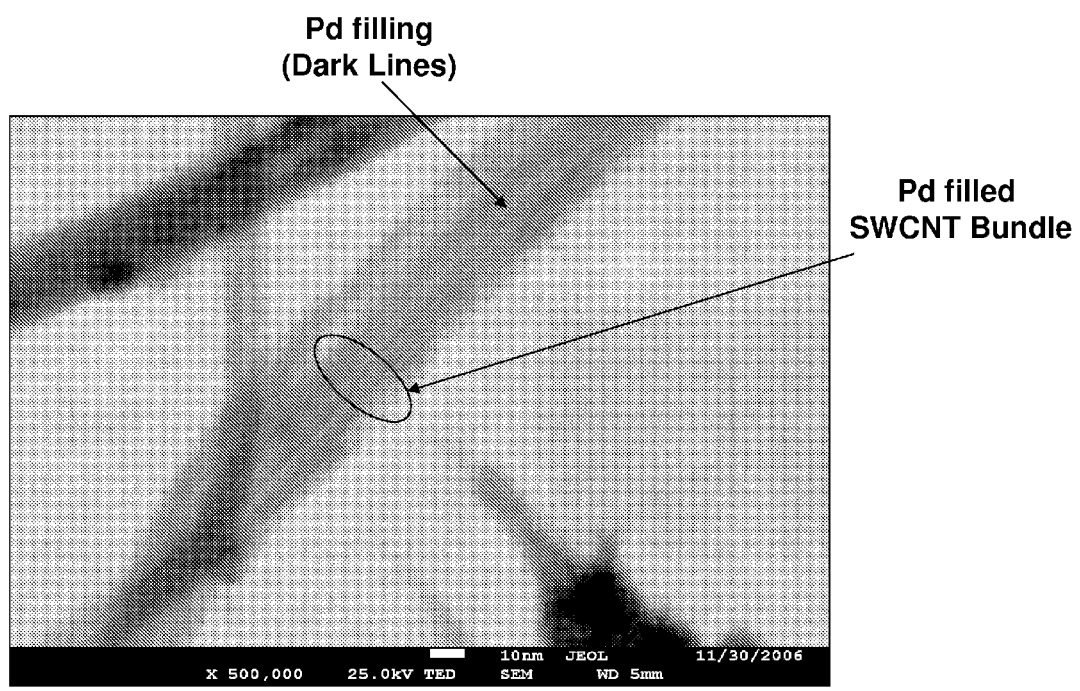
FIG. 18 shows the transmission electron micrograph of Pd coated and filled SWCNT bundles.
Figure 19:
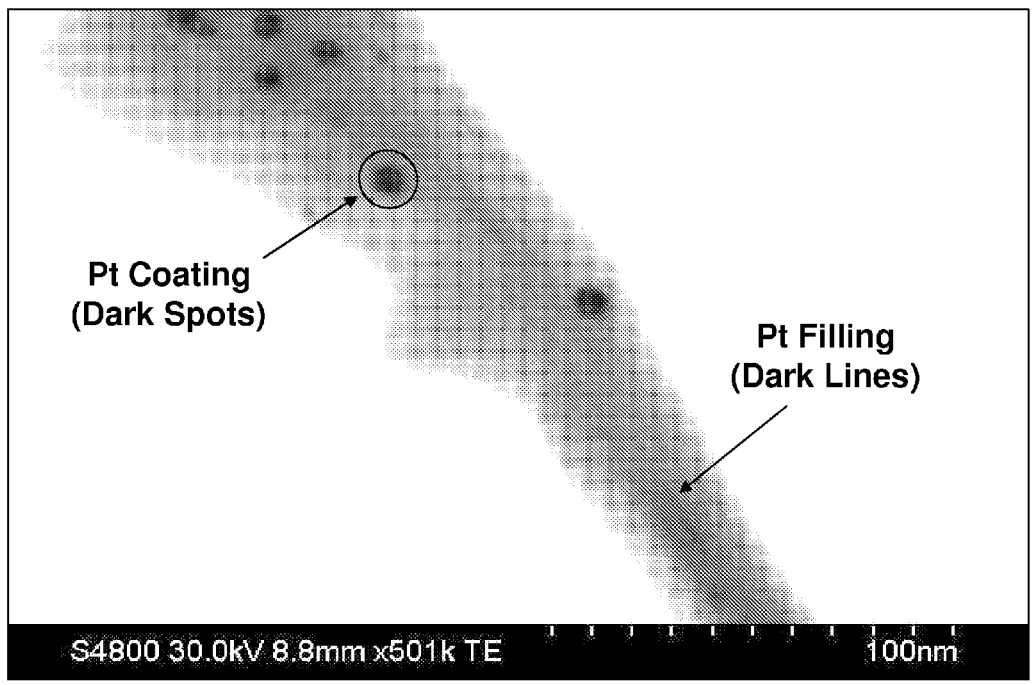
FIG. 19 shows the transmission electron micrograph of Pt coated and filled SWCNT bundles.

Micrographs, taken by Scanning Transmission Electron Microscopy (STEM), of the Mn filled and coated SWCNTs are shown in FIGS. 14 and 15, Ni filled and coated SWCNTs in FIGS. 16 and 17, Pd filled and coated SWCNTs in FIG. 18, and Pt filled and coated SWCNTs in FIG. 19. Dark lines observed in the SWCNT bundles were accepted to be due to the non-carbon filling and dark spots on the SWCNT bundles were the non-carbon coating.

These micrographs indicated that the ethanol washing did not completely remove the halogenated precursors and as a result, non-carbon coatings that had particulate forms were incorporated to the SWCNTs.

This example demonstrated that the process disclosed in Example 2 may be used to incorporate various metals to SWCNTs. It further demonstrated that the amount of non-carbon compound may be controlled.

Example 17

Preparation of the Si/TiN/Fe Growth Article

In this example, silicon wafers were first coated with the metal-layer comprising TiN and then coated with the catalyst-layer comprising iron by using a magnetron sputtering equipment manufactured by Denton Vacuum (Moorestown, N.J.) with a model number DV502. The silicon wafers were cleaned in three steps as follows. In a first cleaning step, a 100 millimeter diameter silicon wafer was cut into about 10 millimeters×about 100 millimeters strips. These strips were placed in a 4 to 5 weight percent detergent/water solution and sonicated for about 5 minutes. These strips then were washed with deionized water for at least one minute and finally dried by blowing dry nitrogen gas. In a second cleaning step, a solution was prepared to contain deionized water, hydrogen peroxide, and ammonium hydroxide with a volume ratio of 5:1:1 respectively. The silicon strips cleaned in the first step were placed in this solution and heated at about 80° C. for at least 20 minutes. These strips then were washed with deionized water for at least one minute and finally dried by blowing dry nitrogen gas. In a third cleaning step, a solution was prepared to contain about 7 volume percent hydrofluoric (HF) acid/water solution. The silicon strips cleaned in the second step were placed in this solution and kept in it for 30 to 35 seconds. These strips then were washed with deionized water for at least one minute and finally dried by blowing dry nitrogen gas.

After the third cleaning step, the silicon strips were placed on a rotatable table in a sputtering deposition chamber. The silicon strips on the rotatable table were positioned in the range of 3 cm to 7 cm beneath a circular planar DC magnetron with about 5 cm diameter target attached to its face. At least 99.9 weight percent pure titanium (Ti) target was used for the sputtering. The chamber was closed and evacuated. It then was pressurized to about 3.5 millitorr total pressure by providing about 0.5 millitorr nitrogen and about 3.0 millitorr argon. The plasma was formed by a DC magnetron energized at about 376 volts giving about 150 watts applied power to the magnetron. The sample table was rotated with a speed of about 15 rpm. After the formation of the plasma, the shutter covering the rotatable table was opened and the TiN layer was deposited on the silicon strips by reactive sputtering for about 30 minutes. The thickness of the TiN layer was measured by a profilometer manufactured by Veeco Instruments Incorporated (Woodbury, N.Y.) with a model number DEKTAK3030FT. The thickness was determined to be about 172.0 nanometers.

After the determination of the TiN layer thickness, the silicon strips were placed on the rotatable table in the sputtering chamber. An iron target was prepared as follows. A low carbon steel stock was cut to form a disk with a diameter of about 50.8 millimeter and a thickness of about 1.6 millimeter. A hole was machined at the center of this disk. Then, a graphite disk with a diameter of about 25.4 millimeter and a thickness of about 1.6 millimeter was placed in this hole forming the iron target. The titanium target was replaced with the iron target. The chamber was closed and evacuated. It then was pressurized to about 7.0 millitorr total pressure by providing argon. The plasma was formed by a DC magnetron energized at about 373 volts giving about 100 watts applied power to the magnetron. The sample table was rotated with a speed of about 15 rpm. After the formation of the plasma, the shutter was opened and the iron layer was deposited on the silicon strips for about 95 seconds. The thickness was determined to be about 8.1 nanometers as measured by the profilometer.

As a result, a layered growth article structure of Si/TiN/Fe containing a silicon substrate, a TiN layer, and an iron (Fe) layer was obtained.

Example 18

Preparation of the Glass/TiN Growth Article

Figure 20:
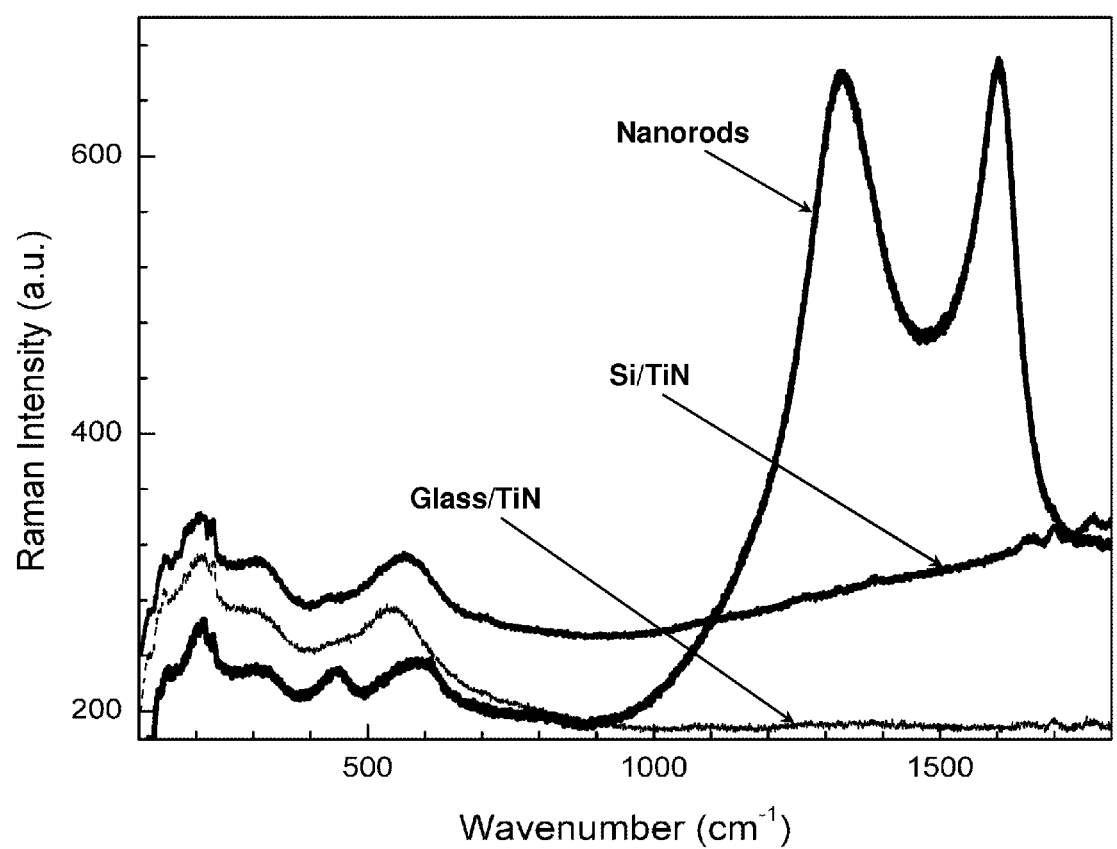
FIG. 20 shows the 633 nm excitation Raman spectra of the glass coated with a TiN layer, the silicon coated with a TiN layer and the TiN filled carbon nanotubes (nanorods).
Figure 21:
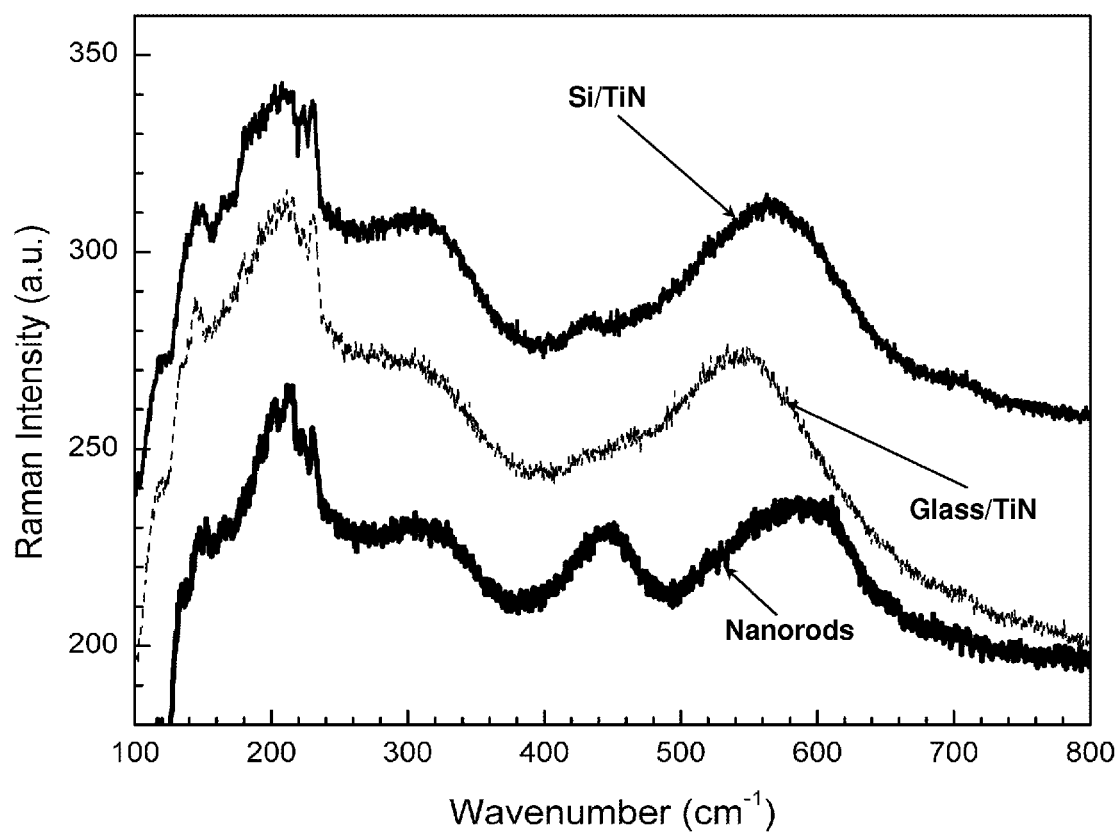
FIG. 21 shows the 633 nm excitation Raman spectra of the glass coated with a TiN layer, the silicon coated with a TiN layer and the TiN filled carbon nanotubes (nanorods).

In this example, a borosilicate glass slide (glass) was coated with a TiN layer in the same manner as described in Example 17, except that the iron layer was not deposited on the TiN layer. Thus, the article obtained in this example had a layered structure of glass/TiN. This article was then analyzed by a Raman spectrometer, manufactured by Horiba Jobin-Yvon, Edison, N.J., under a catalog name LabRamHR Raman Microscope at a laser excitation wavelength of about 633 nm. The analysis results are shown in FIGS. 20 and 21.

Example 19

Preparation of the Si/TiN Growth Article

In this example, a silicon wafer was coated with a TiN layer in the same manner described in Example 17, except that the iron layer was not deposited on the TiN layer. Thus, the article obtained in this example had a layered structure of Si/TiN. This article was then analyzed by the Raman spectrometer. The analysis results are shown in FIGS. 20 and 21.

Example 20

TiN Filled Carbon Nanorods

In this example, the nanorods were grown on the Si/TiN/Fe growth article prepared in Example 17 by using a chemical vapor deposition (CVD) technique as follows. The Si/TiN/Fe article was placed in a quartz tube. The inner pressure of the tube was reduced to about 300 Torr. At this pressure, the inner atmosphere of the tube was replaced with an atmosphere consisting essentially of about 3% hydrogen and about 97% argon. The quartz tube was electrically heated from an ambient temperature to about 800° C. within about 0.2 hour. When the temperature reached to about 800° C., the inner pressure was reduced to about 7 Torr. At this step, the atmosphere consisted essentially of about 3% hydrogen and about 97% argon.

Prior to heating the quartz tube, a steel bottle was filled with ethanol and placed in a water bath. This bottle then was connected to the gas supply line of the quartz tube through a stop valve and a needle valve. The water bath was heated to about 100° C., while the stop valve was kept closed. When the quartz tube reached to the temperature of about 800° C. and the inner pressure was reduced to about 7 Torr, the stop valve was opened to provide ethanol vapor to the inner volume of the quartz tube. By using the needle valve attached to the steel bottle, the total inner pressure of the quartz tube was controlled at about 17 Torr, thereby keeping the partial pressure of the ethanol at about 10 Torr in the growth environment.

The ethanol vapor flowing over the Si/TiN/Fe article caused the growth of the nanorods. The stop valve attached to the steel valve was kept open for about 30 minutes. Finally, the valve was closed, the furnace heating was shut off, and the Si/TiN/Fe article was cooled to the ambient temperature in an atmosphere consisting essentially of about 3% hydrogen and about 97% argon.

Figure 22:
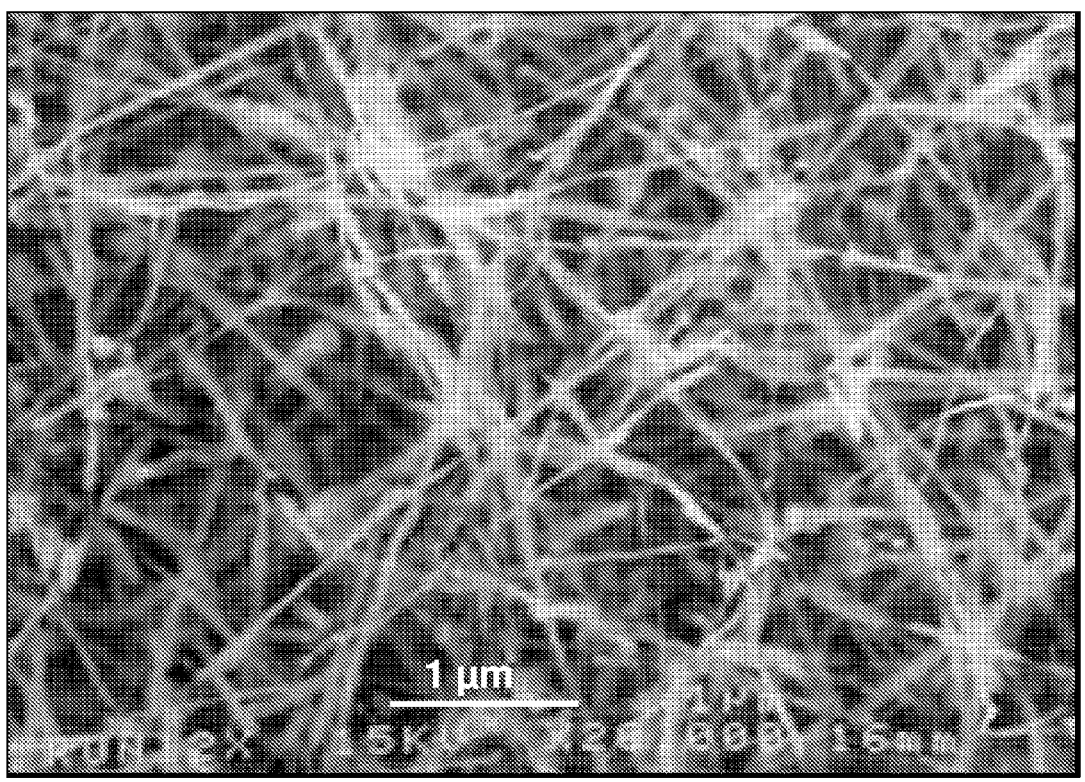
FIG. 22 shows the scanning electron micrograph of the TiN filled carbon nanotubes grown on the Si/TiN/Fe article.

The Si/TiN/Fe article was analyzed by a scanning electron microscope (SEM), manufactured by JEOL Inc. (Peabody, Mass.) with a model number JSM6401F. As shown in FIG. 22, the nanorods were grown on the Si/TiN/Fe article. These nanorods had straight elongated structures. These nanorods were then analyzed by the Raman spectrometer. The analysis results are shown in FIGS. 20 and 21.

As shown in FIG. 20, the Raman spectra of the nanorods had two large peaks, one at about 1,325 $cm^{-1}$ and the other at about 1,600 $cm^{-1}$, while those of the glass/TiN article prepared in Example 18 and the Si/TiN article prepared in Example 19 did not have peaks at these wavelengths. These two peaks were assigned to as D-band and G-band of graphitic carbon respectively, as well known in the prior art. This result indicated that the nanorods grown on the Si/TiN/Fe article comprise carbon.

As shown in FIG. 21, the Raman spectra of the glass/TiN article had three peaks, one in the range of 210 cm$^{-1}$ to 230 cm$^{-1}$, the second in the range of 300 cm$^{-1}$ to 310 cm$^{-1}$, and the third at about 550 cm$^{-1}$. The nanorods as well as the Si/TiN article had similar three peaks, indicating that the nanorods also comprised TiN. However, the peak appeared at about 550 cm$^{-1}$ for the glass/TiN article shifted to about 560 cm$^{-1}$ for the Si/TiN article and to about 610 cm$^{-1}$ for the nanorods. There was a peak at about 440 cm$^{-1}$ for the nanorods. A small peak appeared for the Si/TiN article in the range of 420 cm$^{-1}$ to 440 cm$^{-1}$. In a publication entitled "Raman Scattering, Superconductivity, and Phonon Density of States of Stoichiometric and Non-stoichiometric TiN", Physical Review B, 1978, Vol. 17, No. 3, pages 1095-1101, Spengler et al. described that a perfect TiN crystal does not have a Raman scattering, but any deviation from this perfect structure, for example presence of any vacancies in the lattice, may cause the Raman scattering. The more the deviation, the more pronounced the Raman scattering will be. Then, as shown in FIG. 21, the peaks appearing in the range of 550 cm$^{-1}$ to 610 cm$^{-1}$, 210 cm$^{-1}$ to 230 cm$^{-1}$, and 300 cm$^{-1}$ to 310 cm$^{-1}$ indicated that the TiN of the present invention was not a perfect TiN crystal. The TiN of the nanorods had a considerable deviation from that of the perfect TiN crystal structure, as evidenced from the peak appeared at about 440 cm$^{-1}$ for the nanorods.

Figure 23:
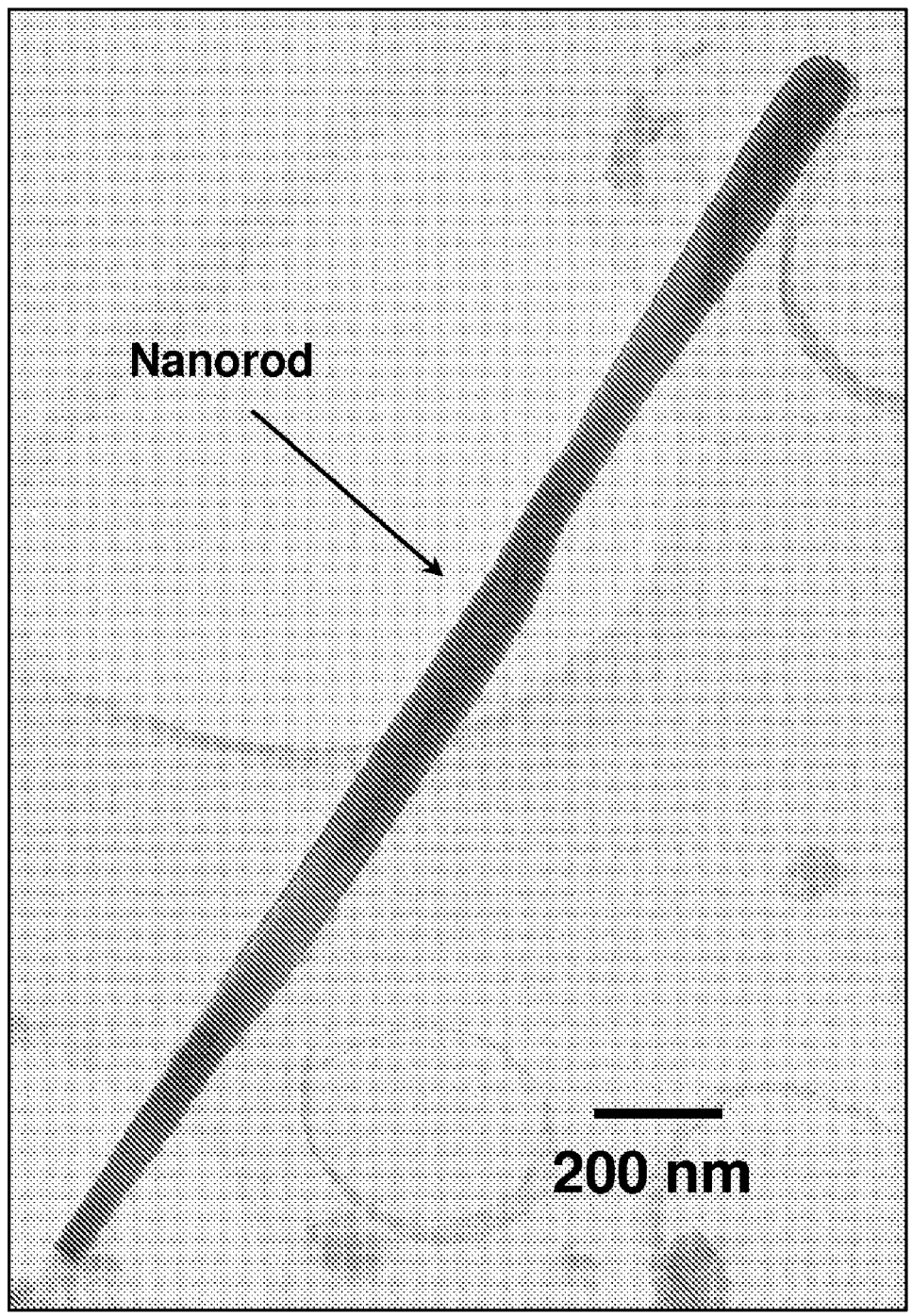
FIG. 23 shows the scanning electron micrograph of the nanorod grown on the Si/TiN/Fe article.
Figure 24:
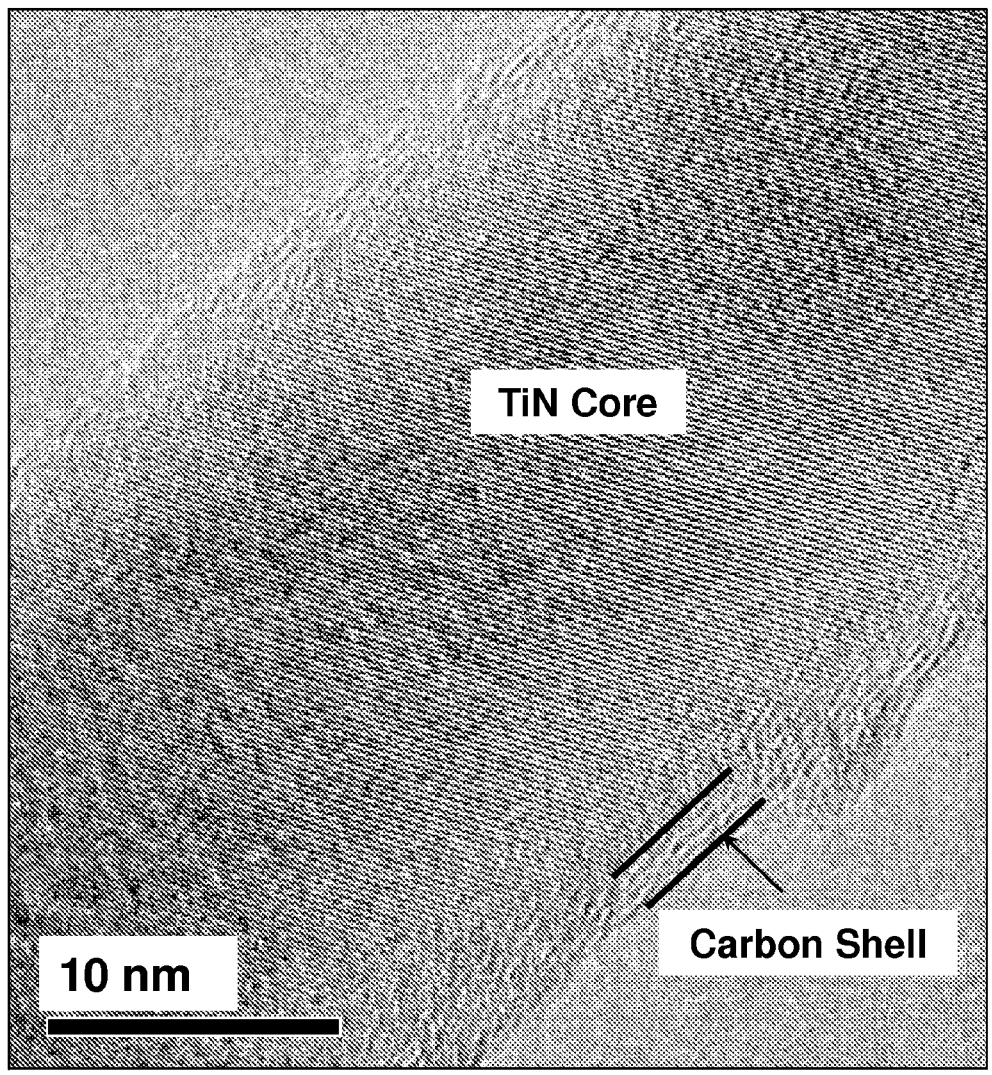
FIG. 24 shows the scanning electron micrograph of the nanorod grown on the Si/TiN/Fe article.
Figure 25:
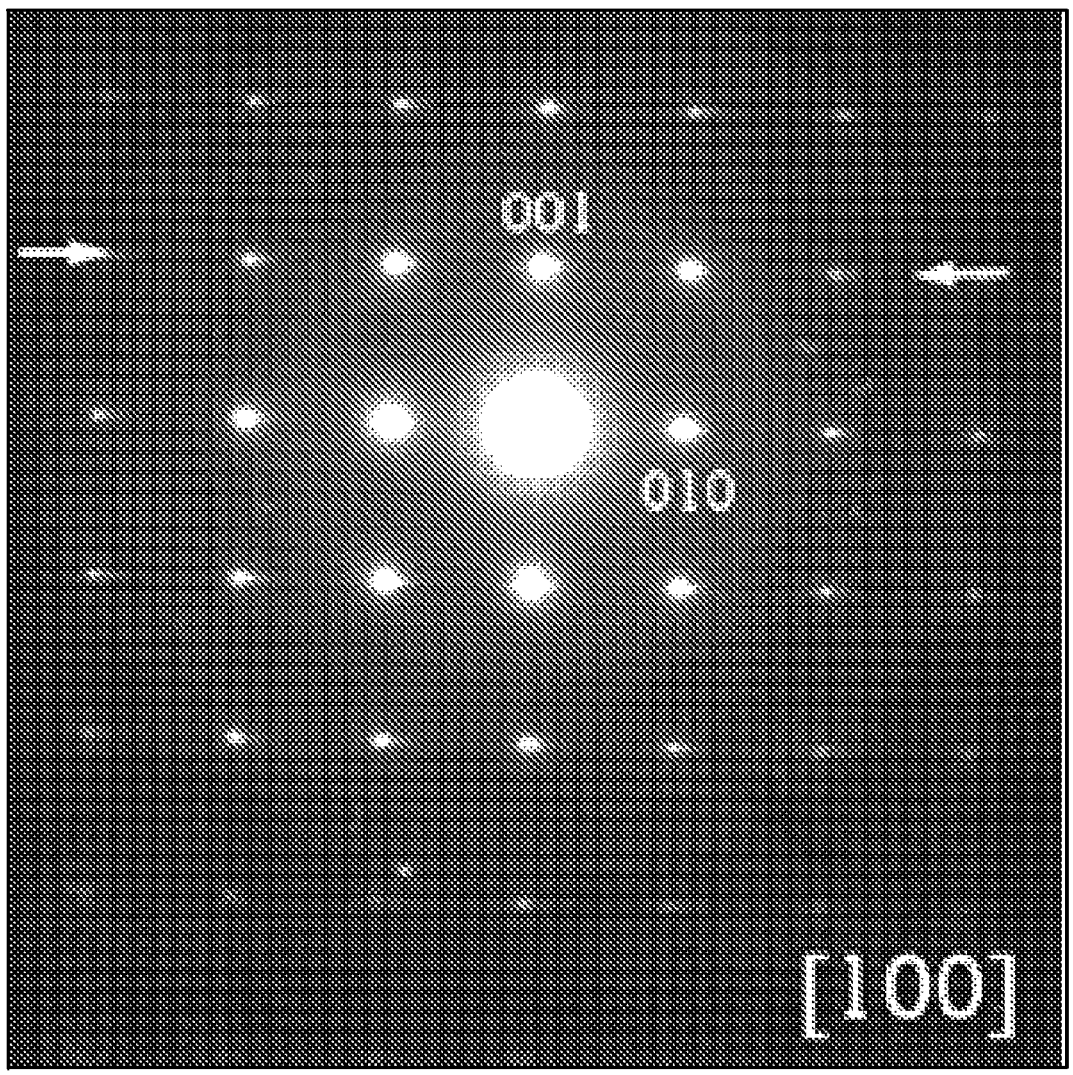
FIG. 25 shows the selected area electron diffraction of the nanorod grown on the Si/TiN/Fe article.

The nanorods were further analyzed by a transmission electron microscope (TEM), manufactured by JEOL Inc. (Peabody, Mass.) with a model number JEOL2010 HRTEM. Before this analysis, the nanorods were scraped off of the surface of the growth article into about 5 milliliters of isopropanol and then sonicated for about 30 minutes to obtain a dispersion. This dispersion was later dispensed on a TEM grid for analysis. The following results were obtained by this analysis. An example of a nanorod is shown in FIG. 23. The high magnification of this nanorod was shown in FIG. 24. This nanorod had a different structure at its edge than that at its core. The edge had a layered structure forming a shell around a well ordered crystal structure at the nanorod core. The selected area electron diffraction analysis done by using the TEM revealed the crystal structure of the core. One example of the selected area diffraction micrographs is shown in FIG. 25. According to this analysis, the core had lattice parameters of a=4.88 Å, b=3.42 Å, and c=3.08 Å. These TEM results indicated that the shell with layered structure may comprise carbon and the core with well ordered crystal structure may comprise TiN. Since standard TiN had a cubic structure with a lattice parameter of a=b=c=4.236 Å, the TiN that formed the core may be distorted under the strain caused by the carbon shell.

Example 21

Ti Filled SWCNT Articles

In this example, the single-wall carbon nanotubes (SWCNTs), purchased from Carbon Solutions Inc. (Riverside, Calif.) with a catalog number P2-SWNT were filled with titanium (Ti). The starting SWCNTs were processed as follows. The SWCNTs, weighed about 500 mg, were placed in a 50 ml three-necked round bottom Pyrex flask, which was equipped with a heating mantle, a thermocouple, a magnetic stirrer, a reflux condenser and two addition arms. The flask was connected to a vacuum system through a liquid nitrogen trap.

The titanium iodide crystals (TiI$_4$) used in this example were purchased from Aldrich with a catalog number 458449. The bromine (Br$_2$) was purchased from Aldrich with a catalog number 470864. TiI$_4$ (about 2.2 gram) was placed in the flask's first addition arm in a nitrogen-filled glove box. The end of the addition arm was covered to protect the mixture from atmospheric moisture. The addition arm was then taken out of the glove box, connected to the reaction flask. Br$_2$ (about 5 milliliter) was then placed in the second addition arm. Stirring was begun and about 4 milliliter Br$_2$ quickly added to the flask containing SWCNTs. The SWCNT and Br$_2$ mixture was then heated to a temperature in the range of 40° C. to 59° C. After heating at this temperature for about 1 hour, the remaining about 1 milliliter of Br$_2$ was added to the flask. After heating and mixing at this temperature for about 1 more hour, TiI$_4$ was slowly added to the mixture within about 5 minutes. The SWCNT/Br$_2$/TiI$_4$ mixture was heated and stirred at the same temperature for about 2 more hours. After this halogenation reaction, a distillation condenser was connected to the flask, the mixture was heated to a temperature of about 200° C. within 20 minutes, thereby removing Br$_2$ from the mixture by evaporation. The flask was then cooled to a temperature below 100° C. and remaining Br$_2$ was removed under vacuum for about 5 minutes. Finally, the flask was cooled to room temperature, transferred to a nitrogen-filled glove box, and the halogenated SWCNT intermediate was removed from the flask.

The intermediate was washed as follows. First, the intermediate was placed into a centrifuge tube, about 25 milliliter absolute ethanol (Aldrich Cat. No. 459836) was added on the intermediate, and the mixture was centrifuged at a centrifugal force of about 10,000 g for about 15 minutes. After the centrifugation, the supernatant was carefully separated from the precipitate. This ethanol addition, the centrifugation and the supernatant separation process were repeated for four more times. Finally, the precipitate obtained after this process was dried overnight in the glove box. It was assumed that this washing completely removed the TiI$_4$ coating, leaving behind only TiI$_4$ filled SWCNTs.

After this washing, the intermediate was placed in a quartz cuvette, transferred to a graphite vacuum furnace and the furnace was evacuated to a pressure below 50 mTorr. The furnace was then heated at about 10 Torr pressure in a gas mixture of about 5% hydrogen with Ar flowing at a rate of about 3.5 liters/minute as follows. The furnace was first heated to about 300° C. with a rate of about 300° C./hour and kept at this temperature for about 0.5 hour, then heated to about 600° C. with a rate of about 300° C./hour and kept at this temperature for about 3 hours, finally cooled to room temperature with a rate of about 300° C./hour. The Ti filled SWCNT article was thereby prepared.

Another article was prepared in the same manner described above in this example, except that this article was not washed. The Ti filled and coated SWCNT article was thereby prepared.

Figure 26:
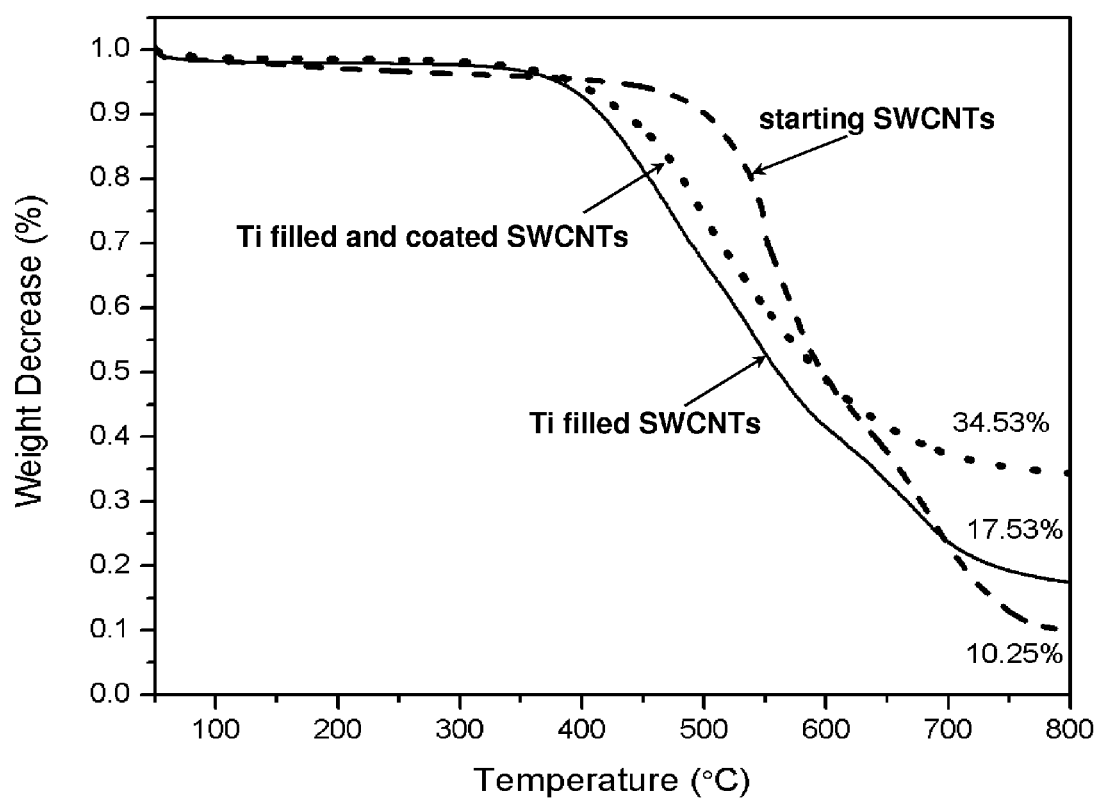
FIG. 26 shows the weight decrease of starting SWCNTs, Ti filled SWCNTs and Ti filled and coated SWCNTs as a result of heating in air.

The amount of Ti filling and/or coating was determined by the TGA based technique described as follows. The Ti filled SWCNT article, the Ti filled and coated SWCNT article, and a starting SWCNTs were heated in air between room temperature and 800° C. with a heating rate of about 2° C./minute and the weight decrease was determined by using a balance. The results are shown in FIG. 26. After the heating, the starting SWCNTs left about 10.25 weight % residue, the Ti filled SWCNT article about 17.53 weight % residue and the Ti filled and coated SWCNT article about 34.53 weight % residue. The weight difference between the Ti filled SWCNT article and the starting SWCNTs, i.e. 17.53%-10.25%=7.28% was treated as due to TiO$_2$ filling or 4.36% Ti. The weight difference between the Ti filled and coated SWCNT article and the starting SWCNTs, i.e. 34.53%-

10.25%=24.28% was treated as due to TiO$_2$ filling and coating or 14.53% Ti. The amounts of titanium filling and titanium filling and coating were thereby determined.

This TGA technique indicated that the starting SWCNTs were filled in this example with titanium forming an article comprising SWCNTs filled with about 4.36 weight % titanium. It also indicated that an article comprising SWCNTs filled and coated with about 14.53 weight % titanium were prepared.

Example 22

Preparation of Halogenated-SWCNTs

The starting-SWCNTs used in this example were purchased from SouthWest NanoTechnologies, Norman, Okla., under a tradename SWeNT, with a catalog number Grade S-P95-02-DRY. These SWCNTs were manufactured by using CoMoCat process and purified to remove the catalysts and graphitic carbon.

The starting-SWCNTs were dispersed in sodium cholate-D$_2$O solution by sonication and then were analyzed by an ultraviolet-visible-near infrared (UV-VIS-NIR) spectrometer, manufactured by Varian, Walnut Creek, Calif., under a catalog name Cary 500 Scan. The spectrum of the starting-SWCNTs thereby obtained was shown in FIG. 27. The starting-SWCNTs dispersed in sodium cholate-D$_2$O solution by sonication also were analyzed by a Raman spectrometer, manufactured by Horiba Jobin-Yvon, Edison, N.J., under a catalog name LabRamHR Raman Microscope at a laser excitation wavelength of about 633 nm. The Raman spectrum of the starting-SWCNTs was shown in FIG. 28.

The starting-SWCNTs, weighed in the range of 50 milligrams to 100 milligrams, were placed at the bottom of a 150 ml round bottom flask that had an addition arm. Iodine crystals, weighed in the range of 2 grams to 4 grams, were placed in the flask's addition arm. Thus, the starting-SWCNTs and the iodine initially were kept in separate locations in the flask.

The flask was connected to a vacuum system through a liquid nitrogen trap. The flask was first evacuated to a pressure below 1 Torr. Then, the contents of the flask were heated to a temperature in the range of 120° C. to 150° C. in vacuum to remove volatile species from the starting-SWCNTs. After this heating, the vacuum was shut off and the iodine crystals were poured on the starting-SWCNTs by tipping the addition arm. The heating was continued to melt the iodine crystals and soak the starting-SWCNTs in the molten iodine. The heating was further continued for 2 to 15 minutes after the immersion of the starting-SWCNTs in the molten iodine. The halogenated-SWCNTs with iodine thereby were obtained.

After the halogenation step, the halogenated-SWCNTs were heat treated at a temperature in the range of 50° C. and 80° C. for a duration in the range of 1 to 5 hours to partially sublime iodine from the halogenated-SWCNTs. The heat treated halogenated SWCNTs thereby were obtained.

Example 23

Dispersion of Halogenated-SWCNTs

First, about 5 milligrams of the heat treated halogenated-SWCNTs obtained in Example 22 were mixed with about 25 ml solution containing about 20 grams per liter sodium cholate in deuterium oxide (D$_2$O). This mixture was sonicated for a duration in the range of 20 to 30 minutes to prepare a dispersion.

The halogenated-SWCNT dispersion was then micro-fluidized, using an M110Y Microfluidizer manufactured by MFIC Corporation. The 250 micrometer and the 87 micrometer diamond interaction chambers were used in series. Processing pressure was in the range of 23,000 psi to 26,500 psi. The dispersion was passed through the interaction chambers 11 times. The dispersed-SWCNTs thereby were obtained.

Example 24

Centrifugation to Obtain Supernatant and Precipitate Phases

The dispersion was divided up into about 50 ml aliquots and placed in centrifuge tubes. The dispersion was then centrifuged at a centrifugal force of about 20,000 g for about 7.5 hours to obtain a supernatant phase and a precipitate phase. The supernatant phase was separated from the precipitate phase by carefully decanting the supernatant phase into another tube. The supernatant phase was analyzed by the UV-VIS-NIR spectrometer and the Raman spectrometer. The results were shown in FIGS. 27 and 28. The precipitate phase was first annealed at about 500° C. for about 2 hours in vacuum of about 0.1 Torr to remove iodine and then dispersed in sodium cholate-D$_2$O solution by sonication and finally analyzed by the UV-VIS-NIR spectrometer and the Raman spectrometer. The results were shown in FIGS. 27 and 28.

The starting-SWCNTs and the supernatant phase also were analyzed to determine their diameter distribution by photoluminescence spectroscopy. This technique was disclosed in detail by Bachilo et al. in a publication entitled "Structure-Assigned Optical Spectra of Single-Walled Carbon Nanotubes", Science, volume 298, pages 2361-2366 (2002). The starting-SWCNTs were dispersed in sodium cholate-D$_2$O solution by sonication before the analysis. The supernatant phase obtained after centrifugation was used in the photoluminescence analysis with no further processing. The diameter distributions of the starting-SWCNTs and the supernatant phase were shown in FIG. 29.

Figure 27:
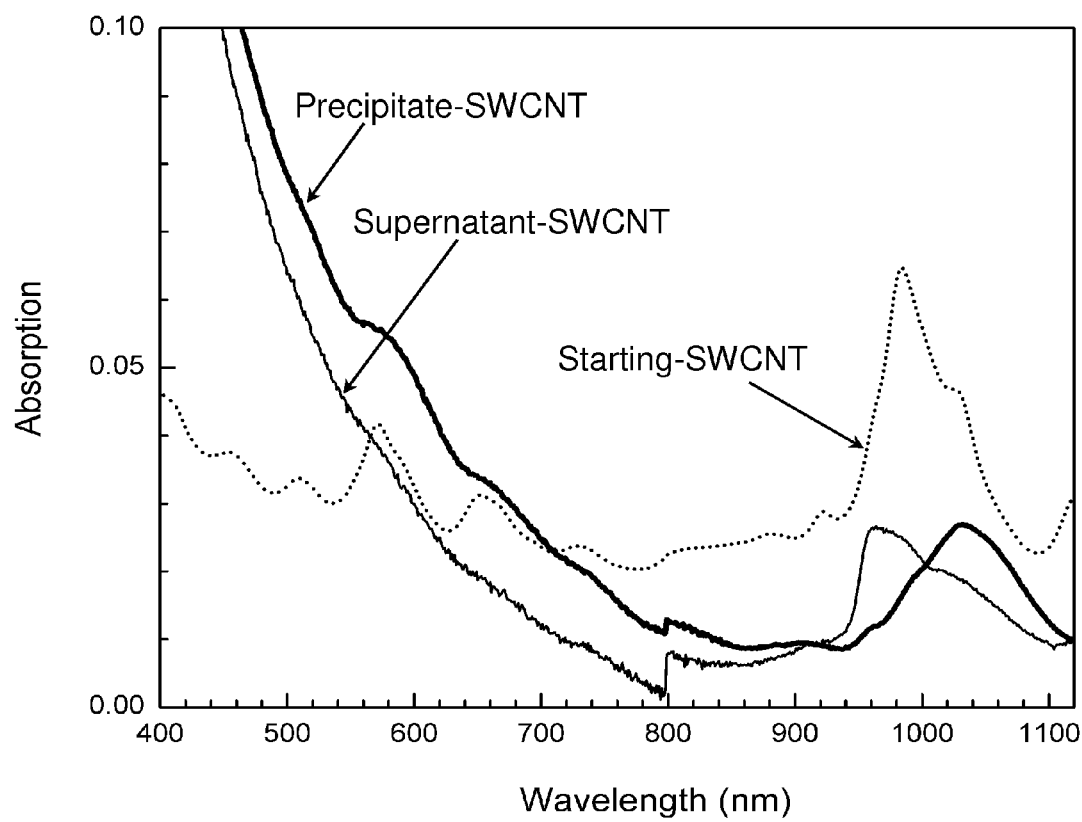
FIG. 27 shows the UV-VIS-NIR spectra of the starting SWCNTs, the precipitate phase and the supernatant phase.
Figure 28:
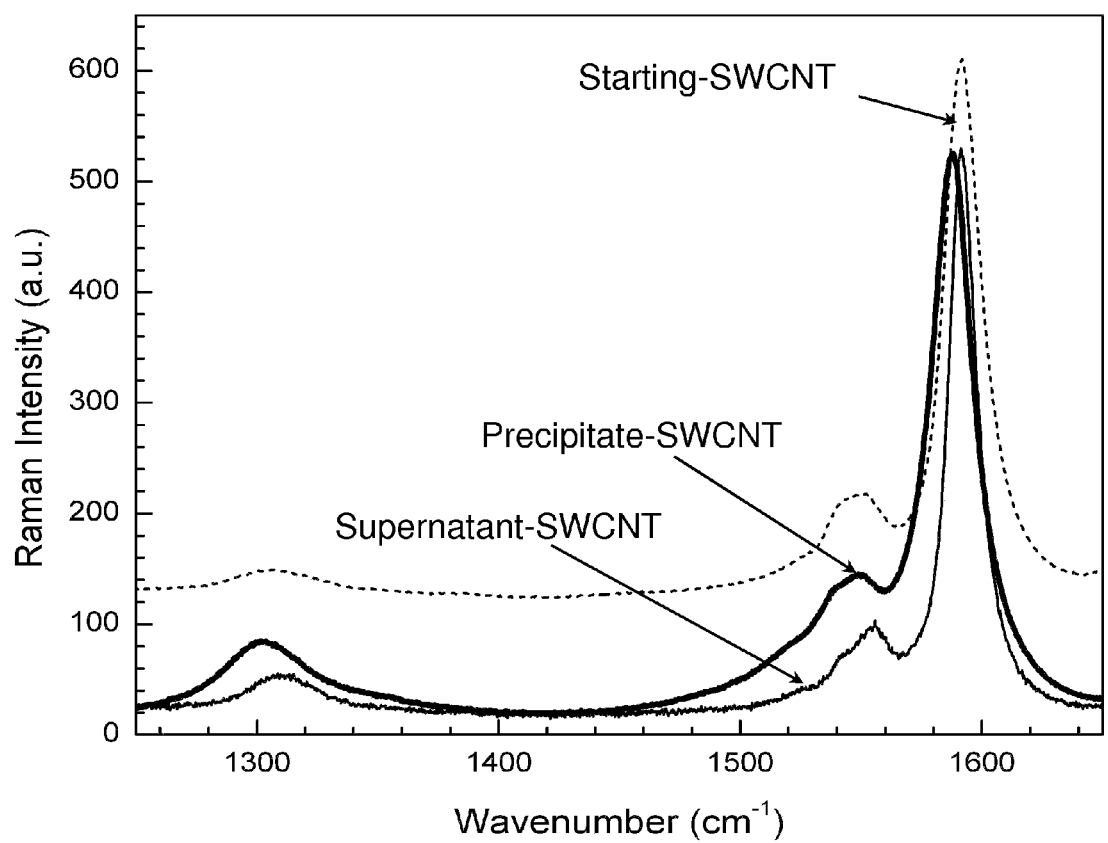
FIG. 28 shows the 633 nm excitation Raman spectra of the starting SWCNTs, the precipitate phase and the supernatant phase.

The results shown in FIGS. 27-29 obtained by the use of three different analysis techniques indicated that the starting-SWCNTs were separated according to their diameter. The UV-VIS-NIR absorption at different wavelengths was caused by the SWCNTs having different diameters. The spectrum of the starting-SWCNTs had a composite peak at about 1,000 nm (FIG. 27). This composite peak was caused by the optical transitions across the band-gap of s-SWCNTs. Since the band-gap depended on diameter, this peak comprised several components corresponding to s-SWCNTs of different diameters. In the supernatant-SWCNT, this peak appeared at about 960 nm, while in the precipitate-SWCNT at about 1,040 nm. Thus, according to the UV-VIS-NIR spectra, the supernatant phase and the precipitate phase comprised SWCNTs having different diameters.

Similarly, peak positions of the Raman spectra were also diameter dependent. See also Yu et al. in a publication entitled "(n,m) Structural Assignments and Chirality Dependence in Single-Wall Carbon Nanotube Raman Scattering" J. Phys. Chem. B, volume 105, pages 6831-6837 (2001). The starting-SWCNTs had three Raman peaks, at about 1,310 cm$^{-1}$, about 1,549 cm$^{-1}$, and about 1,592 cm$^{-1}$ (FIG. 28). The supernatant-SWCNTs also had three peaks. Two of them, one at about 1,310 cm$^{-1}$ and the other at about 1,592 cm$^{-1}$, did exist for that of the starting-SWCNTs. However, the third peak for the supernatant-SWCNTs appeared at a different location: about 1,556 cm$^{-1}$. The precipitate-SWCNTs also had three peaks. One of them, at about 1,549 cm$^{-1}$, did exist for that of the starting-SWCNTs. Two of the peaks for the precipitate-SWCNTs appeared at different locations, one at about 1,300 cm$^{-1}$ and the other at about 1,588 cm$^{-1}$. Such Raman spectra shifts were indicative of the enrichment of the supernatant-SWCNTs according to their diameter.

The diameter distribution determined by the photoluminescence technique further supported the finding that the supernatant (or the precipitate) phase was enriched according to the SWCNT diameter (FIG. 29). The starting-SWCNTs had diameters varying in the range of 0.650 to 1.400 nm. The diameters smaller than 0.78 nm contributed more than 40% of the starting-SWCNTs. In contrast, more than 95% of the supernatant-SWCNTs had diameters larger than 0.78 nm, indicating that the supernatant phase was enriched with larger diameters.

Example 25

Atomic Size-limited Intercalation into Single Wall Carbon Nanotubes

In this example, a diameter-based separation of larger nanotubes ($d_{in} > d_I$) with iodine-filled interior from smaller ($d_{in} < d_I$) empty ones is disclosed. Here, $d_{in}$ stands for inner diameter of individual carbon nanotubes and $d_I$ for the ionic diameter of iodine. First, about 20 milligrams of starting-SWCNTs (purchased from SouthWest NanoTechnologies) were degassed in the reaction chamber by heating to about 140° C. in vacuum (about 1 Torr) for about 20 minutes. Next, the vacuum pump was disconnected, and the reaction was carried out by adding iodine powder (about 10 grams) and heating the mixture at about 150° C. for about 30 minutes. Then, temperature was decreased down to about 100° C. and the vacuum pump was connected again (about 1 Torr) to remove unreacted iodine by keeping the halogenated SWCNTs at this temperature for about 2 hours. By weight uptake measurement, it was estimated that final composition was approximately $IC_{12}$, consistent with the literature (Grigorian et al.). The halogenated SWCNTs were thereby obtained.

The halogenated SWCNTs were first dispersed in water by using cetyltrimethylammonium bromide (CTAB) as surfactant and then further dispersed in water by high shear mixing using the M110Y Microfluidizer (22 passes through the interaction chambers at about 26,500 psi pressure), and finally centrifuged at about 20,000 g (Fisher 21000R) for about 4 hours. The resulting supernatant phase was carefully separated from the precipitate phase by decanting. Both phases were consequently heated in vacuum (about 10$^{-2}$ Torr) at about 500° C. for about 4 hours to remove intercalated iodine and the surfactant.

Figure 31:
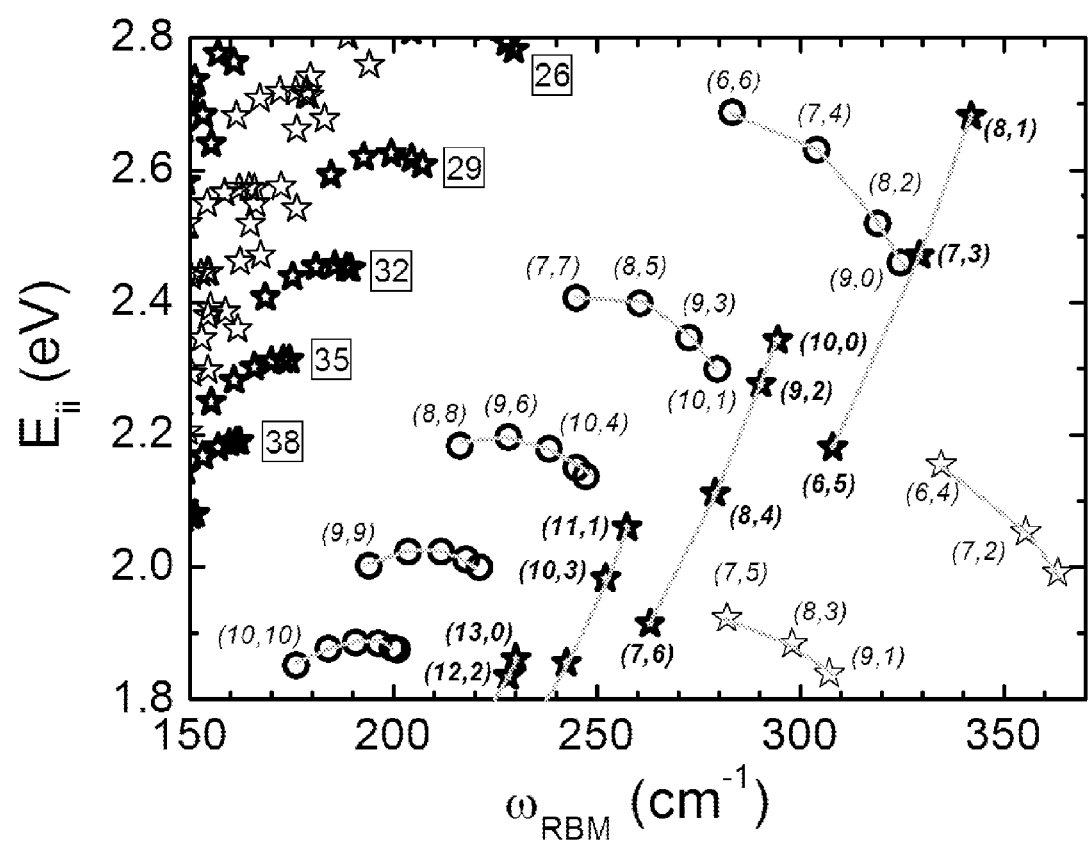
FIG. 31 shows the optical transition energies of nanotubes as a function of radial breathing mode frequency. Circles are for metallic tubes ($E_{11}^M$), while stars are for semiconducting tubes ($E_{22}^S$ is below $E_{11}^M$, while $E_{33}^S$ and $E_{44}^S$ are above $E_{11}^M$). The (n,m) for some $E_{22}^S$ and $E_{11}^M$ are given. The gray lines on $E_{22}^S$ and $E_{11}^M$ and the numbers insides squares for $E_{33}^S$ branches indicate SWCNTs with the same (2n+m) family number. Thick and thin stars are for semiconducting tubes with (2n+m)mod3=1 and 2, respectively. The (2n+m)mod3=0 for metallic tubes.

Raman spectra were measured using a Dilor XY triple-monochromator equipped with a N$_2$-cooled charge coupled device (CCD) detector. Measurements were performed in a backscattering configuration with a microscope objective lens of 80×. As excitation sources, 6 laser lines from an ArKr laser and 10 laser lines from a dye laser were used. The dye laser was pumped by a 6 W Ar laser, using the DCM Special in the range of 654.5 nm (1.90 eV) to 612.1 nm (2.03 eV) and the Rhodamine 6G dyes in the range of 605.0 nm (2.05 eV) to 567.9 nm (2.18 eV). The six ArKr laser lines were: 647 nm (1.92 eV), 568 nm (2.18 eV), 514.5 nm (2.41 eV), 488 nm (2.54 eV), 476.5 nm (2.60 eV), and 457.9 nm (2.71 eV). The 633 nm excitation wavelength spectra were measured using Horiba Jobin Yvon Aramis Raman spectrometer. The Raman spectrometers were calibrated for absolute intensity. For frequency adjustments, the spectrometer was calibrated during the measurement procedure, every time the excitation laser energy was changed. In addition, for each laser excitation energy, Si substrate spectra were acquired as reference. The data were analyzed using the Origin software, OriginLab Corporation, Northampton, Mass. (for visual comparative analysis and figure preparations) and the PeakFit software, Systat Software Incorporated, San Jose, Calif. (for quantitative analysis). In the PeakFit software, the non-Raman related baselines were removed, and the spectra were fitted using a sum of Lorentzians. From the fitting procedure the radial breathing mode frequencies, linewidths, intensities and integrated areas were extracted. The photoluminescence (PL) spectra were measured at 647 nm with a SPEX 750M spectrometer equipped with a 600l/mm grating blazed at about 1000 nm and a Princeton Instruments OMA V InGaAs linear diode array detector. The excitation laser power was set to about 10 mW and focused onto the sample using a 10× Mituoyo M Plan Apo NIR objective lens with a working distance of about 30.5 nm, and emission was collected by the same objective lens in a backscattering configuration. The spectral resolution of the system was about 1 nm. The dispersions for PL and some Raman measurements were prepared by sonicating SWCNT powders mixed with CTAB surfactant in deionized water (about 200 milligrams SWCNT and about 3 grams of CTAB per liter of water). The outer diameters of SWCNT were calculated as $d=(a_{CC}/\pi)\sqrt{\{3(n^2+nm+m^2)\}}$, where $a_{CC}=0.142$ nm is the C—C distance, and $\pi=3.1415$. The ionic diameter values of halogens were adopted from Pauling publication entitled "*The Nature of the Chemical Bond*" (Cornell Univ. Press, Ithaca, N.Y., 1960), page 514. The (n,m) assignment procedure was based on FIG. 31 where the optical transition energies ($E_{ii}$, i=1, 2, 3 . . . labeling the optical transition level) are plotted as a function of radial breathing mode (RBM) frequency ($\omega_{RBM}$) that is proportional to the inverse tube diameter (1/d) for every (n,m) tube. This plot is the basis for the (n,m) assignment of the resonance Raman signals. The RBM signal for a given (n,m) SWCNT is only observed when the laser excitation energy approaches the electronic transition energy for this (n,m) SWCNT. The RBM signal is stronger when the incoming light (the laser excitation energy) matches exactly the resonance energy, or when the scattered light (the laser excitation energy minus the RBM energy for a Stokes process) matches the electronic transition energy.

Specific excitation energies were selected to achieve resonance with metallic and semiconducting tubes in the full range of diameter distribution, so that diameter and/or chirality separation enrichment can be determined. Specific excitation energies were also selected to achieve full resonance with the semiconducting (n,m) tubes that are preferentially produced by the CoMoCat process, i.e. the (6,5) and (7,5) SWCNTs. Resonance profile with a quasi-continuous set of laser excitation lines was performed to assure full resonance has been obtained. Another reason of specific excitation energy selection was to achieve full resonance with the metallic (n,m) tubes that are preferentially produced by the CoMoCat process, i.e. the (7,4) and (6,6) SWCNTs that have diameters similar to the (6,5) and (7,5) SWCNTs, respectively.

An ArKr laser and a dye laser with tunable energy were used for the population analysis. The transition energies are strongly dependent on many-body effects (electron-electron and electron-hole interactions). And the many-body effects are strongly dependent on the environment dielectric constant. To have more accurate information on the specific (n,m) SWCNT population, resonance Raman maps were analyzed at the energies where the (6,5) and (7,5) SWCNTs get into resonance. For the SWCNT powder measurements, the laser power at the samples was kept at about 1 mW to avoid heating effects. The use of higher power levels in solid samples was observed to change the large/small diameter population ratio in the sample, indicating comparatively larger heat induced damage of smaller diameter (more reactive) tubes.

Highly accurate comparative analysis of population for specific (n,m) SWCNTs can be performed based on the resonance profiles obtained with the dye laser. Raman scattering efficiency depends on (n,m) indices, so that direct comparison of RBM intensities ($I_{RBM}$) of different (n,m) nanotubes is not correct. Variation in RBM intensity of particular (n,m) SWCNTs in different samples is mostly related to SWCNT concentration in the sample. For a comparative analysis, the relative intensities of different (n,m) tubes should be compared within the same sample. For example, in the starting CoMoCat material, it was found that $I_{RBM}$=37 for (7,5) and 36 for (6,5) tubes. In the precipitate phase, $I_{RBM}$=74 for (7,5) and 65 for (6,5) tubes, and in the supernatant phase, $I_{RBM}$=148 for (7,5) and 57 for (6,5) tubes. Comparison of the relative intensities shows that the (7,5) to (6,5) SWCNT ratio is almost the same for the starting material (37/36=1.0) and the precipitate phase (74/65=1.1), but it is significantly higher in the supernatant phase (148/57=2.6). These data indicate an enrichment of the supernatant phase with (7,5) tubes by a factor of 2.6 as compared to the precipitate phase.

The six ArKr laser excitation lines cover resonances for both metallic and semiconducting SWCNTs in the entire diameter range in the CoMoCat SWCNT material. For each of these excitation lines, the RBM spectra were fit with a sum of Lorentzians assigned to specific (n,m) tubes, and the integrated areas were then summed up separately for metallic and semiconducting SWCNTs (Table 1). These data include both powders and dispersions in water with CTAB surfactant.

TABLE 1

| | Metal-to-semiconductor ratios | | | |
|---|---|---|---|---|
| | Solution | | Powder | |
| Sample | % metal | % semiconductor | % metal | % semiconductor |
| Starting-SWCNT | 58 | 42 | 59 | 41 |
| Precipitate Phase | 48 | 52 | 62 | 38 |
| Supernatant Phase | 50 | 50 | 58 | 43 |

Note that these numbers reflect only relative Raman intensities and not the actual metal-to-semiconductor molecular ratio due to the dependence of the Raman signal intensity on (n,m). The metallic-to-semiconducting character of the Raman response in the fractions exhibited small variations, but no clear evidence for enrichment of the fractions with either metallic or semiconducting tubes was observed.

Raman spectra of both phases before the removal of intercalated iodine (FIG. 30c) show a strong peak at about 148 $cm^{-1}$, due to intercalated polyiodides, in addition to the peaks in the range of 180 to 350 $cm^{-1}$, due to SWCNT radial breathing modes (RBM). For assignment of these peaks, see Fan et al. and Rao et al. No Raman peaks attributable to unreacted, molecular iodine were observed. The polyiodide-to-SWCNT ratio as estimated from the relative intensities of respective Raman peaks was about two times higher in the supernatant phase as compared to the precipitate phase, indicating that the supernatant phase had more intercalated iodine per SWCNT. These Raman spectra can not be used for separation assessment because the resonance conditions change when SWCNTs are charged. Moreover, these changes may be different for the supernatant and precipitate phases as they carry different amount of charge per carbon. The 148 $cm^{-1}$ peak disappeared entirely after vacuum heating at about 500° C. for about 2 hours, confirming complete removal of the intercalated iodine.

Figure 32:
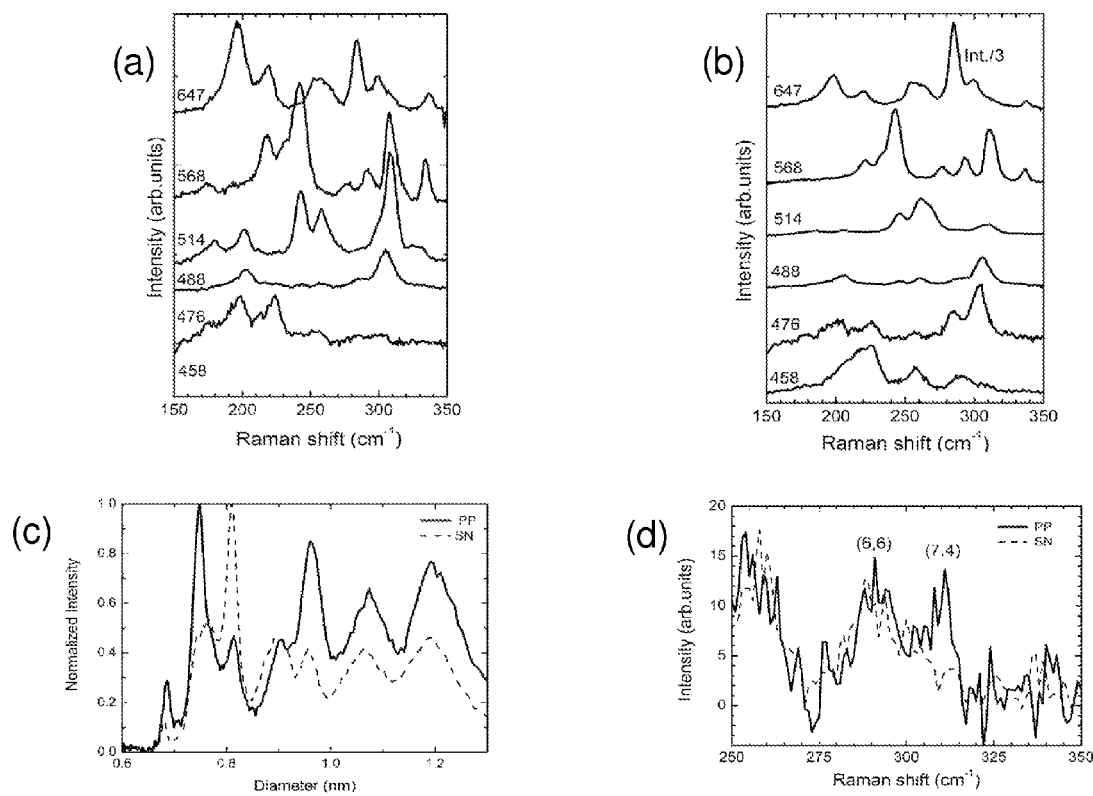
FIG. 32 shows Raman radial breathing modes of the precipitate phase (a), and the supernatant phase (b) collected with six excitation wavelengths (nm) shown in the insets; (c) sum spectra; (d) 458 nm excitation spectra highlighting the small diameter metallic tubes. The data in (c) were converted from RBM frequencies ($\omega_{RBM}$) to SWCNT diameter units using the relation d(nm)=218.7/[$\omega_{RBM}$(cm$^{-1}$)−15.3] found to work best for CoMoCat nanotubes (see Jorio et al.). PP is the precipitate phase and SN is the supernatant phase.

RBM frequencies are inversely proportional to nanotube diameters (Rao et al. and Jorio et al.), and can therefore be used to determine diameter distribution in the separated phases after removal of intercalated iodine. The results obtained earlier for starting CoMoCat material (Jorio et al.) provided a guide on selecting several specific excitation wavelengths to cover all major SWCNT species. At each excitation wavelength, only a few SWCNTs of all present in the sample are in resonance and contribute to Raman intensity. Accordingly, the RBMs at each wavelength are different as they represent different SWCNTs (FIG. 32a, b). To obtain representative RBM intensity distribution over the entire sample, these spectra were added up for each phase (FIG. 32c).

The RBM intensity distributions around the boundary of about 290 $cm^{-1}$ or d of about 0.78 nm clearly indicate a diameter-based separation in the phases (FIG. 32c). In particular, the precipitate phase is enriched with diameters smaller than about 0.78 nm, and supernatant phase with diameters larger than about 0.78 nm SWCNTs. Note that the data in FIG. 32c represent both metallic and semiconducting nanotubes, so both these populations exhibit the same boundary between the phases.

In the range below about 250 $cm^{-1}$, higher RBM intensities were systematically observed in the precipitate phase as compared to the supernatant phase (FIG. 32c), indicating that SWCNTs with diameters larger than about 0.9 nm went preferentially to the precipitate phase. This was observed earlier for pristine CoMoCat material and attributed to preferential suspension of smaller diameter tubes by surfactant, as disclosed by Jorio et al. in a publication entitled "Quantifying carbon nanotube species with resonance Raman scattering", Phys. Rev. B, volume 72, article 075207 (2005).

As a next step, resonance profiles were measured for small diameter semiconducting SWCNTs. Using these data, relative intensities of each (n,m) tubes may be determined under full resonance condition. Comparison of these relative intensities revealed that (6,5), (8,3), and (6,4) SWCNTs were enriched in precipitate, and (7,5) SWCNTs in supernatant phases. For metallic nanotubes, the boundary was found to be between (7,4) and (6,6) SWCNTs enriched in the precipitate and supernatant phases, respectively (FIG. 32d).

These results place the semiconducting boundary between (8,3) and (7,5) SWCNTs with diameters of about 0.782 and about 0.829 nm, respectively, and about 0.047 nm (or 47 pm) difference in diameters. For metallic tubes, the boundary was found to be between (7,4) and (6,6) SWCNTs enriched in precipitate and supernatant phases, respectively (FIG. 32d). Taking into account the diameters of the metallic SWCNTs, i.e., d of about 0.814 and about 0.755 nm for (6,6) and (7,4) SWCNTs, respectively, the boundary can be further narrowed down to about 32 pm difference between d(8,3) and d(6,6) SWCNTs.

Figure 33:
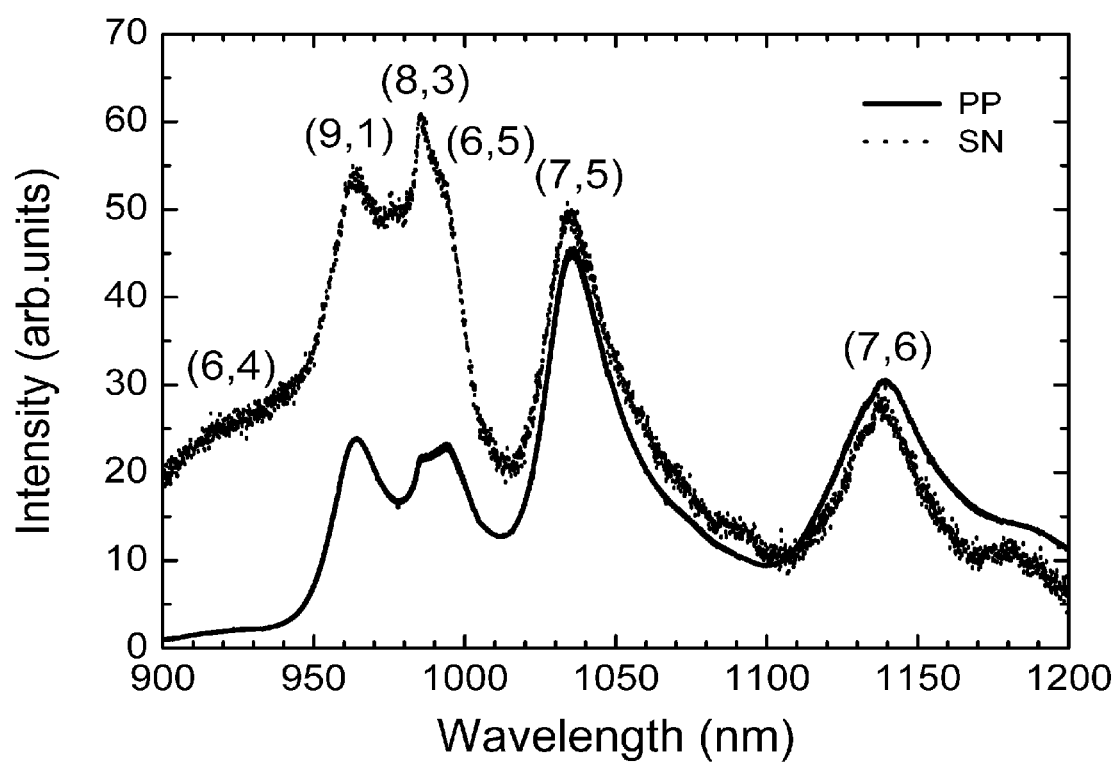
FIG. 33 shows the 647 nm excitation photoluminescence spectra of the phases. PP is the precipitate phase and SN is the supernatant phase.

Additional information on SWCNT separation was obtained from PL spectra where the relative intensities of (8,3), (6,4), and (9,1) SWCNTs can be compared to those of (7,5) and (7,6) SWCNTs (FIG. 33). The Raman and PL cross sections for individual SWCNTs are different, and PL offers independent conformation of Raman data. Enrichment of the precipitate phase with (8,3), (6,4), and (9,1) SWCNTs, and the supernatant phase with (7,5) and (7,6) SWCNTs was observed, consistent with the Raman results.

Summarizing, the combined Raman and PL data provided evidence that SWCNTs were separated into two phases according to their diameters: i.e., SWCNTs with diameters equal to and smaller than about 0.782 nm went to the precipitate phase, and SWCNTs with diameters equal to or larger than about 0.814 nm went to the supernatant phase. Then, it was expected that (1) SWCNTs that were large enough to accommodate iodine in their interior (supernatant phase) were separated from the smaller ones with empty interiors (precipitate phase), and (2) the separation boundary was determined by the relation between SWCNT inner diameter and intercalated iodide ion diameter, about 0.432 nm.

Example 26

Atomic Size-limited Intercalation into Single Wall Carbon Nanotubes

In this example, a diameter-based separation of larger nanotubes ($d_{in}$>$d_{Br}$) with bromine-filled interior from smaller ($d_{in}$<$d_{Br}$) empty ones is disclosed. Here, $d_{Br}$ is ionic diameter of bromine. This example was carried out in the same manner disclosed in Example 25 except that the halogenation was carried out using bromine at about 30° C., followed by vacuum heating at about 30° C. for about 2 hours.

Figure 34:
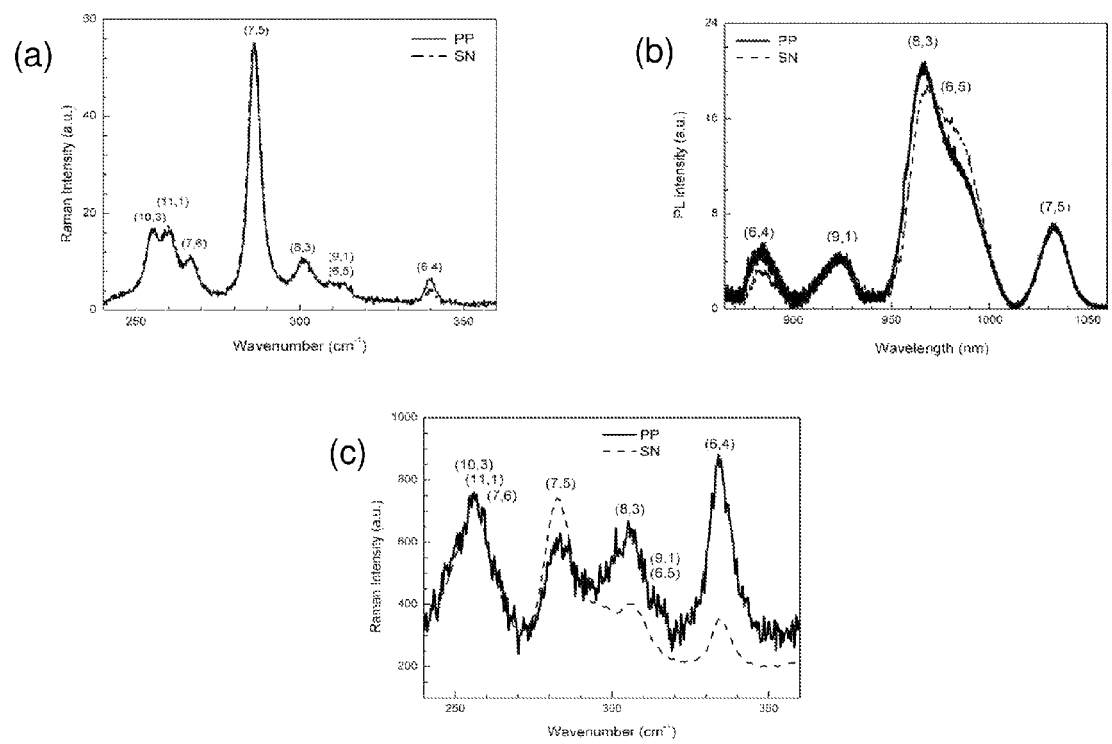
FIG. 34 shows the 633 nm excitation Raman spectra (a) and 633 nm excitation photoluminescence spectra (b) of the bromine-separated phases, 633 nm excitation Raman spectra (c) of the iodine-separated phases. Comparison of (a) with (c) demonstrates the difference between the bromine- and iodine-based processes. PP is the precipitate phase and SN is the supernatant phase.

With ionic diameter of about 0.390 nm, bromine ion is expected to fit inside (6,5) SWCNTs in contrast to iodine ion, thereby moving the separation boundary towards the smaller SWCNT diameters. The main difference in the RBM modes is the decrease of the (6,4) intensity in the precipitate phase as compared to the supernatant phases (FIG. 34) indicating enrichment of the precipitate phase with (6,4) nanotubes. The (9,1) nanotubes that have the same diameter as (6,5), as well as (6,5), (8,3), and (7,5) tubes, are all enriched in the supernatant phase. The separation boundary in this case lies between the (6,4) and (6,5) tubes, i.e., d=0.692 and 0.757 nm. This result suggests that the proposed mechanism based on the size of the halogen and the inner diameter of the SWCNTs may be used to separate SWCNTs according to their diameter.

It is expected that interiors of larger (d>1.22 nm) nanotubes may accommodate several iodide chains side by side giving rise to new boundaries between single and multiple intercalated ions per cross section. An interesting implication may be the creation of sets of discretely charged nanotube species (e.g., as in FIG. 30a, b) with potential use as logic elements for molecular electronics.

In summary, a new method was demonstrated for diameter-based separation where SWCNTs with filled interior were separated from the empty ones. The separation boundary may be tuned with picometer-scale discrimination by selecting geometric size of intercalant species.

Although a number of embodiments of the invention have been described above, those of ordinary skill in the art will appreciate that various modifications can be made without departing from the scope of the invention. Accordingly, other embodiments are within the scope of the following claims.

What is claimed:

1. A method for preparing an organized carbon and non-carbon assembly comprising the steps of:
reacting carbon nanotubes with a halogenated precursor to form a halogenated intermediate, wherein the halogenated precursor comprises a halogenated compound and a halogen, wherein the halogen is selected from the group consisting of iodine, bromine, an interhalogen compound, or any combination thereof, and
removing halogen content from the halogenated intermediate to obtain an organized carbon and non-carbon assembly.

2. The method of claim 1, wherein the halogenated compound is titanium iodide.

3. The method of claim 1, wherein the halogen is iodine.

4. The method of claim 1, wherein the halogen is bromine.

5. The method of claim 1, wherein the step of reacting the carbon nanotubes and the halogenated precursor is carried out at or above the temperature where the halogenated precursor forms a liquid.

6. The method of claim 1, wherein the step of removing the halogen content from the halogenated intermediate is carried out in a gas mixture comprising hydrogen.

7. The method of claim 1, wherein the step of removing the halogen content from the halogenated intermediate is carried out below atmospheric pressure.

8. The method of claim 1, wherein the method further comprises the step of selecting the carbon nanotubes or the halogenated precursor such that the inner diameters of the carbon nanotubes are larger than the diameter of the halogenated compound.

9. The method of claim 1 wherein the method further comprises washing the organized carbon and non-carbon assembly with a solvent.

10. The method of claim 1 wherein the method further comprises the step of selecting the carbon nanotubes or the halogenated precursor such that the inner diameters of the carbon nanotubes are smaller than the diameter of the halogenated compound.

11. The method of claim 1, wherein the carbon nanotubes are SWCNTs, MWCNTs, or a combination thereof.

12. The method of claim 11, wherein the carbon nanotubes are SWCNTs and have been pre-treated to partially or completely remove amorphous carbon, catalyst impurities or both.

13. The method of claim 1, wherein the halogenated compound is selected from the group consisting of $MgI_2$, $ScI_3$, $ScBr_3$, $YI_3$, $TiI_4$, $VI_3$, $VBr_3$, $MoI_3$, $MnI_2$, $FeI_2$, $CoI_2$, $NiI_2$, $PdI_2$, $PtI_2$, $BI_3$, $PbI_2$, $BiI_3$, and any combination thereof.

14. The method of claim 1, wherein the interhalogen compound is $IBr$, $ICl_3$, $BrF_3$, or any mixture thereof.

15. The method of claim 1, wherein the amount of the halogenated compound in the halogenated precursor is at least 0.001 weight percent.

16. The method of claim 15, wherein said amount is at least 0.1 weight percent.

17. The method of claim 16, wherein said amount is at least 10 weight percent.

18. The method of claim 1, wherein the amount of the halogen in the halogenated precursor is at least 0.001 weight percent.

19. The method of claim 18, wherein said amount is at least 0.1 weight percent.

20. The method of claim 19, wherein said amount is at least 10 weight percent.

21. The method of claim 1, wherein the ratio of a non-carbon material in the halogenated precursor to carbon present in the carbon nanotubes is at least 0.0001 to 1 by weight.

22. The method of claim 21, wherein said ratio is at least 0.01 to 1 by weight.

23. The method of claim 22, wherein said ratio is at least 0.1 to 1 weight.

24. The method of claim 5, wherein the step of reacting the carbon nanotubes and the halogenated precursor is carried out above 20° C.

25. The method of claim 24, wherein the step of reacting the carbon nanotubes and the halogenated precursor is carried out above 100° C.

26. The method of claim 24, wherein the step of reacting the carbon nanotubes and the halogenated precursor is carried out above 150° C.

27. The method of claim 1, further comprising a step of heating the carbon nanotubes before the step of reacting the carbon nanotubes with the halogenated precursor.

28. The method of claim 27, wherein the step of heating the carbon nanotubes is carried out at a temperature above 100° C. for longer than 10 minutes.

29. The method of claim 27, wherein the step of heating the carbon nanotubes is carried out at a temperature above 200° C.

30. The method of claim 1, wherein the step of removing the halogen content from the halogenated intermediate is carried out at a temperature above 200° C.

31. The method of claim 30, wherein the step of removing the halogen content from the halogenated intermediate is carried out at a temperature above 500° C.

32. The method of claim 1, wherein the step of removing the halogen content from the halogenated intermediate is carried out for a period longer than 5 minutes.

33. The method of claim 32, wherein the step of removing the halogen content from the halogenated intermediate is carried out for a period longer than 30 minutes.

34. The method of claim 30, wherein the step of removing the halogen content from the halogenated intermediate is carried out by reacting the halogenated intermediate with hydrogen.

35. The method of claim 30, wherein the step of removing the halogen content from the halogenated intermediate is carried out at a pressure below 1 atmosphere.

36. The method of claim 1, wherein the organized carbon and non-carbon assembly obtained comprises Mg, $MgB_2$, Sr, Sc, Y, Ti, $TiB_2$, Zr, $ZrB_2$, Hf, HfN, V, $VB_2$, Nb, $NbB_2$, Ta, Cr, $CrB_2$, Mn, Fe, Co, Ni, Pd, Pt, B, BN, or any combination thereof, as non-carbon materials.

37. The method of claim 1, wherein the step of removing the halogen content from the halogenated intermediate reduces the halogen content to less than 10% (w/w).

* * * * *